(12) United States Patent
Liu et al.

(10) Patent No.: US 12,318,762 B2
(45) Date of Patent: Jun. 3, 2025

(54) METAL OXIDE-BASED SCR CATALYST COMPOSITION

(71) Applicants: BASF CORPORATION, Florham Park, NJ (US); UNIVERSITY OF CENTRAL FLORIDA RESEARCH FOUNDATION, INC., Orlando, FL (US)

(72) Inventors: Fudong Liu, Orlando, FL (US); Yuejin Li, Iselin, NJ (US); Shaohua Xie, Orlando, FL (US)

(73) Assignees: BASF Mobile Emissions Catalysts LLC, Iselin, NJ (US); University of Central Flordia Research Foundation Inc., Orlando, FL (US)

( * ) Notice: Subject to any disclaimer, the term of this patent is extended or adjusted under 35 U.S.C. 154(b) by 246 days.

(21) Appl. No.: 17/997,750

(22) PCT Filed: May 14, 2021

(86) PCT No.: PCT/US2021/032411
§ 371 (c)(1),
(2) Date: Nov. 2, 2022

(87) PCT Pub. No.: WO2021/231838
PCT Pub. Date: Nov. 18, 2021

(65) Prior Publication Data
US 2023/0219069 A1 Jul. 13, 2023

Related U.S. Application Data

(60) Provisional application No. 63/024,661, filed on May 14, 2020.

(51) Int. Cl.
*B01J 23/847* (2006.01)
*B01D 53/94* (2006.01)
(Continued)

(52) U.S. Cl.
CPC ...... *B01J 23/8474* (2013.01); *B01D 53/9418* (2013.01); *B01D 53/9477* (2013.01);
(Continued)

(58) Field of Classification Search
CPC ........ B01J 23/8474; B01J 23/10; B01J 23/20; B01J 23/30; B01J 23/34; B01J 35/56;
(Continued)

(56) References Cited

U.S. PATENT DOCUMENTS

2005/0069476 A1* 3/2005 Blakeman .......... B01D 53/9495
422/177
2010/0034717 A1 2/2010 Adelmann et al.
2018/0345218 A1* 12/2018 Goffe .................. B01J 29/723

FOREIGN PATENT DOCUMENTS

JP 10-272363 A 10/1998
JP 2009-082846 A 4/2009
(Continued)

OTHER PUBLICATIONS

Casapu et al.,"Characterization of Nb-containing MnOx—CeO2 catalyst for low-temperature selective catalytic reduction of NO with NH3," J. Phys. Chem. C, vol. 9791-9801 (2010).
(Continued)

*Primary Examiner* — Brandon D Lee
(74) *Attorney, Agent, or Firm* — DLA Piper LLP (US)

(57) ABSTRACT

The present disclosure provides SCR catalyst compositions capable of reducing nitrogen oxide ($NO_x$) emissions in engine exhaust. The catalyst compositions include a reducible metal oxide support containing ceria, one or more transition metal oxides as a redox promotor; and an oxide of niobium, tungsten, silicon, molybdenum, or a combination thereof as an acidic promotor. The redox promotor and the acid promotor are both supported on the reducible metal oxide support. Further provided are SCR catalyst articles
(Continued)

coated with such compositions, processes for preparing such catalyst compositions and articles, an exhaust gas treatment system including such catalyst articles, and methods for reducing $NO_x$ in an exhaust gas stream using such catalyst articles and systems.

25 Claims, 30 Drawing Sheets

(51) Int. Cl.

| | | |
|---|---|---|
| *B01J 23/10* | (2006.01) | |
| *B01J 23/20* | (2006.01) | |
| *B01J 23/30* | (2006.01) | |
| *B01J 23/34* | (2006.01) | |
| *B01J 35/56* | (2024.01) | |
| *B01J 37/02* | (2006.01) | |
| *B01J 37/08* | (2006.01) | |
| *F01N 3/20* | (2006.01) | |
| *F01N 3/28* | (2006.01) | |

(52) U.S. Cl.
CPC ............... *B01J 23/10* (2013.01); *B01J 23/20* (2013.01); *B01J 23/30* (2013.01); *B01J 23/34* (2013.01); *B01J 35/56* (2024.01); *B01J 37/0205* (2013.01); *B01J 37/024* (2013.01); *B01J 37/088* (2013.01); *F01N 3/2066* (2013.01); *F01N 3/2825* (2013.01); *F01N 3/2842* (2013.01); *B01D 2255/2065* (2013.01); *B01D 2255/207* (2013.01); *B01D 2255/2073* (2013.01); *B01D 2255/20738* (2013.01); *B01D 2255/20761* (2013.01); *B01D 2255/20776* (2013.01); *B01D 2255/2094* (2013.01); *B01D 2255/911* (2013.01); *B01D 2255/9155* (2013.01); *F01N 2330/30* (2013.01); *F01N 2370/04* (2013.01); *F01N 2610/02* (2013.01); *F01N 2610/1453* (2013.01)

(58) Field of Classification Search
CPC .... B01J 37/0205; B01J 37/024; B01J 37/088; B01J 37/0201; B01D 53/9418; B01D 53/9477; B01D 2255/2065; B01D 2255/207; B01D 2255/2073; B01D 2255/20738; B01D 2255/20761; B01D 2255/20776; B01D 2255/2094; B01D 2255/911; B01D 2255/9155; B01D 2251/2067; B01D 2255/206; B01D 2255/2061; B01D 2255/2063; B01D 2255/2066; B01D 2255/407; B01D 2255/9032; F01N 3/2066; F01N 3/2825; F01N 3/2842; F01N 2330/30; F01N 2370/04; F01N 2610/02; F01N 2610/1453; F01N 3/021; F01N 3/035; F01N 2330/06; F01N 2510/063; F01N 3/2828; F01N 2510/0682; F01N 2510/0684; Y02A 50/20; Y02T 10/12
See application file for complete search history.

(56) References Cited

FOREIGN PATENT DOCUMENTS

| JP | 2009-090273 A | 4/2009 | |
|---|---|---|---|
| JP | 2010-158669 A | 7/2010 | |
| WO | WO-2019069232 A1 * | 4/2019 | ......... B01D 53/9418 |

OTHER PUBLICATIONS

International Searching Report in PCT/US2021/032411, dated Sep. 2, 2021.

* cited by examiner

METAL OXIDE-BASED SCR CATALYST COMPOSITION

This is a national phase application of International Application No. PCT/US2021/032411, filed on May 14, 2021, which International Application was published by the International Bureau in English on Nov. 18, 2021, and which claims the benefit of priority to U.S. Provisional Application No. 63/024,661, filed May 14, 2020, the contents of all of which are incorporated by reference herein in their entirety.

The present disclosure relates generally to the field of exhaust gas treatment catalysts such as Selective Catalytic Reduction (SCR) catalyst compositions capable of selectively reducing nitrogen oxides in engine exhaust, SCR catalyst articles coated with such compositions, exhaust gas treatment systems comprising such SCR catalyst articles, methods of treating the exhaust gas stream with such SCR catalyst articles or such emission treatment systems, and processes for preparing such SCR catalyst compositions.

Over time, the harmful components of nitrogen oxides ($NO_x$) have led to atmospheric pollution. Exemplary nitrogen oxide species include nitrogen monoxide (NO) and nitrogen dioxide ($NO_2$), among others. $NO_x$ is contained in exhaust gases, such as from internal combustion engines (e.g., in automobiles and trucks), from combustion installations (e.g., power stations heated by natural gas, oil, or coal), and from nitric acid production plants. Various treatment methods have been used for the treatment of $NO_x$-containing gas mixtures to decrease atmospheric pollution. One type of treatment involves catalytic reduction of nitrogen oxides. Exemplary processes include: (1) a nonselective reduction process wherein carbon monoxide, hydrogen, or a lower molecular weight hydrocarbon is used as a reducing agent; and (2) a selective reduction process wherein ammonia or an ammonia precursor is used as a reducing agent. In the selective reduction process, a high degree of nitrogen oxide removal can be achieved with a stoichiometric amount of reducing agent in an oxygen-rich exhaust stream.

The selective reduction process is referred to as an SCR (Selective Catalytic Reduction) process. The SCR process uses catalytic reduction of nitrogen oxides with a nitrogenous reductant (e.g., ammonia or urea) in the presence of atmospheric oxygen, resulting in the formation predominantly of nitrogen and steam:

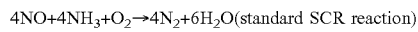
$4NO+4NH_3+O_2 \rightarrow 4N_2+6H_2O$ (standard SCR reaction)

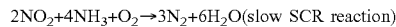
$2NO_2+4NH_3+O_2 \rightarrow 3N_2+6H_2O$ (slow SCR reaction)

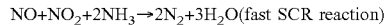
$NO+NO_2+2NH_3 \rightarrow 2N_2+3H_2O$ (fast SCR reaction)

Current catalysts employed in the SCR process include copper-promoted zeolites. However, regulations worldwide mandate ever lower emissions from vehicles. Efficient removal of $NO_x$ at low temperatures (<200° C.) is an unmet need and a great challenge for the industry in general. Cu-promoted zeolites are the most active type of catalyst for SCR for diesel vehicles, but such SCR catalyst lack sufficient activity below 200° C. At low temperatures, Cu-promoted zeolite catalysts also need to be saturated with ammonia (NIH) before they can be effective for $NO_x$ reduction, which slows down the response to reductant (e.g., urea injection). Vanadium oxide/titania ($V_2O_5/TiO_2$) based catalysts require less $NO_3$ to reach saturation, but are much less active at low temperatures relative to copper-promoted zeolite catalysts. Another drawback of vanadium-based catalysts is the environmental concern associated with possible escape of $V_2O_5$ to the atmosphere with use of such catalysts.

Accordingly, it would be desirable in the art to provide SCR catalyst compositions with superior low temperature $NO_x$ reduction activity, good hydrothermal aging stability, and which do not rely on metal-promoted zeolites or vanadium.

The present disclosure generally provides a metal oxide-based selective catalytic reduction (SCR) catalyst composition effective for the abatement of nitrogen oxides ($NO_x$) in an exhaust gas stream. In some embodiments according to the present disclosure, certain metal oxide-based catalysts are more active for selective catalytic reduction (SCR) of $NO_x$ using $NH_3$ (or urea) relative to a conventional copper-chabazite (Cu-CHA) reference catalyst at low temperatures (<200° C.) after hydrothermal aging. The $NH_3$ storage capacities of the metal oxide-based catalysts are less than about ⅕ of that of the Cu-chabazite reference; thus, these catalysts may be much more responsive to injection of reductant (e.g., urea or $NH_3$) than the conventional Cu-chabazite reference catalyst. Such metal oxide-based catalysts may be especially advantageous in closed-coupled SCR applications with a dual-urea injection system, where the first SCR catalyst is responsible for low-temperature $NO_x$ controls, such as during a cold start, thereby offering the advantage of higher $NO_x$ activity and faster response.

Accordingly, in one aspect is provided a selective catalytic reduction (SCR) catalyst composition effective for the abatement of nitrogen oxides ($NO_x$) in an exhaust gas stream. The SCR catalyst composition comprises: a reducible metal oxide support comprising ceria; a redox promotor comprising one or more transition metal oxides; and an acidic promotor comprising an oxide of niobium, tungsten, silicon, molybdenum, or a combination thereof, wherein the redox promotor and the acid promotor are supported on the reducible metal oxide support.

In some embodiments, the reducible metal oxide support comprises ceria in an amount ranging from about 20% to about 100% by weight of the reducible metal oxide support. In some embodiments, the reducible metal oxide support further comprises zirconia, alumina, silica, titania, baria, niobia, tin oxide, yttrium oxide, an oxide of a rare earth metal, or a combination thereof. In some embodiments, the rare earth metal is selected from lanthanum, praseodymium, neodymium, samarium europium, and gadolinium.

In some embodiments, both the redox promotor and the acid promotor are impregnated onto the reducible metal oxide support component. In some embodiments, at least a portion of the redox promotor and at least a portion of the acid promotor are supported on the reducible metal oxide support in the form of a mixed metal oxide. In some embodiments, the redox promotor is impregnated onto the reducible metal oxide, and at least a portion of the acid promotor is disposed on the redox promotor.

In some embodiments, the acidic promotor is present in an amount ranging from about 2% to about 20% by weight, based on the total weight of the catalyst composition. In some embodiments, the acidic promotor is present in an amount ranging from about 6% to about 10% by weight, based on the total weight of the catalyst composition. In some embodiments, the acidic promotor is niobium (V) oxide ($Nb_2O_5$).

In some embodiments, the redox promotor is present in an amount ranging from about 0.2% to about 10% by weight, based on the total weight of the catalyst composition. In some embodiments, the redox promotor is present in an amount ranging from about 0.5% to about 3% by weight, based on the total weight of the catalyst composition.

In some embodiments, the redox promotor comprises an oxide of copper, manganese, iron, cobalt, nickel, or a combination thereof. In some embodiments, the redox promotor comprises an oxide of copper, manganese, or a combination thereof. In some embodiments, the redox promotor further comprises an oxide of iron.

In some embodiments, the reducible metal oxide support comprises at least about 20% ceria by weight by weight of the reducible metal oxide support; the redox promotor comprises an oxide of copper, an oxide of manganese, or both, wherein each oxide present is in an amount ranging from about 0.5% to about 10% by weight on an oxide basis, based on the total weight of the catalyst composition, and optionally, an oxide of iron in an amount ranging from about 0.1% to about 10% by weight on an oxide basis, based on the total weight of the catalyst composition; and the acidic promotor is niobium (V) oxide ($Nb_2O_5$), present in an amount ranging from about 6% to about 10% by weight on an oxide basis, based on the total weight of the catalyst composition. In some embodiments, the oxide of iron is $Fe_2O_3$ present in an amount ranging from about 2% to about 8% by weight on an oxide basis, based on the total weight of the catalyst composition.

In some embodiments, the catalyst composition further comprises a non-reducible refractory metal oxide support selected from alumina, zirconia, titania, silica, and combinations thereof.

In some embodiments, an ammonia storage capacity of the catalyst composition, as measured by temperature programmed desorption (TPD) with $NH_3$ adsorption temperature at 40° C., is less than about 200 μmoles per gram of catalyst composition.

In some embodiments, the catalyst composition, after aging at 650° C. for 50 hours in air in the presence of about 10%, water vapor, the conversion of nitrogen oxides ($NO_x$) in a gas stream at 200° C. is greater than about 70% when the catalyst composition is tested under the following conditions: at an exhaust gas hourly volume-based space velocity of 250,000 $h^{-1}$, the exhaust gas comprising a gas mixture of 500 ppm NO, 500 ppm $NH_3$, 10% $O_2$, 5% $CO_2$, 5% $H_2O$ and the balance $N_2$.

In another aspect is provided an SCR catalyst article effective to abate nitrogen oxides ($NO_x$) from an internal combustion engine exhaust gas. The SCR catalyst article comprises a substrate having the selective catalytic reduction (SCR) catalyst composition as disclosed herein, disposed on at least a portion thereof.

In some embodiments, the substrate is a honeycomb substrate. In some embodiments, the honeycomb substrate is a flow-through substrate or a wall-flow filter.

In another aspect is provided an exhaust gas treatment system comprising the SCR catalyst article as disclosed herein, positioned downstream from and in fluid communication with an internal combustion engine that produces an exhaust gas stream.

In some embodiments, the SCR catalyst article is in a close coupled position the exhaust gas treatment system further comprising a conventional SCR catalyst article positioned downstream from and in fluid communication with the SCR catalyst article, the conventional SCR catalyst article comprising a copper- or iron-promoted zeolite. In some embodiments, the exhaust gas treatment system comprises a first urea injector disposed upstream from and in fluid communication with the SCR catalyst article, and a second urea injector disposed downstream from the SCR catalyst article, and upstream from and in fluid communication with the conventional SCR catalyst article.

In a further aspect is provided a method of treating an exhaust gas stream from an internal combustion engine. The method of treating an exhaust gas stream from an internal combustion engine comprises contacting the exhaust gas stream with the catalyst article, or the exhaust gas treatment system, each as disclosed herein, for a time and at a temperature sufficient to reduce the level of nitrogen oxides ($NO_x$) in the exhaust gas stream.

In yet another aspect is provided a method for preparing a selective catalytic reduction (SCR) catalyst composition comprising a reducible metal oxide support comprising ceria, a redox promotor comprising one or more transition metal oxides, and an acidic promotor comprising an oxide of niobium, tungsten, silicon, or a combination thereof, wherein the redox promotor and the acid promotor are supported on the reducible metal oxide support. The method comprises: contacting the reducible metal oxide support with a redox promotor precursor and an acidic promotor precursor; and calcining the reducible metal oxide support.

In some embodiments, contacting comprises sequentially impregnating the reducible metal oxide support first with the redox promotor precursor, followed by a second impregnation with the acidic promotor precursor. In some embodiments, contacting comprises sequentially impregnating the reducible metal oxide support first with the acidic promotor precursor, followed by a second impregnation with the redox promotor precursor. In some embodiments, contacting comprises co-impregnating the reducible metal oxide support with the redox promotor precursor and the acidic promotor precursor.

In some embodiments, calcining comprises one or more of calcining the reducible metal oxide support after the first impregnation and calcining the reducible metal oxide support after the second impregnation.

In some embodiments, calcining comprises calcining the reducible metal oxide support after the first impregnation and calcining the reducible metal oxide support after the second impregnation.

In some embodiments, the acidic promotor precursor is a niobium (V) salt or a tungsten (VI) salt. In some embodiments, the acidic promotor precursor is ammonium niobium oxalate.

In some embodiments, the redox promotor precursor comprises a salt of copper, manganese, iron, or any combination thereof. In some embodiments, the redox promotor precursor comprises an acidic copper salt. In some embodiments, the redox promotor precursor comprises a basic copper salt. In some embodiments, the redox promotor precursor comprises $[Cu(NH_4)]^{2+}$.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise. Other aspects and advantages of the present disclosure will become apparent from the following.

BRIEF DESCRIPTION OF THE DRAWINGS

In order to provide an understanding of embodiments of the disclosure, reference is made to the appended drawings, in which reference numerals refer to components of example embodiments of the disclosure. The drawings are provided as examples only and should not be construed as limiting the disclosure. The disclosure described herein is illustrated by way of example and not by way of limitation in the accompanying figures. For simplicity and clarity of illustration, features illustrated in the figures are not necessarily drawn to scale. Further, where considered appropriate, reference labels have been repeated among the figures to indicate corresponding or analogous elements.

FIGS. 3A, 313, and 3C illustrate three possible coating configurations according to some embodiments of the present disclosure.

Figure 1:
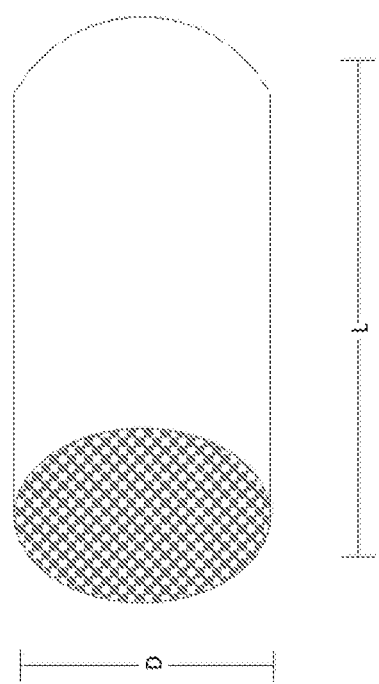
FIG. 1 depicts a perspective view of a wall-flow filter substrate.

The examples referenced in each figure are described in further detail below.

Definitions

With respect to the terms used in this disclosure, the following definitions are provided.

The articles "a" and "an" herein refer to one or to more than one (e.g. at least one) of the object. As such, the terms "a" (or "an"), "one or more", and "at least one" are used interchangeably herein. Any ranges cited herein are inclusive unless otherwise indicated herein. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1%, or ±0.05%. All numeric values are modified by the term "about" whether or not explicitly indicated. Numeric values modified by the term "about" include the specific identified value. For example, "about 5.0" includes 5.0.

Recitation of ranges of values herein are merely intended to serve as a shorthand method of referring individually to each separate value falling within the range, unless otherwise indicated herein, and each separate value is incorporated into the specification as if it were individually recited herein.

As used herein, the term "abatement" means a decrease in the amount, caused by any means.

As used herein, "$AMO_x$" refers to a selective ammonia oxidation catalyst. The $AMO_x$ may be a catalyst containing one or more metals (such as Pt, although not limited thereto) and an SCR catalyst suitable to convert ammonia to nitrogen.

As used herein, the term "BET surface area" has its usual meaning, referring to the Brunauer, Emmett, Teller method for determining surface area by $N_2$ adsorption. Pore diameter and pore volume can also be determined using BET-type $N_2$ adsorption or desorption experiments.

As used herein, the term "catalyst" refers to a material that promotes a chemical reaction.

As used herein, the term "catalytic article" or "catalyst article" refers to a component that is used to promote a desired reaction. The present catalytic articles comprise a "substrate" having at least one catalytic coating disposed thereon.

As used herein, "CSF" refers to a catalyzed soot filter, which is a wall-flow monolith. A wall-flow filter comprises alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, a CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. A CSF, when positioned behind a LNT catalyst, can have a $H_2S$ oxidation functionality to suppress $H_2S$ emission during the LNT desulfation process. An SCR catalyst composition can also be coated directly onto a wall-flow filter, which is referred to as SCRoF.

As used herein, "DOC" refers to a diesel oxidation catalyst. A DOC may convert hydrocarbons and carbon monoxide in the exhaust gas of a diesel engine. A DOC may comprise one or more platinum group metals such as palladium and/or platinum; a support material such as alumina; zeolites for 1-IC storage; and optionally promotors and/or stabilizers.

In general, the term "effective" is used to mean, for example, from about 35% to about 100% effective, for instance from about 40%, about 45%, about 50%, or about 55% to about 60%, about 65%, about 70%, about 75%, about 80%, about 85%, about 90%, or about 95%, regarding the defined catalytic activity or storage/release activity, by weight or by moles.

The term "exhaust stream" or "exhaust gas stream" are used herein to refer to any combination of flowing gas that may contain solid or liquid particulate matter. The stream comprises gaseous components and is for example exhaust of an internal combustion engine, which may contain certain non-gaseous components such as liquid droplets, solid particulates and the like. The exhaust gas stream of a combustion engine may further comprise combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, "impregnated" or "impregnation" refers to permeation of the catalytic material into the porous structure of the support material.

The term "in fluid communication" is used herein to refer to articles positioned on the same exhaust line, e.g., a common exhaust stream passes through articles that are in fluid communication with each other. Articles in fluid communication may be adjacent to each other in the exhaust line. Alternatively, articles in fluid communication may be separated by one or more articles, such as "washcoated monoliths."

As used herein, "LNT" refers to a lean $NO_x$ trap. An LNT may be a catalyst containing a platinum group metal, ceria, and an alkaline earth trap material suitable to adsorb $NO_x$ during lean conditions (for example, BaO or MgO). Under rich conditions, $NO_x$ is released and reduced to nitrogen.

As used herein, the phrase "molecular sieve" refers to framework materials such as zeolites and other framework materials (e.g. isomorphously substituted materials), which may in particulate form, and in combination with one or more promotor metals, be used as catalysts. Molecular sieves are materials based on an extensive three-dimensional network of oxygen ions containing generally tetrahedral type sites and having a substantially uniform pore distribution, with the average pore size being no larger than about 20 Angstroms (Å).

Molecular sieves can be differentiated mainly according to the geometry of the voids which are formed by the rigid network of the $SiO_4/AlO_4$ tetrahedra. The entrances to the voids are formed from 6, 8, 10, or 12 ring atoms with respect to the atoms which form the entrance opening. Molecular sieves are crystalline materials having rather uniform pore sizes which, depending upon the type of molecular sieves and the types and amounts of cations included in the molecular sieves lattice, range from about 3 Å to about 10 Å in diameter.

As used herein, the term "zeolite" refers to a specific example of a molecular sieve. Generally, a zeolite is defined as an aluminosilicate with an open 3-dimensional framework structure composed of corner-sharing $TO_4$ tetrahedra, where T is Al or Si. For purposes of this disclosure, the term "aluminosilicate zeolites" does not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates. For the purposes of this disclosure, SAPO, A IPO and MeAlPO materials are considered non-zeolitic molecular sieves. A zeolite may comprise $SiO_4/AlO_4$ tetrahedra that are linked by common oxygen atoms to form a three-dimensional network. Cations that balance the charge of the anionic framework are loosely associated with the framework oxygens, and the remaining pore volume is filled with water molecules. The non-framework cations are generally exchangeable, and the water molecules removable. A wide variety of cations can occupy these pores and can move through these channels.

The terms "on" and "over" in reference to a coating layer may be used synonymously. AS used herein, the term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

"SCRoF" refers to an SCR catalyst composition coated directly onto a wall-flow filter.

As used herein, "substantially free" means "little or no" or "no intentionally added" and also having only trace and/or inadvertent amounts. For instance, "substantially free" means less than 2 wt % (weight %), less than 1.5 wt %, less than 1.0 wt %, less than 0.5 wt %, 0.25 wt % or less than 0.01 wt %, based on the weight of the indicated total composition.

As used herein, the term "substrate" refers to the monolithic material onto which the catalyst composition, that is, catalytic coating, is disposed, such as in the form of a washcoat.

In some embodiments, the substrates are flow-through monoliths and monolithic wall-flow filters. Reference to "monolithic substrate" means a unitary structure that is homogeneous and continuous from inlet to outlet.

As used herein, the term "supported" means "dispersed on", "incorporated into", "impregnated onto". "on", "in". "deposited on", or otherwise associated with.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold and a downstream zone may be further away from the engine or manifold.

As used herein, "washcoat" has its usual meaning in the art of a thin, adherent coating of a material (e.g., a catalyst) applied to a "substrate", such as a honeycomb flow-through monolith substrate or a filter substrate which is sufficiently porous to permit the passage therethrough of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A washcoat may be formed by preparing a slurry containing a specified solids content (e.g., about 10-50% by weight) of catalyst in a liquid, which is then coated onto a substrate and dried to provide a washcoat layer. A substrate can contain one or more washcoat layers, and each washcoat layer can be different in some way (e.g., may differ in physical properties thereof such as, for example particle size or crystallite phase) and/or may differ in the chemical catalytic functions.

Unless otherwise indicated, all parts and percentages are by weight. "Weight percent (wt %)," or "percent by weight", if not otherwise indicated, is based on an entire composition free of any volatiles, that is, based on dry solids content.

SCR Catalyst Composition

In one aspect of the disclosure is provided a selective catalytic reduction (SCR) catalyst composition effective for the abatement of nitrogen oxides ($NO_x$) in an exhaust gas stream. The SCR catalyst composition comprises a reducible metal oxide support comprising ceria ($CeO_2$); a redox promotor comprising one or more transition metal oxides; and an acidic promotor comprising an oxide of niobium, tungsten, silicon, molybdenum, or a combination thereof, wherein the redox promotor and the acid promotor are supported on the reducible metal oxide support. Each of the individual components of the catalyst composition are described further herein below.

Reducible Metal Oxide Support

The SCR catalyst composition, as disclosed herein, comprises a reducible metal oxide support comprising ceria ($CeO_2$). As used herein, the term "support" refers to a material that receives the redox promotor and/or acidic promotor through precipitation, association, dispersion, impregnation, or other suitable methods. "Reducible metal oxide" refers to a metal oxide which, when subjected to a reducing atmosphere (e.g., hydrogen), contains at least a portion of the metal atoms within the metal oxide in a reduced valence state. For example, cerium in ceria ($CeO_2$; $Ce^{4+}$), when subjected to reducing conditions, may contain at least a portion of the cerium atoms in the $Ce^{3+}$ valence state.

The quantity of ceria present in the reducible metal oxide support may vary. In some embodiments, the reducible metal oxide support comprises ceria in an amount ranging from about 20% to about 100% by weight, on an oxide basis, of the reducible metal oxide support. In certain embodiments, the reducible metal oxide support comprises at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, at least about 99%, or even at least about 99.9% ceria (on an oxide basis, based on the entire weight of the reducible metal oxide support). In some embodiments, the reducible metal oxide support is ceria in an amount of 100% by weight, on an oxide basis. In some embodiments, the reducible metal oxide support can be described as consisting of ceria or consisting essentially of ceria. The reducible metal oxide support can, in some embodiments, be described as being substantially free of other metal oxides.

In some embodiments, the reducible metal oxide support may comprise, in addition to ceria, various metal components, generally in the form of a metal oxide, and may form a mixed oxide with the ceria. Such embodiments may also be referred to as "doped." Non-limiting examples of such metal oxides that may be included in the reducible metal oxide support include zirconia, alumina, silica, titania, baria, tin oxide, oxides of rare earth metals, and combinations thereof. The term "rare earth metal" refers to scandium, yttrium, niobium, and metals of the lanthanide series as defined in the Periodic Table of Elements. Lanthanide series metals include cerium, praseodymium, neodymium, promethium, samarium, europium, gadolinium, terbium, dysprosium, holmium, erbium, thulium, ytterbium, and lutetium. In some embodiments, the reducible metal oxide support are selected from lanthanum, neodymium, yttrium, praseodymium, samarium, gadolinium, and mixtures thereof. Rare earth metal oxides may include various oxidation states of the rare earth metal, such as monoxide, dioxide, trioxide, tetroxide, and the like, depending on the valence of the particular element.

In some embodiments, the reducible metal oxide support comprising ceria further comprises zirconia, alumina, silica, titania, baria, tin oxide, a rare earth metal oxide, or a combination thereof. In some embodiments, the reducible metal oxide support comprising ceria further comprises an oxide of a rare earth metal, the rare earth metal selected from niobium, lanthanum, praseodymium, neodymium, yttrium, samarium, and gadolinium.

Redox Promotor

The SCR catalyst composition as disclosed herein comprises a redox promotor comprising one or more transition metal oxides. As used herein, the term "transition metal oxide" refers to any oxide of a transition metal, and may include mixtures of more than one transition metal oxide. The oxide may include various oxidation states of the transition metal, such as monoxide, dioxide, trioxide, tetroxide, and the like, depending on the valence of the particular transition metal. As used herein, the term "transition metal" refers to any metal element in the d-block of the periodic table, which includes groups 3 to 12 on the periodic table, excluding the platinum group metals (i.e., rhenium, osmium, iridium, platinum, silver, gold, ruthenium, and rhodium are excluded). Transition metal oxides include, e.g., oxides of scandium, titanium, vanadium, chromium, manganese, iron, cobalt, nickel, copper, zinc, yttrium, zirconium, niobium, molybdenum, technetium, cadmium, lanthanum, hafnium, tantalum, tungsten, and mercury. In some embodiments, the transition metal oxides include oxides of one or more of chromium, manganese, iron, cobalt, nickel, copper, and zinc. In some embodiments, the transition metal oxide comprises oxides of copper, manganese, iron, cobalt, nickel, or a combination thereof. In some embodiments, the redox promotor comprises an oxide of copper, manganese, or a combination thereof. In some embodiments, the redox promotor comprises an oxide of copper and an oxide of manganese. In some embodiments, the redox promotor is copper oxide (CuO). In some embodiments, the redox promotor is an oxide of manganese, such as MnO, $MnO_2$, $Mn_2O_3$, $Mn_3O_4$, or a mixture thereof. In some embodiments, the redox promotor further comprises an iron oxide, such as FeO. $Fe_2O_3$, $Fe_3O_4$, or a mixture thereof. In some embodiments, the redox promotor is a mixture of copper oxide and an iron oxide, such as a mixture of CuO and $Fe_2O_3$. In some embodiments, the redox promotor comprises an oxide of copper and an oxide of manganese, and further comprises an iron oxide. In some embodiments, a portion or all of the redox promotor is present in combination with the acidic promotor in the form of a mixed oxide, for example, a mixed oxide of niobium and copper; niobium and manganese; niobium and iron, niobium, copper, and manganese; or niobium, copper, and iron.

The amount of the redox promotor present in the SCR catalyst composition may vary. In some embodiments, the redox promotor is present in an amount by weight ranging from about 0.1% to about 10%, based on the total weight of the catalyst composition, and calculated as the transition metal oxide. In some embodiments, the redox promotor is present in an amount by weight ranging from about 0.1%, about 0.2%%, about 0.3%, about 0.4%, about 0.5%, about 0.6%, about 0.7%, about 0.8%, about 0.9%, about 1.0%, about 1.5%, about 2.0%, about 2.5%, about 3.0%, about 3.5%, about 4.0%, about 4.5%, or about 5.0%, to about 5.5%, about 6%, about 6.5%, about 7.0%, about 7.5%, about 8.0%, about 8.5%, about 9%, about 9.5%, or about 10%, based on the total weight of the catalyst composition and calculated as the transition metal oxide. In some embodiments, the redox promotor is present in an amount of from about 0.5% to about 10% by weight, based on the total weight of the catalyst composition. In some embodiments, the redox promotor is present in an amount ranging from about 0.5% to about 3% by weight, based on the total weight of the catalyst composition.

In some embodiments, the redox promotor is copper oxide (CuO), present in an amount ranging from about 0.1% to about 10%, such as from about 0.5% to about 3% or from about 1% to about 2%, by weight on an oxide basis, based on the total weight of the catalyst composition.

In some embodiments, the redox promotor is an oxide of manganese, and is present in an amount ranging from about 0.1% to about 10%, such as from about 0.5% to about 5% or from about 1% to about 3% by weight on an oxide basis, based on the total weight of the catalyst composition.

In some embodiments, the redox promotor comprises an oxide of copper, an oxide of manganese, or both, and further comprises an oxide of iron in an amount ranging from about 0.1% to about 10% by weight on an oxide basis, based on the total weight of the catalyst composition. In some embodiments, the iron oxide is $Fe_2O_3$. In some embodiments, the $Fe_2O_3$ is present in an amount from about 2% to about 8% by weight on an oxide basis, based on the total weight of the catalyst composition.

In some embodiments, the redox promotor comprises copper oxide (CuO) and manganese oxide ($MnO_2$), the combination of both oxides present in an amount ranging from about 0.1% to about 10% by weight on an oxide basis, based on the total weight of the catalyst composition. In specific embodiments, the redox promotor comprises CuO in an amount ranging from about 0.5% to about 3%, and $MnO_2$ in an amount ranging from about 0.5% to about 7% by weight on an oxide basis. In some embodiments, the redox promotor further comprises an oxide of iron in an amount ranging from about 0.1% to about 10% by weight on an oxide basis, based on the total weight of the catalyst composition. In some embodiments, the iron oxide is $Fe_2O_3$. In some embodiments, the $Fe_2O_3$ is present in an amount ranging from about 0.5% to about 8%, such as from about 2% to about 8%, by weight on an oxide basis, based on the total weight of the catalyst composition.

In some embodiments, the redox promotor is a mixture of copper oxide (CuO) and iron oxide ($Fe_2O_3$), the combination of both oxides present in an amount ranging from about 0.1% to about 10% by weight on an oxide basis, based on the total weight of the catalyst composition. In specific embodiments, the CuO is present in an amount ranging from about 0.1% to about 2% by weight on an oxide basis, and the $Fe_2O_3$ is present in an amount ranging from about 0.1% to about 10%, such as from about 3% to about 7%, by weight on an oxide basis, based on the total weight of the catalyst composition.

Acidic Promotor

The SCR catalyst composition as disclosed herein comprises an acidic promotor. By "promotor" is meant a species that enhances activity toward a desired chemical reaction or function, in the present disclosure, reduction of $NO_x$ by ammonia. By "acidic" is meant that the promotor, when dispersed on a reducible oxide support, increases the acidity of the modified support. The increased acidity may be quantified by the increased ammonia uptake or adsorption in an ammonia adsorption-desorption experiment. Without wishing to be bound by theory, it is believed that the presence of an acidic promotor enhances the activity of the SCR catalyst by increasing a number of ammonia adsorption sites, especially the activity at low temperatures.

Examples of acidic promotors include oxides of niobium, vanadium, tungsten silicon, and molybdenum. In some embodiments, the acidic promotor comprises an oxide of niobium, tungsten, silicon, molybdenum, or a combination thereof. In some embodiments, the acidic promotor comprises an oxide of tungsten. In some embodiments, the acidic promotor is $WO_3$. In some embodiments, the acidic promotor comprises an oxide of niobium. In some embodiments, the acidic promotor is niobium (V) oxide ($Nb_2O_5$).

The amount of acidic promotor present in the catalyst composition may vary. In some embodiments, the acidic promotor is present in an amount by weight ranging from about 2% to about 15%, based on the total weight of the composition, and calculated as the metal oxide. In some embodiments, the acidic promotor is present in an amount by weight ranging from about 2.0%, about 3.0%, about 4.0%, about 5.0%, about 6%, about 7.0%, or about 8.0%, to about 9%, about 10.0%, about 11.0%, about 12.0%, about 13.0%, about 14.0%, or about 15.0% by weight, based on the weight of the composition and calculated as the metal oxide. In some embodiments, the acidic promotor is present in an amount by weight ranging from about 4% to about 12% by weight, based on the total weight of the catalyst composition and calculated as the metal oxide. In some embodiments, the acidic promotor is niobium (V) oxide ($Nb_2O_5$), present in an amount by weight ranging from about 6% to about 10% by weight, based on the total weight of the catalyst composition and calculated as the metal oxide.

Non-Reducible Refractory Metal Oxide Support

In some embodiments, the catalyst composition further comprises a non-reducible refractory metal oxide support. For example, the remainder of the catalyst composition may be supported on the non-reducible refractory metal oxide support. The term "non-reducible refractory metal oxide support" is used to distinguish from the reducible metal oxide support described herein above. As used herein, the term "refractory metal oxide" refers to a metal oxide material which exhibits chemical and physical stability at high temperatures, such as the temperatures associated with gasoline or diesel engine exhaust.

Suitable refractory metal oxides which are non-reducible include bulk alumina, zirconia, silica, magnesia, and other materials known for such use, as well as physical mixtures or chemical combinations thereof, including atomically-doped combinations and including high surface area or activated compounds such as activated alumina. "High surface area" with respect to refractory metal oxide supports refers to refractory metal oxide support particles having pores larger than 20 Å and a wide pore distribution. High surface area refractory metal oxide supports, e.g., alumina support materials, also referred to as "gamma alumina" or "activated alumina," may exhibit a BET surface area of fresh material in excess of 60 square meters per gram ("$m^2/g$"), such as up to about 200 $m^2/g$ or higher. Such activated alumina may be a mixture of the gamma and delta phases of alumina, but may also contain substantial amounts of eta, kappa and theta alumina phases. Exemplary aluminas include large pore boehmite, gamma-alumina, and delta/theta alumina. Commercial aluminas used as starting materials in exemplary processes may include activated aluminas, such as high bulk density gamma-alumina, low or medium bulk density large pore gamma-alumina, and low bulk density large pore boehmite and gamma-alumina. Such materials may provide durability to the resulting catalyst composition.

Example combinations of refractory metal oxides (e.g., doped refractory metal oxides) include but are not limited to, alumina-zirconia, lanthana-alumina, lanthana-zirconia-alumina, baria-alumina, baria-lanthana-alumina, and baria-lanthana-neodymia alumina. In certain embodiments, non-reducible refractory metal oxide supports in the SCR catalyst composition disclosed herein may be doped materials, such as Si-doped alumina materials (including, but not limited to about 1%-10% $SiO_2$—$Al_2O_3$), doped titania materials, such as Si-doped titania materials (including, but not limited to about 1%-0% $SiO_2$—$TiO_2$) or doped zirconia materials, such as Si-doped zirconia (including, but not limited to about 5%-30% $SiO_2$—$ZrO_2$).

In some embodiments, the non-reducible refractory metal oxide support is selected from alumina, zirconia, titania, silica, and combinations thereof. In some embodiments, the non-reducible refractory metal oxide support is alumina.

Preparation of the SCR Catalyst Composition

The SCR catalyst composition of the present disclosure may be prepared by contacting the reducible metal oxide support with suitable precursors of the redox promotor and the acid promotor. Alternatively, precursors of each of the reducible metal oxide support, redox promotor, and the acid promotor may be combined and allowed to react to form a mixed oxide. The term "precursor" as used herein refers to a component (e.g., metals, salts, ions, compounds, or the like) which, upon calcination or use of the catalyst, may decompose or otherwise convert to the catalytically active species (i.e., the corresponding metal oxides or a mixed oxide). Water-soluble compounds or salts or water-dispersible compounds or complexes of the redox promotor and the acid promotor may be used as the precursors as long as the liquid medium used to impregnate or deposit the precursors onto the reducible metal oxide support particles does not adversely react with the any components which may be present in the catalyst composition, and which liquid medium is capable of being removed by volatilization or decomposition upon heating and/or application of a vacuum.

The redox promotor and the acid promotor may be described as dispersed in, impregnated onto, disposed on, or contained in the reducible metal oxide support. The redox promotor and the acid promotor may be introduced into or onto the reducible metal oxide support by any suitable means, for example, impregnation, co-precipitation, or other methods known in the art. Each method is described further herein below, Impregnation In some embodiments, the method of preparing the SCR catalyst composition as disclosed herein comprises treating (impregnating) the reducible metal oxide support in particulate form with a solution comprising an acid promotor precursor and a redox promotor precursor, either individually or as a mixture. The disclosed SCR catalyst composition may, in some embodiments, be prepared via an incipient wetness impregnation method. Incipient wetness impregnation techniques, also called capillary impregnation or dry impregnation, are commonly used for the synthesis of heterogeneous materials, e.g., catalysts. For example, a precursor (e.g., an acid promotor precursor or a redox promotor precursor, or both, each as disclosed herein) is dissolved in an aqueous or organic solution and then the metal ion-containing solution is added to the material to be impregnated (e.g., the reducible metal oxide support), and which contains the same pore volume as the volume of the solution that was added. Capillary action draws the solution into the pores of the material. Solution added in excess of the material pore volume causes the solution transport to change from a capillary action process to a diffusion process, which is much slower. The impregnated material can then be dried and calcined to remove the volatile components within the solution, depositing the active species (e.g., the corresponding metal oxides) on the surface of the material. The maximum loading is limited by the solubility of the precursor in the solution. The concentration profile of the impregnated material depends on the mass transfer conditions within the pores during impregnation and drying.

The disclosed catalysts can also be prepared by the wet impregnation method, where an excess amount of a metal precursor solution is used relative to the saturation volume of the support. The excess solution may be evaporated by heating the catalyst slurry to dryness at an elevated temperature. The resulting material can be further dried and calcined as described in the dry impregnation procedures.

In some embodiments, the method for preparing the SCR catalyst composition comprises sequentially impregnating the reducible metal oxide support with the redox promotor precursor, followed by the acidic promotor precursor.

In some embodiments, the acidic promotor precursor is a salt of niobium or tungsten, such as a niobium (V) salt or a tungsten (VI) salt. Salts include, for example, nitrate, acetate, sulfate, chloride, and the like. In some embodiments, the acidic promotor precursor is niobium chloride or ammonium niobium oxalate.

In some embodiments, the redox promotor precursor comprises one or more transition metals. In some embodiments, the redox promotor precursor comprises copper, manganese, iron, or a combination thereof. For example, the redox promotor precursor may be a salt of copper (II), manganese (II), (III), or (IV), iron (III), or a combination thereof. Salts include, for example, nitrate, acetate, sulfate, chloride, and the like. In some embodiments, the redox promotor precursor is an acidic salt. By "acidic salt" is meant that the redox promotor precursor, as a solution in water, provides a pH value to the solution of less than 7.0, for example, from about 1 to about 6.5. Such salts include, but are not limited to, nitrate, acetate, sulfate, and the like. In some embodiments, the redox promotor precursor is a basic salt comprising ammonium ions. In some embodiments, the redox promotor precursor comprises or is [Cu(NH$_4$)]$^{2+}$. Such basic copper solutions may be prepared by adding excess ammonium hydroxide to a solution of a soluble copper salt, such as copper nitrate.

In certain embodiments, one or more transition metal salts (e.g., a salt of copper, manganese, iron, or a combination thereof) are impregnated onto the reducible metal oxide support, then the acidic promotor precursor (e.g., a niobium (V) salt or a tungsten (VI) salt) is impregnated onto the transition metal-impregnated reducible metal oxide support. In some embodiments, the copper-impregnated reducible metal oxide support is further impregnated with an iron salt, either before, after, or simultaneously with impregnation with the acidic promotor precursor. In a specific embodiment, a copper salt is impregnated onto the reducible metal oxide support, then a niobium (V) salt is impregnated onto the copper-impregnated reducible metal oxide support. In a specific embodiment, a copper salt is impregnated onto the reducible metal oxide support, then a niobium (V) salt and an iron salt are co-impregnated onto the copper-impregnated reducible metal oxide support. In some embodiments, copper is impregnated onto the reducible metal oxide support as the basic copper species [Cu(NH$_4$)]$^{2+}$, then niobium as ammonium niobium oxalate is impregnated onto the copper-impregnated reducible metal oxide support.

In other embodiments, the method for preparing the SCR catalyst composition comprises co-impregnating the reducible metal oxide support with one or more redox promotor precursors and the acidic promotor precursor, each as described herein above. Such techniques are known to those skilled in the art and are disclosed in, for example, U.S. Pat. Nos. 9,018,427; 7,605,107; 8,722,564; and 4,499,209, each of which is incorporated by reference herein for the relevant teachings. For example, an acidic promotor precursor and a redox promotor precursor can be combined in solution, and can be added onto a reducible metal oxide support, each as described herein above. As such, the acidic promotor and the redox promotor are homogeneously mixed and dropwise added onto the reducible metal oxide support material and simultaneously form a highly dispersed active composite on the surface of reducible metal oxide. Following co-impregnation, the SCR catalyst composition containing the redox promotor, acidic promotor, and reducible metal oxide support is generally calcined as described below. It is thus understood that co-impregnation, because of the intermixture of materials arising during co-impregnation and/or subsequent calcination, can exhibit different properties from a material wherein the acidic promotor and the redox promotor are deposited sequentially onto a reducible metal oxide support.

In some embodiments, the acidic promotor precursor for co-impregnation is a salt of niobium or tungsten, such as a niobium (V) salt or a tungsten (VI) salt. Salts include, for example, nitrate, acetate, sulfate, chloride, and the like. In some embodiments, the acidic promotor precursor is niobium chloride or ammonium niobium oxalate. In some embodiments, the redox promotor precursor comprises one or more transition metals. In some embodiments, the redox promotor precursor for co-impregnation comprises copper, manganese, iron, or a combination thereof. For example, the redox promotor precursor may be a salt of copper (II), manganese (II), (III), or (IV), iron (III), or a combination thereof. Salts include, for example, nitrate, acetate, sulfate, chloride, and the like. In some embodiments, the redox promotor precursor is a manganese salt. In some embodiments, the manganese salt is manganese nitrate. In some embodiments, a manganese salt and a niobium (V) salt are co-impregnated onto a ceria material to form a cerium/manganese/niobium mixed oxide.

In other embodiments, a copper salt is impregnated onto the reducible metal oxide support, and an iron salt and a niobium (V) salt are then co-impregnated onto the reducible metal oxide support. After calcination, at least a portion of the co-impregnated niobium and iron may be present in the form of a mixed oxide supported on the copper oxide-impregnated reducible metal oxide support. In some embodiments, copper is impregnated onto the reducible metal oxide support as the basic copper species [Cu(NH$_4$)]$^{2+}$, then niobium as ammonium niobium oxalate and iron as iron nitrate are co-impregnated onto the copper-impregnated reducible metal oxide support.

In other embodiments, an iron salt and a niobium (V) salt are co-impregnated to form an iron/niobium mixed oxide supported on the reducible metal oxide support, and a copper salt is impregnated onto the reducible metal oxide support.

Following any of the above methods for impregnating or co-impregnating the reducible metal oxide support with the redox promotor precursor and the acidic promotor precursor, the impregnated support may be calcined. An exemplary calcination process involves heat treatment in air at a temperature of from about 400° C. to about 800° C. for a time period of from about 10 minutes to about 16 hours. During the calcination step and/or during the initial phase of use of the catalytic composition, the redox promotor precursor and the acidic promotor precursor are converted into a catalytically active metal oxide form. The temperature during calcination may be less than about 750° C. In some embodiments, the calcining temperature ranges from about 300° C. to about 700° C. about 300° C. to about 600° C., about 350° C. to about 550° C., about 400° C. to about 500° C., or from about 425° C. to about 475° C. for a period of time. In some embodiments, the calcining temperature is less than about 700° C., about 600° C., about 500° C., about 450° C., about 400° C., or about 350° C., with a lower boundary of about 300° C. In some embodiments, the period of time for calcination ranges from about 1 hour to about 16 hours, about 1 to about 10 hours, or from 3 hours to about 6 hours (e.g., less than about 16 hours, about 15 hours, about 14 hours, about 13 hours, about 12 hours, about 11 hours, about 10 hours, about 9 hours, about 8 hours, about 7 hours, about 6 hours, about 5 hours, about 4 hours, about 3 hours, about 2 hours, or about 1 hour with a lower boundary of about 10 minutes). The impregnation and calcination can be repeated as needed to reach the desired level of impregnation.

In some embodiments, the calcined SCR catalyst composition, or an article comprising the composition, is aged. Aging can be conducted under various conditions and, as used herein, "aging" is understood to encompass a range of conditions (e.g., temperatures, times, and atmospheres). Exemplary aging protocols involve subjecting the calcined composition to a temperature of 650° C. for about 50 hours in 10% steam, 750° C. for about 20 hours in 10% steam, or to a temperature of 800° C. for about 16 hours in 10% steam. However, these protocols are not intended to be limiting and the temperature can be lower or higher (e.g., including but not limited to, temperatures of 400° C. and higher, e.g., about 400° C. to about 900° C., about 600° C. to about 900° C. or about 650° C. to about 900° C.); the time may be lesser or greater (e.g., including but not limited to, times of about t hour to about 50 hours or about 2 hours to about 25 hours); and the atmosphere can be modified (e.g., to have different amounts of steam and/or other constituents present therein).

SCR Catalyst Composition Activity

The SCR catalyst composition as disclosed herein is effective to decompose at least a portion of the nitrogen oxides ($NO_x$) in an exhaust gas stream. By "at least a portion" is meant some percentage of the total $NO_x$ in the exhaust gas stream is decomposed and/or reduced. For example, in some embodiments, at least about 40%, at least about 45%, at least about 50%, at least about 55%, at least about 60%, at least about 65%, at least about 70%, at least about 75%, at least about 80%, at least about 85%, at least about 90%, or at least about 95%, of the total $NO_x$ in the exhaust gas stream is decomposed and/or reduced, by weight or by moles.

In some embodiments, an SCR catalyst composition as disclosed herein can be characterized by SCR activity at various temperatures. For example, in certain embodiments, the SCR catalyst composition exhibits a $NO_x$ conversion of about 70% or greater at 200° C. after a thermal aging treatment, wherein the thermal aging treatment is conducted at 650° C. for 50 hours in the presence of 10 vol % steam and balance air. The $NO_x$ conversion percentages refer to $NO_x$ conversion of an exhaust gas having an hourly volume-based space velocity of 250,000 $h^{-1}$ under pseudo-steady state conditions and comprising a gas mixture of 500 ppm NO, 500 ppm $NH_3$, 10% 02, 5% $CO_2$, 5% $H_2O$, balance $N_2$ in a temperature ramp of 0.5° C./min from 100° C. to 450° C.

In some embodiments, an SCR catalyst composition as disclosed herein can be characterized by an ammonia desorption value of less than about 200 µmoles of ammonia ($NH_3$) per gram, when measured by temperature programmed desorption (TPD) under the following conditions: pretreatment in a flow of Air (200 SCCM) at 200° C. for 30 min; cooling to 40° C. and saturation with 500 ppm $NH_3$ in a carrier gas of $N_2$ containing 1 vol % $H_2O$ (200 SCCM in total) for 1 h; purging with $N_2$ (200 SCCM) containing 1 vol % $H_2O$ at the same temperature for 1 hr; and heating to 700° C. at a rate of 10° C./min in flow of $N_2$ (200 SCCM) containing 1 vol % $H_2O$.

In some embodiments, an SCR catalyst as disclosed herein can be characterized by exhibiting a high intensity $H_2$ consumption peak below 200° C., such as between about 160° C. and about 190° C., relative to a conventional Cu-CHA zeolite catalyst, which may have a $H_2$ consumption peak above 200° C. For example, in certain embodiments, the SCR catalyst composition disclosed herein shows first $H_2$-TPR peak below 200° C., when measured by temperature programmed reduction (TPR) under the following conditions: pretreatment in a flow of 5% $O_2$/He (40 SCCM) at 300° C. for 1 h; cooling to room temperature and purging with 10% $H_2$/Ar (40 SCCM); and heating to 850° C. at a rate of 10° C./min in flow of 10% $H_2$/Ar (40 SCCM).

SCR Catalyst Articles

In another aspect is provided a SCR catalyst article effective to abate nitrogen oxides ($NO_x$) from an internal combustion engine exhaust gas, the SCR catalyst article comprising a substrate and a washcoat comprising the SCR catalyst composition as disclosed herein, disposed on at least a portion of the substrate.

Substrate

In some embodiments, the present SCR catalyst composition is disposed on a substrate to form a SCR catalyst catalytic article. Catalytic articles comprising the substrates are generally employed as part of an exhaust gas treatment system (e.g., catalyst articles including, but not limited to, articles including the SCR catalyst composition disclosed herein). Substrates are 3-dimensional, having a length and a diameter and a volume, similar to a cylinder. The shape does not necessarily have to conform to a cylinder. The length is an axial length defined by an inlet end and an outlet end.

According to some embodiments, the substrate for the disclosed SCR catalyst(s) may be constructed of any material typically used for preparing automotive catalysts and may comprise a metal or ceramic honeycomb structure. The substrate may have a plurality of wall surfaces upon which the washcoat composition is applied and adhered, thereby acting as a substrate for the catalyst.

Ceramic substrates may be made of any suitable refractory material, e.g., cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punch-outs" in the channel walls. The metallic substrates may be employed in various shapes such as pellets, compressed metallic fibers, corrugated sheet or monolithic foam. Examples of metallic substrates include heat-resistant, base-metal alloys, including those in which iron is a substantial or major component. Such alloys may contain one or more of nickel, chromium, and aluminum, and the total of these metals may advantageously comprise at least about 15 wt % (weight percent) of the alloy, for instance, about 10 wt % to about 25 wt % chromium, about 1 wt % to about 8 wt % of aluminum, and from about 0 wt % to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

Monolithic substrate of the type having fine, parallel gas flow passages extending there through from an inlet or an outlet face of the substrate such that passages are open to fluid flow there through ("flow-through substrate") may be employed. Another substrate is of the type have a plurality of fine, substantially parallel gas flow passages extending along the longitudinal axis of the substrate where each passage may be blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. In some embodiments, the substrate is a flow-through substrate. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on or in which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 $in^3$ to about 1200 $in^3$, a cell density (inlet openings) of from about 60 cells per square inch (cpsi) to about 500 cpsi or up to about 900 cpsi, for example from about 200 cpsi to about 400 cpsi and a wall thickness of from about 50 microns to about 200 microns or to about 400 microns.

Wall-Flow Filter Substrates

In some embodiments, the substrate is a wall-flow filter, which generally has a plurality of fine, substantially parallel gas flow passages extending along the longitudinal axis of the substrate. Each passage may be blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to about 600, more usually from about 100 to about 400, cells per square inch ("cpsi"). The cells can have cross-sections that are rectangular, square, circular, oval, triangular, hexagonal, or are of other polygonal shapes. The wall-flow filter substrate can be ceramic or metallic as described above.

Figure 2:
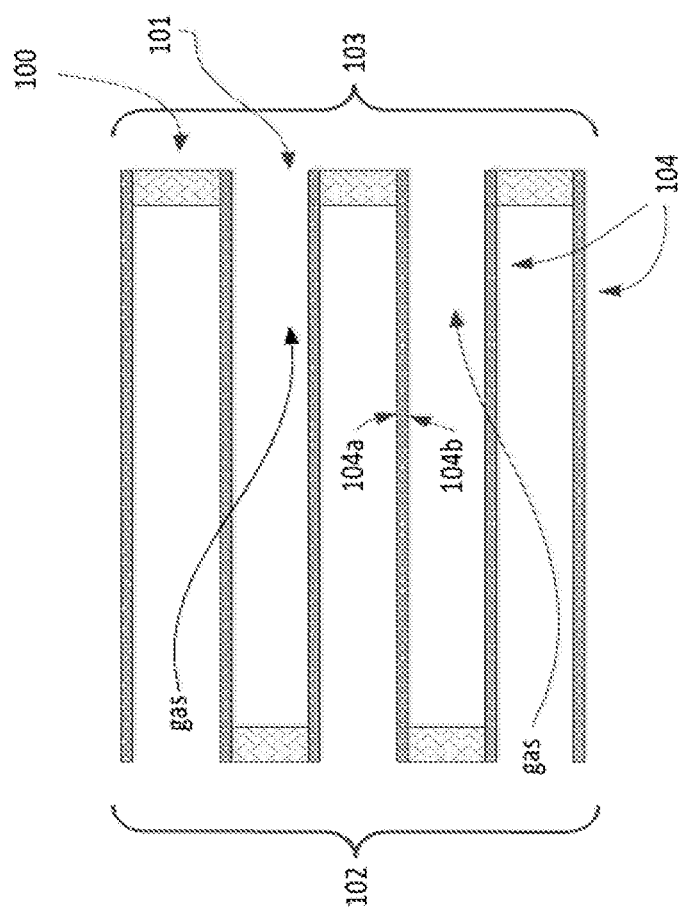
FIG. 2 depicts a cutaway view of a section enlarged relative to FIG. 1 wherein the honeycomb-type substrate in FIG. 1 represents a wall-flow filter.

Referring to FIG. 1, the exemplary wall-flow filter substrate has a cylindrical shape and a cylindrical outer surface having a diameter D and an axial length L. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall has an inlet side 104a and outlet side 104b. The passages are enclosed by the cell walls. The wall-flow filter article substrate may have a volume of, for instance, from about 50 $in^3$, about 100 $in^3$, about 200 $in^3$, about 300 $in^3$, about 400 $in^3$, about 500 $in^3$, about 600 $in^3$, about 700 $in^3$, about 800 $in^3$, about 900 $in^3$, or about 1000 $in^3$ to about 1500 $in^3$, about 2000 $in^3$, about 2500 $in^3$, about 3000 $in^3$, about 3500 $in^3$, about 4000 $in^3$, about 4500 $in^3$, or about 5000 $in^3$). Wall-flow filter substrates may have a wall thickness from about 50 microns to about 2000 microns, for example from about 50 microns to about 450 microns or from about 150 microns to about 400 microns.

The walls of the wall-flow filter are porous and may have a wall porosity of at least about 40% or at least about 50% with an average pore diameter of at least about 10 microns prior to disposition of the functional coating. For instance, the wall-flow filter article substrate in some embodiments may have a porosity of ≥40%, ≥50%, ≥60%, ≥65%, or ≥70%. For instance, the wall-flow filter article substrate may have a wall porosity of from about 50%, about 60%, about 65%, or about 70% to about 75% and an average pore diameter of from about 10 microns or about 20 microns to about 30 microns or about 40 microns prior to disposition of a catalytic coating. As used herein, the terms "wall porosity" and "substrate porosity" mean the same thing and are interchangeable. Porosity is the ratio of void volume (or pore volume) divided by the total volume of a substrate material. Pore size and pore size distribution are typically determined by Hg porosimetry measurement.

Substrate Coating Process

To produce SCR catalytic articles of the present disclosure, a substrate as described herein is contacted with an SCR catalyst composition as disclosed herein to provide a coating (e.g., a slurry comprising particles of the catalyst composition are disposed on a substrate). The coatings are "catalytic coating compositions" or "catalytic coatings." A "catalyst composition" and a "catalytic coating composition" are synonymous.

In addition to the catalyst composition, the coating slurry may optionally contain a binder in the form of alumina, silica, zirconium acetate, colloidal zirconia, or zirconium hydroxide; associative thickeners; and/or surfactants (including anionic, cationic, non-ionic or amphoteric surfactants). Other exemplary binders include bohemite, gamma-alumina, or delta/theta alumina, as well as silica sol. When present, the binder may be used in an amount of about 1-5 wt % of the total washcoat loading. Addition of acidic or basic species to the slurry can be carried out to adjust the pH accordingly. For example, in some embodiments, the pH of the slurry is adjusted by the addition of ammonium hydroxide or aqueous nitric acid. A pH range for the slurry may be about 3 to about 6.

The slurry can be milled to reduce the particle size and enhance particle mixing. The milling can be accomplished in a ball mill, continuous mill, or other similar equipment, and the solids content of the slurry may be, e.g. about 20-60 wt %, such as about 20-40 wt %. In one embodiment, the post-milling slurry is characterized by a $D_{90}$ particle size of about 10 to about 40 microns, preferably 10 to about 30 microns, more preferably about 10 to about 15 microns. The $D_{90}$ is determined using a dedicated particle size analyzer.

The present SCR catalyst composition may, for example, be applied in the form of one or more washcoats containing the SCR catalyst composition as disclosed herein. A washcoat is formed by preparing a slurry containing a specified solids content (e.g., about 10% to about 60% by weight) of catalyst in a liquid vehicle, which is then applied to a substrate using any washcoat technique known in the art and dried and calcined to provide a coating layer. If multiple coatings are applied, the substrate is dried and/or calcined after each washcoat is applied and/or after the number of desired multiple washcoats are applied. In one or more embodiments, the catalytic material(s) are applied to the substrate as a washcoat.

In some embodiments, the drying is performed at a temperature of from about 100° C. to about 150° C. In some embodiments, drying is performed in a gas atmosphere. In some embodiments, the gas atmosphere comprises oxygen. In some embodiments, the drying is performed for a duration of time in the range of from about 10 minutes to about 4 hours, such as in the range of from about 20 minutes to about 3 hours or from about 50 minutes to about 2.5 hours.

In some embodiments, the calcination is performed at a temperature of from about 300° C. to about 900° C., from about 400° C. to about 650° C. or from about 450° C. to about 600° C. In some embodiments, the calcination is performed in a gas atmosphere. In some embodiments, the gas atmosphere comprises oxygen. In some embodiments, the calcination is performed for a duration of time in the range of from about 10 minutes to about 8 hours, from about 20 minutes to about 3 hours, or from about 30 minutes to about 2.5 hours.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat layer (coating layer) can be repeated as needed to build the coating to the desired loading level or thickness, meaning more than one washcoat may be applied.

The present SCR catalytic coating may comprise one or more coating layers, where one or more layer comprises the present SCR catalyst composition. The catalytic coating may comprise one or more thin, adherent coating layers disposed on and in adherence to least a portion of a substrate. The entire coating comprises the individual "coating layers."

Coating Configurations

In some embodiments, the present SCR catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. A catalytic coating may be on the substrate wall surfaces and/or in the pores of the substrate walls, that is "in" and/or "on" the substrate walls. Thus, the phrase "a washcoat disposed on the substrate" means on any surface, for example on a wall surface and/or on a pore surface.

The washcoat(s) can be applied such that different coating layers may be in direct contact with the substrate. Alternatively, one or more "undercoats" may be present, so that at least a portion of a catalytic coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Alternatively, the present catalyst composition may be in a top coating layer over a bottom coating layer. The catalyst composition may be present in a top and a bottom layer. Any one layer may extend the entire axial length of the substrate, for instance a bottom layer may extend the entire axial length of the substrate and a top layer may also extend the entire axial length of the substrate over the bottom layer. Each of the top and bottom layers may extend from the inlet and/or outlet end.

For example, both bottom and top coating layers may extend from the same substrate end where the top layer partially or completely overlays the bottom layer and where the bottom layer extends a partial or full length of the substrate and where the top layer extends a partial or full length of the substrate. Alternatively, a top layer may overlay a portion of a bottom layer. For example, a bottom layer may extend the entire length of the substrate and the top layer may extend about 10%, about 20%, about 30% about 40%, about 50%, about 60%, about 70%, about 80%, or about 90% of the substrate length, from the inlet and/or outlet end.

Alternatively, a bottom layer may extend about 10%, about 15%, about 25%, about 30%, about 40%, about 45%, about 50%, about 55%, about 60%, about 65%, about 70%, about 75%, about 80%, about 85%, or about 95% of the substrate length from either the inlet end and/or outlet end and a top layer may extend about 10%, about 15%, about 25%, about 30%, about 40%, about 45%, about 50%, about 55%, about 60%, about 65%, about 70%, about 75%, about 80%, about 85%, or about 95% of the substrate length from the inlet end and/or outlet end, wherein at least a portion of the top layer overlays the bottom layer. This "overlay" zone may for example extend from about 5% to about 80% of the substrate length, for example about 5%, about 10%, about 20%, about 30%, about 40%, about 50%, about 60%, or about 70% of the substrate length.

In some embodiments, the SCR catalyst composition as disclosed herein, disposed on the substrate as disclosed herein, comprises a first washcoat disposed on at least a portion of the length of the catalyst substrate.

In some embodiments, the first washcoat is disposed directly on the catalyst substrate, and a second washcoat (either the same or comprising a different catalyst or catalyst component) is disposed on at least a portion of the first washcoat. In some embodiments, the second washcoat is disposed directly on the catalyst substrate, and the first washcoat is disposed on at least a portion of the second washcoat. In some embodiments, the first washcoat is disposed directly on the catalyst substrate from the inlet end to a length of from about 10% to about 50% of the overall length; and the second washcoat is disposed on at least a portion of the first washcoat. In some embodiments, the second washcoat is disposed directly on the catalyst substrate from the inlet end to a length of from about 50% to about 100% of the overall length; and the first washcoat is disposed on at least a portion of the second washcoat. In some embodiments, the first washcoat is disposed directly on the catalyst substrate from the inlet end to a length of from about 20% to about 40% of the overall length, and the second washcoat extends from the inlet end to the outlet end. In some embodiments, the first washcoat is disposed directly on the catalyst substrate from the outlet end to a length of from about 10% to about 50% of the overall length, and the second washcoat is disposed on at least a portion of the first washcoat. In some embodiments, the first washcoat is disposed directly on the catalyst substrate from the outlet end to a length from about 20% to about 40% of the overall length, and the second washcoat extends from the inlet end to the outlet end. In some embodiments, the second washcoat is disposed directly on the catalyst substrate from the outlet end to a length of from about 50% to about 100% of the overall length, and the first washcoat is disposed on at least a portion of the second washcoat. In some embodiments, the first washcoat is disposed directly on the catalyst substrate covering 100% of the overall length, and the second washcoat is disposed on the first washcoat covering 100% of the overall length. In some embodiments, the second washcoat is disposed directly on the catalyst substrate covering 100% of the overall length, and the first washcoat is disposed on the second washcoat covering 100% of the overall length.

The catalytic coating may advantageously be "zoned," comprising zoned catalytic layers, that is, where the catalytic coating contains varying compositions across the axial length of the substrate. This configuration may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60%, or about 70% of the substrate length.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones.

For instance, the SCR article may comprise an upstream zone comprising the first washcoat layer; and a downstream zone comprising the second washcoat layer comprising a different catalyst material or component. Alternatively, an upstream zone may comprise the second washcoat layer and a downstream zone may comprise the first washcoat layer.

In some embodiments, the first washcoat is disposed on the catalyst substrate from the inlet end to a length of from about 10% to about 50% of the overall length; and the second washcoat is disposed on the catalyst substrate from the outlet end to a length of from about 50% to about 90% of the overall length. In some embodiments, the first washcoat is disposed on the catalyst substrate from the outlet end to a length of from about 10% to about 50% of the overall length; and wherein the second washcoat is disposed on the catalyst substrate from the inlet end to a length of from about 50% to about 90% of the overall length.

Figure 3A:
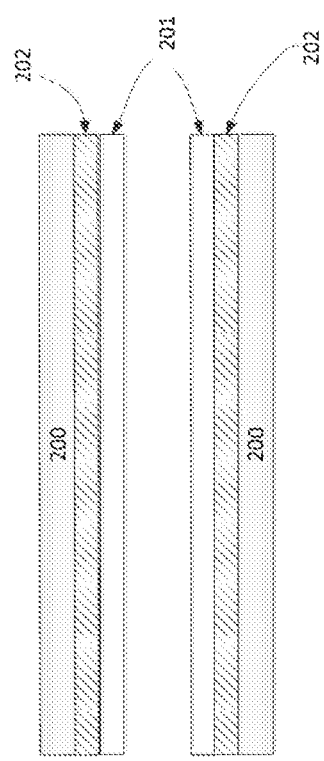
Figure 3B:
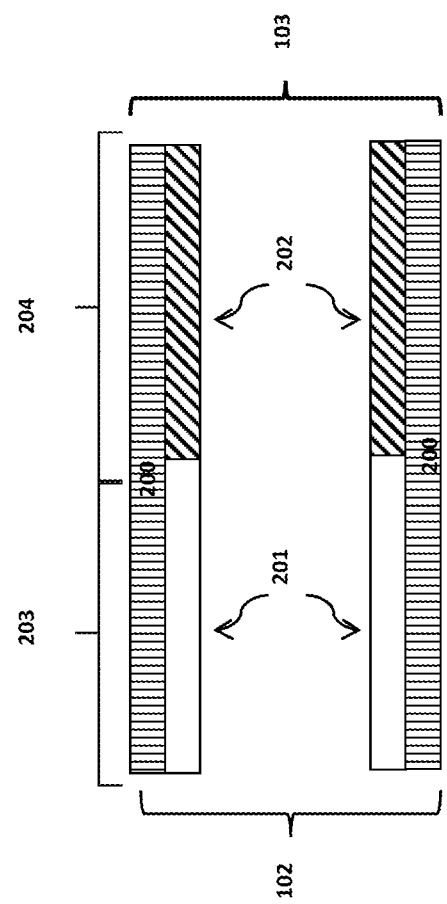
Figure 3C:
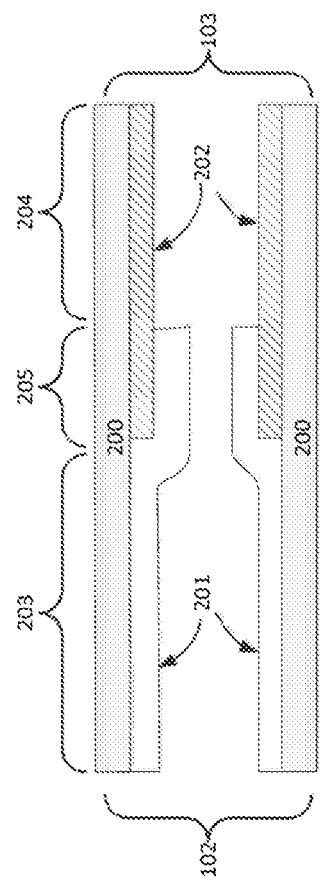

FIGS. 3a, 3b, and 3c show some possible coating layer configurations with two coating layers, such as SCR catalyst composition coatings on a wall-flow filter substrate or a monolithic flow-through substrate according to some embodiments of the present disclosure. Shown are substrate walls 200 onto which coating layers 201 (top coat) and 202 (bottom coat) are disposed. This is a simplified illustration, and in the case of a porous wall-flow filter substrate, not shown are pores and coatings in adherence to pore walls and not shown are plugged ends. In FIG. 3a, coating layers 201 and 202 each extend the entire length of the substrate with top layer 201 overlaying bottom layer 202. The substrate of FIG. 3a does not contain a zoned coating configuration. FIG. 3b is illustrative of a zoned configuration having a coating layer 202 which extends from the outlet about 50% of the substrate length to form a downstream zone 204, and a coating layer 201, which extends from the inlet about 50% of the substrate length, providing an upstream zone 203. In FIG. 3c, bottom coating layer 202 extends from the outlet about 50% of the substrate length and top coating layer 201 extends from the inlet greater than 50% of the length and overlays a portion of layer 202, providing an upstream zone 203, a riddle overlay zone 205 and a downstream zone 204.

In some embodiments, the substrate may be a honeycomb substrate. In some embodiments, the honeycomb substrate may be a flow-through substrate or a wall-flow filter.

Exhaust Gas Treatment System

In a further aspect is provided an exhaust gas treatment system comprising the SCR article as disclosed herein, located downstream and in fluid communication with an internal combustion engine that produces an exhaust gas stream. The engine can be, e.g., a diesel engine, which operates at combustion conditions with air in excess of that required for stoichiometric combustion, i.e., lean conditions. In some embodiments, the engine can be an engine associated with a stationary source (e.g., electricity generators or pumping stations). In some embodiments, the emission treatment system further comprises one or more additional catalytic components. The relative placement of the various catalytic components present within the emission treatment system can vary.

In the exhaust gas treatment systems and methods of the present disclosure, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

The systems disclosed herein comprise a SCR catalytic article as disclosed herein, and may further comprise one or more additional components. In some embodiments, the one or more additional components are selected from a diesel oxidation catalyst (DOC), a soot filter (which can be catalyzed or uncatalyzed), a urea injection component, an ammonia oxidation catalyst ($AMO_x$), a low-temperature $NO_x$ absorber (LT-NA), a lean $NO_x$ trap (LNT), and combinations thereof. A system may contain, for instance, an SCR catalyst as disclosed herein, a DOC, and one or more articles including a reductant injector, a soot filter, an $AMO_x$, or a LNT. An article containing a reductant injector is a reduction article. A reduction system includes a reductant injector aid/or a pump and/or a reservoir, etc. The present treatment system may further comprise a soot filter and/or an ammonia oxidation catalyst. A soot filter may be uncatalyzed or may be catalyzed (CSF). For instance, the treatment system may comprise, from upstream to downstream, an article containing a DOC, a CSF, a urea injector, a SCR article and an article containing an $AMO_x$. A LNT may also be included.

The relative placement of the various catalytic components present within the emission treatment system can vary. The treatment system is, in general, downstream of and in fluid communication with an internal combustion engine.

Figure 4:
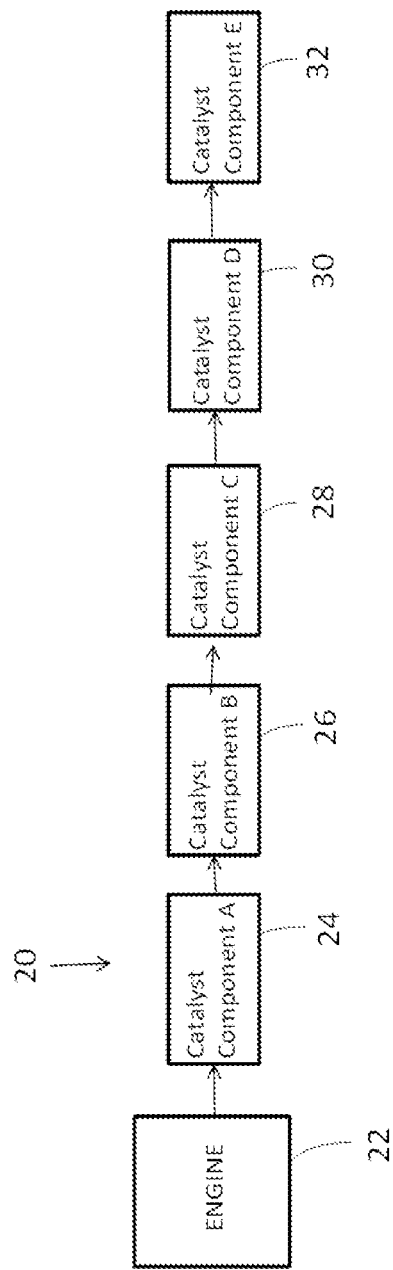
FIG. 4 shows a schematic depiction of an emission treatment system in which an SCR catalyst article according to some embodiments of the present disclosure is utilized.

One exemplary emission treatment system according to some embodiments of the present disclosure is illustrated in FIG. 4. FIG. 4 depicts a schematic representation of an emission treatment system 20. As shown, the emission treatment system can include a plurality of catalyst components in series downstream of an internal combustion engine 22, such as an internal combustion engine. One or more of the catalyst components is an SCR catalyst article as set forth herein. The SCR catalyst article may be combined with numerous additional catalyst materials and/or placed at various positions in comparison to the additional catalyst materials. FIG. 4 illustrates five catalyst components, 24, 26, 28, 30, and 32 in series; however, the total number of catalyst components can vary and five components is merely one example (e.g., one, two, three, four, five, and six components are non-limiting examples). One of skill in the art will recognize that it may be desirable to arrange the relative position of each article in a different order than illustrated herein; such alternative ordering is contemplated by the present disclosure.

Without limitation, Table 1 presents various exhaust gas treatment system configurations of some embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 4.

The LNT catalyst noted in Table 1 can be any catalyst conventionally used as a $NO_x$ trap, and may comprise $NO_x$ adsorber compositions that include base metal oxides (BaO, MgO, $CeO_2$, and, the like) and a platinum group metal for catalytic NO oxidation and reduction (e.g., Pt and Rh).

The LT-NA catalyst noted in Table 1 can be any catalyst that can adsorb $NO_x$ (e.g., NO or $NO_2$) at low temperatures (<250° C.) and release it to the gas stream at high temperatures (>250° C.). The released $NO_x$ is generally converted to $N_2$ and $H_2O$ over a down-stream SCR or SCRoF catalyst, such as disclosed herein. For example, a LT-NA catalyst may comprise Pd-promoted zeolites or Pd-promoted reducible metal oxides.

Reference to SCR in the table refers to an SCR catalyst, which may include the SCR catalyst composition of the disclosure. Reference to SCRoF (or SCR on filter) refers to a particulate or soot filter (e.g., a wall-flow filter), which can include the SCR catalyst composition of the disclosure. Where both SCR and SCRoF are present, one or both can include the SCR catalyst of the present disclosure, or one of the catalysts could include a conventional SCR catalyst.

Reference to $AMO_x$ in the table refers to an ammonia oxidation catalyst, which can be provided downstream of the catalyst of some embodiments of the disclosure to remove any slipped ammonia from the exhaust gas treatment system. In some embodiments, the $AMO_x$ catalyst may comprise a PGM component. In some embodiments, the $AMO_x$ catalyst may comprise a bottom coat with PGM and a top coat with SCR functionality.

As recognized by one skilled in the art, in the configurations listed in Table 1, any one or more of components A, B, C, D, or E can be disposed on a particulate filter, such as a wall flow filter, or on a flow-through honeycomb substrate. In some embodiments, an engine exhaust system comprises one or more catalyst components mounted in a position near the engine (in a close-coupled position, CC), with additional catalyst components in a position underneath the vehicle body (in an underfloor position, UF). In some embodiments, the exhaust gas treatment system may further comprise a urea injection component.

TABLE 1

Possible exhaust gas treatment system configurations

| Component A | Component B | Component C | Component D | Component E |
|---|---|---|---|---|
| DOC | SCR | Optional $AMO_x$ | — | — |
| DOC | SCRoF | Optional $AMO_x$ | — | — |
| DOC | SCRoF | SCR | Optional $AMO_x$ | — |
| DOC | SCR | SCRoF | Optional $AMO_x$ | — |
| DOC | SCR | SCRoF | CSF | Optional $AMO_x$ |
| DOC | SCR | CSF | Optional $AMO_x$ | — |
| DOC | CSF | SCR | Optional $AMO_x$ | — |
| LNT | CSF | SCR | Optional $AMO_x$ | — |
| LNT | SCRoF | SCR | Optional $AMO_x$ | — |
| LT-NA | CSF | SCR | Optional $AMO_x$ | — |
| LT-NA | SCRoF | SCR | Optional $AMO_x$ | — |
| DOC | LNT | CSF | SCR | Optional $AMO_x$ |
| DOC | LNT | SCRoF | SCR | Optional $AMO_x$ |
| DOC | LT-NA | CSF | SCR | Optional $AMO_x$ |
| DOC | LT-NA | SCRoF | SCR | Optional $AMO_x$ |

Figure 5:
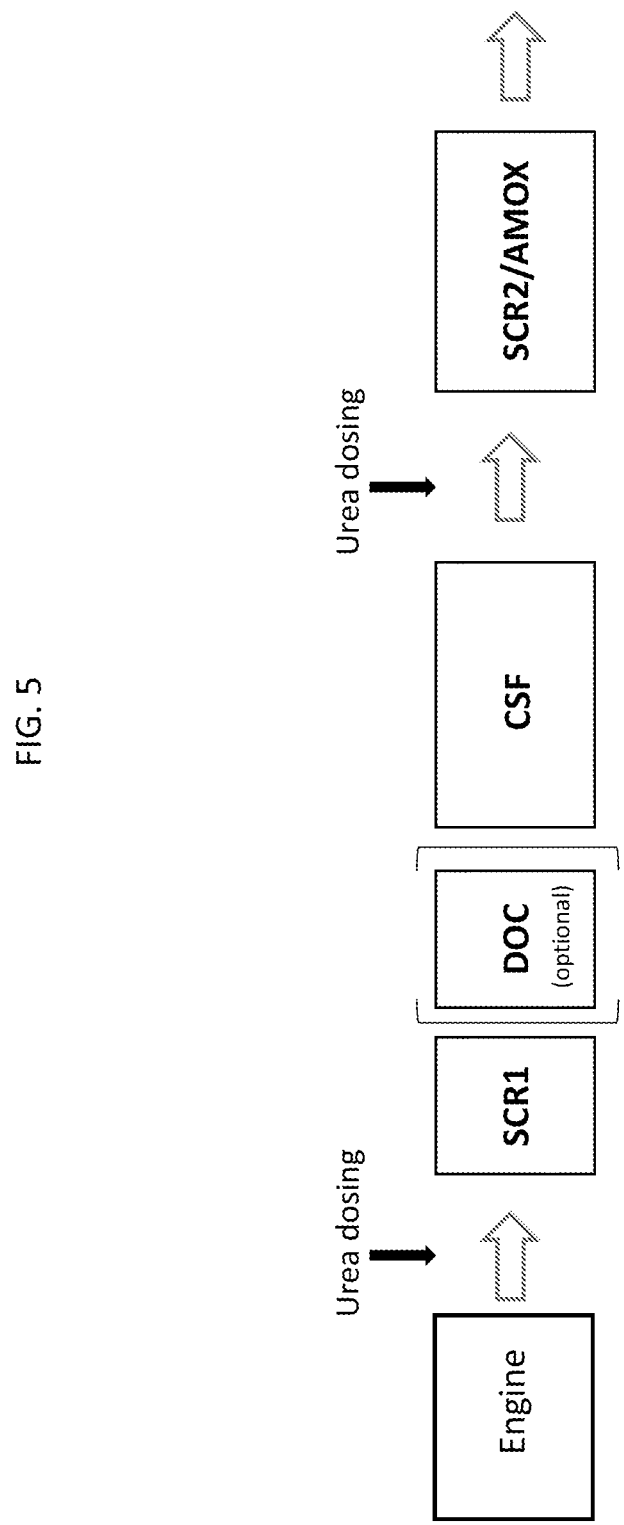
FIG. 5 shows another schematic depiction of an emission treatment system in which an SCR catalyst article is utilized, according to some embodiments of the present disclosure.

Another exemplary, non-limiting emission treatment system, according to some embodiments of the present disclosure, is illustrated in FIG. 5. FIG. 5 depicts a schematic representation of an emission treatment system in which an SCR article (SCR1) as disclosed herein is in a close-coupled position downstream from an engine and a urea injector. An optional DOC is located downstream, followed by a CSF. A second urea injector is positioned upstream from a second SCR catalyst article (SCR2), which is a conventional (e.g., metal-promoted zeolite) article, optionally combined with an $AMO_x$ article.

Method of Treating Engine Exhaust

Another aspect of the present disclosure is directed to a method of treating the exhaust gas stream of an internal combustion engine, for example, a gasoline engine or diesel engine. Generally, the method comprises contacting the exhaust gas stream with the catalytic article of the present disclosure, or the emission treatment system of the present disclosure. The method can include placing the SCR catalyst article according to one or more embodiments of the disclosure downstream from an engine and flowing the engine exhaust gas stream over the catalyst. In one or more embodiments, the method further comprises placing additional catalyst components downstream from the engine as noted above. In some embodiments, the method comprises contacting the exhaust gas stream with the catalytic article or the exhaust gas treatment system of the present disclosure, for a time and at a temperature sufficient to reduce the levels of one or more $NO_x$ components which may be present in the exhaust gas stream.

The present catalyst compositions, articles, systems, and methods may be suitable for treatment of exhaust gas streams of internal combustion engines, for example gasoline, light-duty diesel and heavy-duty diesel engines. The catalyst compositions may be also suitable for treatment of emissions from stationary industrial processes, removal of

EXAMPLES

Aspects of the present disclosure are more fully illustrated by the following examples, which are set forth to illustrate certain aspects of the present disclosure and are not to be construed as limiting thereof. Before describing several exemplary embodiments, it is to be understood that the disclosure is not limited to the details of construction or process steps set forth in the following description, and is capable of other embodiments and of being practiced or being carried out in various ways. Unless otherwise noted, all parts and percentages are by weight, and all weight percentages are expressed on a dry basis, meaning excluding water content, unless otherwise indicated.

Example 1. Copper Chabazite (Cu-CHA) Zeolite (Reference

A conventional copper-promoted chabazite SCR catalyst was prepared as a reference. Copper ions were ion-exchanged into the $H^+$ form of chabazite zeolite, and the ion-exchanged zeolite calcined to obtain the catalyst having a copper loading (measured as CuO) of 3.75 wt % to 4.5 wt %.

Example 2. 4% Niobium Oxide on Ceria

A catalyst material containing 4% niobium oxide on ceria was prepared by incipient wetness impregnation of the pre-determined volume of ammonium niobate oxalate ($C_4H_4NNbO_9$) solution (1.0 M) onto $CeO_2$, followed by calcination at 550° C. for 2 hours with a ramp rate of 5° C./min.

Example 3. 8% Niobium Oxide on Ceria

A catalyst material containing 8% niobium oxide on ceria was prepared according to Example 2, using twice the amount of ammonium niobate oxalate.

Example 4. 12% Niobium Oxide on Ceria

A catalyst material containing 12% niobium oxide on ceria was prepared according to Example 2, using three times the amount of ammonium niobate oxalate.

Example 5. 10% Tungsten Oxide on Ceria

A catalyst material containing 10% tungsten oxide on ceria was prepared by incipient wetness impregnation of the pre-determined volume of ammonium tungstate metahydrate ($H_{28}N_6O_{41}W_{12}$) solution (1.0 M) onto $CeO_2$, followed by calcination at 550° C. for 2 hours with a ramp rate of 5° C./min.

Example 6. 15% Tungsten Oxide on Ceria

A catalyst material containing 15% tungsten oxide on ceria was prepared according to Example 5, using 1.5 times the amount of ammonium tungstate metahydrate.

Example 7. 20% Tungsten Oxide on Ceria

A catalyst material containing 20% tungsten oxide on ceria was prepared according to Example 5, using twice the amount of ammonium tungstate metahydrate.

Example 8. 8% Niobium Oxide/1% Copper Oxide on Ceria (Basic Copper Source)

A catalyst material containing 8% niobium oxide and 1% copper oxide (as CuO) on ceria was prepared by incipient wetness impregnation. A 0.5M $Cu(NH_3)_4(NO_3)_2$ solution was prepared by adding 25% aqueous ammonium hydroxide (molar ratio of $NH_3$/Cu of 16) to a $Cu(NO_3)_2$ solution. A pre-determined volume of the solution was incipient wetness impregnated onto $CeO_2$, followed by calcination at 550° C. for 2 hours with a ramp rate of 5° C./min. An ammonium niobate oxalate ($C_4H_4NNbO_9$) was prepared (1.0M). A pre-determined volume of this solution was incipient wetness impregnated onto the prepared $CuO/CeO_2$, followed by calcination at 550° C. for 2 hours with ramp rate of 5° C./min.

Example 9. 8% Niobium Oxide/1% Copper Oxide on Ceria (Acidic Copper Source)

A catalyst material containing 8% niobium oxide and 1% copper oxide (as CuO) on ceria was prepared by incipient wetness impregnation. A 1.25M $Cu(NO_3)_2$ solution was prepared. A pre-determined volume of the solution was incipient wetness impregnated onto $CeO_2$, followed by calcination at 550° C. for 2 hours with a ramp rate of 5° C./min. An ammonium niobate oxalate ($C_4H_4NNbO_9$) was prepared (1.0M). A pre-determined volume of this solution was incipient wetness impregnated onto the prepared $CuO/CeO_2$, followed by calcination at 550° C. for 2 hours with ramp rate of 5° C./min.

Example 10. 8% Niobium Oxide/1% Copper Oxide on Ceria (Acidic Copper Source)

A catalyst material containing 8% niobium oxide and 1% copper oxide (as CuO) on ceria was prepared by incipient wetness co-impregnation. A solution of copper nitrate ($Cu(NO_3)_2$) and ammonium niobate oxalate ($C_4H_4NNbO_9$) was prepared (1.0M for the copper and niobium content). A pre-determined volume of the solution was incipient wetness co-impregnated onto $CeO_2$, followed by calcination at 550° C. for 2 hours with a ramp rate of 5° C./min.

Example 11. 1% Copper Oxide/8% Niobium Oxide on Ceria (Acidic Copper Source)

A catalyst material containing 8% niobium oxide and 1% copper oxide (as CuO) on ceria was prepared by incipient wetness impregnation. An ammonium niobate oxalate ($C_4H_4NNbO_9$) was prepared (1.0M). A pre-determined volume of this solution was incipient wetness impregnated onto $CeO_2$, followed by calcination at 550° C. for 2 hours with a ramp rate of 5° C./min. A 1.25M $Cu(NO_3)_2$ solution was prepared. A pre-determined volume of the solution was incipient wetness impregnated onto the prepared $Nb_2O_5/CeO_2$, followed by calcination at 550° C. for 2 hours with ramp rate of 5° C./min.

Example 12. 8% Niobium Oxide/0.5% Copper Oxide on Ceria (Basic Copper Source)

A catalyst material containing 8% niobium oxide and 0.5% copper oxide (as CuO) on ceria was prepared by incipient wetness impregnation. A 0.5M $Cu(NH_3)_4(NO_3)_2$ solution was prepared by adding 25% aqueous ammonium hydroxide (molar ratio of $NH_3$/Cu of 16) to a $Cu(NO_3)_2$ solution. A pre-determined volume of the solution was incipient wetness impregnated onto $CeO_2$, followed by calcination at 550° C. for 2 hours with a ramp rate of 5° C./min. An ammonium niobate oxalate ($C_4H_4NNbO_9$) was prepared (1.0M). A pre-determined volume of this solution was incipient wetness impregnated onto the prepared CuO/$CeO_2$, followed by calcination at 550° C. for 2 hours with ramp rate of 5° C./min.

Example 13. 8% Niobium Oxide/1.5% Copper Oxide on Ceria (Basic Copper Source)

A catalyst material containing 8% niobium oxide and 1.5% copper oxide (as CuO) on ceria was prepared by incipient wetness impregnation using the procedure of Example 12, but increasing the quantity of $Cu(NH_3)_4(NO_3)_2$ solution by three.

Example 14. 8% Niobium Oxide/3% Copper Oxide on Ceria (Basic Copper Source)

A catalyst material containing 8% niobium oxide and 3% copper oxide (as CuO) on ceria was prepared by incipient wetness impregnation using the procedure of Example 12, but increasing the quantity of $Cu(NH_3)_4(NO_3)_2$ solution by six.

Example 15. 8% Niobium Oxide/2% Manganese Oxide on Ceria

A catalyst material containing 8% niobium oxide and 2% manganese oxide (as $MnO_2$) on ceria was prepared by incipient wetness co-impregnation. A solution of manganese nitrate ($Mn(NO)_2$) and ammonium niobate oxalate ($C_4H_4NNbO_9$) was prepared (1.0M for the manganese and niobium content). A pre-determined volume of the solution was incipient wetness co-impregnated onto $CeO_2$, followed by calcination at 550° C. for 2 hours with a ramp rate of 5° C./min.

Example 16. 8% Niobium Oxide/2% Manganese Oxide on Ceria

A catalyst material containing 8% niobium oxide and 2% manganese oxide (as $MnO_2$) on ceria was prepared by incipient wetness impregnation. A 1M solution of manganese nitrate ($Mn(NO_3)_2$) was prepared. A pre-determined volume of the solution was incipient wetness impregnated onto $CeO_2$, followed by calcination at 550° C. for 2 hours with a ramp rate of 5° C./min. A 1M solution of ammonium niobate oxalate ($C_4H_4NNbO_9$) was prepared. A pre-determined volume of the solution was incipient wetness impregnated onto the $MnO_2$/$CeO_2$, followed by calcination at 550° C. for 2 hours with a ramp rate of 5° C./min.

Example 17. 2% Manganese Oxide/8% Niobium Oxide on Ceria

A catalyst material containing 8% niobium oxide and 2% manganese oxide (as $MnO_2$) on ceria was prepared by incipient wetness impregnation. A 1M solution of ammonium niobate oxalate ($C_4H_4NNbO_9$) was prepared. A pre-determined volume of the solution was incipient wetness impregnated onto $CeO_2$, followed by calcination at 550° C. for 2 hours with a ramp rate of 5° C./min. A 1M solution of manganese nitrate ($Mn(NO_3)_2$) was prepared. A pre-determined volume of the solution was incipient wetness impregnated onto the $Nb_2O_5$/$CeO_2$, followed by calcination at 550° C. for 2 hours with a ramp rate of 5° C./min.

Example 18. 8% Niobium Oxide/3% Iron Oxide/1% Copper Oxide on Ceria

A catalyst material containing 8% niobium oxide, 3% iron oxide (as $Fe_2O_3$) and 1% copper oxide (as CuO) on ceria was prepared by incipient wetness impregnation. A 0.5M $Cu(NH_3)_4(NO_3)_2$ solution was prepared by adding 25% aqueous ammonium hydroxide (molar ratio of $NH_3$/Cu of 16) to a $Cu(NO_3)_2$ solution. A pre-determined volume of the solution was incipient wetness impregnated onto $CeO_2$, followed by calcination at 550° C. for 2 hours with a ramp rate of 5° C./min. A solution of iron (III) nitrate ($Fe(NO_3)_3$) and ammonium niobate oxalate ($C_4H_4NNbO_9$) was prepared (1.0M for the iron and niobium content). A pre-determined volume of the solution was incipient wetness co-impregnated onto the prepared CuO/$CeO_2$, followed by calcination at 550° C. for 2 hours with a ramp rate of 5° C./min.

Example 19. 8% Niobium Oxide/5% Iron Oxide/1% Copper Oxide on Ceria

A catalyst material containing 8% niobium oxide, 5% iron oxide (as $Fe_2O_3$) and 1% copper oxide (as CuO) on ceria was prepared according to Example 18, but using additional iron nitrate.

Example 20. 8% Niobium Oxide/7% Iron Oxide/1% Copper Oxide on Ceria

A catalyst material containing 8% niobium oxide, 7% iron oxide (as $Fe_2O_3$) and 1% copper oxide (as CuO) on ceria was prepared according to Example 18, but using additional iron nitrate.

Examples 2-20 are summarized in terms of composition and preparative technique in Table 2 below.

TABLE 2

| | Composition and preparative method | | |
|---|---|---|---|
| Ex. # | Components (ceria plus) | | Preparative method |
| 2 | 4% $Nb_2O_5$ | — | Incipient Wetness Impregnation (IWI) |
| 3 | 8% $Nb_2O_5$ | — | IWI |
| 4 | 12% $Nb_2O_5$ | — | IWI |
| 5 | 10% $WO_3$ | — | IWI |
| 6 | 15% $WO_3$ | — | IWI |
| 7 | 20% $WO_3$ | — | IWI |
| 8 | 8% $Nb_2O_5$ | 1% CuO | IWI: Basic Cu precursor followed by Nb precursor |
| 9 | 8% $Nb_2O_5$ | 1% CuO | IWI: Acidic Cu precursor ($Cu(NO_3)_2$ followed by Nb precursor |
| 10 | 8% $Nb_2O_5$ | 1% CuO | IWI: Co-impregnation |
| 11 | 8% $Nb_2O_5$ | 1% CuO | IWI: Nb precursor followed by acidic Cu precursor |
| 12 | 8% $Nb_2O_5$ | 0.5% CuO | IWI: Basic Cu precursor followed by Nb precursor |
| 13 | 8% $Nb_2O_5$ | 1.5% CuO | IWI: Basic Cu precursor followed by Nb precursor |
| 14 | 8% $Nb_2O_5$ | 3% CuO | IWI: Basic Cu precursor followed by Nb precursor |
| 15 | 8% $Nb_2O_5$ | 2% $MnO_2$ | IWI: Co-impregnation |
| 16 | 8% $Nb_2O_5$ | 2% $MnO_2$ | IWI: Mn precursor followed by Nb precursor |
| 17 | 8% $Nb_2O_5$ | 2% $MnO_2$ | IWI: Nb precursor followed by Mn precursor |
| 18 | 8% $Nb_2O_5$ | 1% CuO; 3% $Fe_2O_3$ | IWI: Basic Cu precursor followed by Fe and Nb precursor co-impregnation |

TABLE 2-continued

Composition and preparative method

| Ex. # | Components (ceria plus) | | Preparative method |
|---|---|---|---|
| 19 | 8% $Nb_2O_5$ | 1% CuO; 4.75% $Fe_2O_3$ | IWI: Basic Cu precursor followed by Fe and Nb precursor co-impregnation |
| 20 | 8% $Nb_2O_5$ | 1% CuO; 7% $Fe_2O_3$ | IWI: Basic Cu precursor followed by Fe and Nb precursor co-impregnation |

Example 21. $NO_x$ Conversion Performance $NO_x$ conversion performance for samples of Examples 1-20 were measured in a laboratory reactor at a gas hourly volume-based space velocity of 250,000 $h^{-1}$ under pseudo-steady state conditions in a gas mixture of 500 ppm NO, 500 ppm $NH_3$, 10% $O_2$, 5% $CO_2$ (When used), 5% $H_2O$ (when used), balance $N_2$. Catalyst performance was measured between 100 and 450° C. at 25° C. intervals. Catalyst samples according to embodiments of the disclosure were evaluated in either the "fresh" form (as prepared) or as an "aged" catalyst. To provide the catalyst materials in aged form, the materials were heated in air in the presence of 10% water vapor for 50 hours at 650° C., 20 hours at 700° C., or 16 hours at 800° C.

Figure 6:
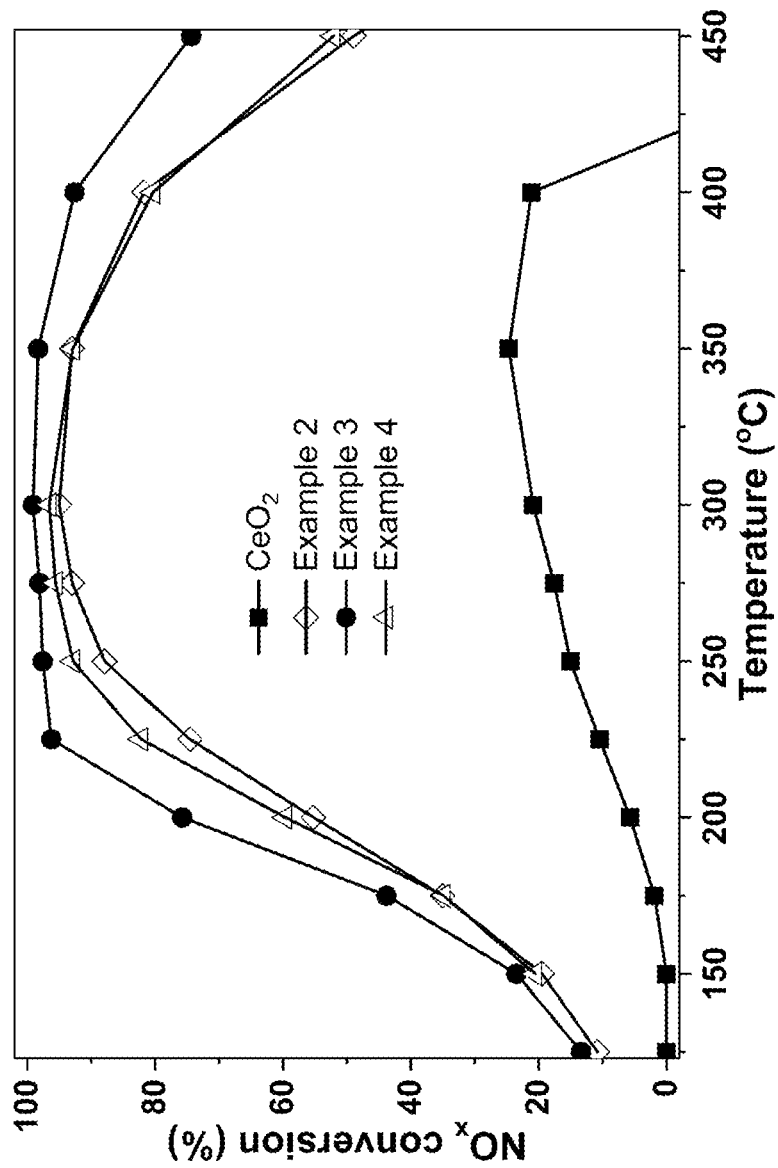
FIG. 6 depicts a plot of $NO_x$ conversion versus temperature according to some embodiments of the present disclosure.

Samples of ceria alone, along with samples of ceria impregnated with 4%, 8%, and 12% niobium (as niobium oxide; $Nb_2O_5$; Examples 2, 3, and 4, respectively), were evaluated for $NO_x$ conversion (in the absence of $H_2O$ and $CO_2$). The results demonstrated that ceria alone had little activity, but each of the niobium-impregnated examples had high levels of $NO_x$ conversion activity with Example 3 (8% $Nb_2O_5$) having the highest conversion at low temperatures (Table 3; FIG. 6).

TABLE 3

NO conversion in $NH_3$-SCR reaction on catalysts with $Nb_2O_5$ loaded on $CeO_2$

| Ex. # | Fresh/ Aged | Testing condition | $NO_x$ conversion at different temperature (%) | | | | | |
|---|---|---|---|---|---|---|---|---|
| | | | 150° C. | 200° C. | 250° C. | 300° C. | 350° C. | 400° C. |
| 2 | Fresh | No $H_2O$ and $CO_2$ | 19.5 | 55.2 | 87.9 | 95.0 | 93.0 | 81.8 |
| 3 | Fresh | No $H_2O$ and $CO_2$ | 23.5 | 75.8 | 97.6 | 99.1 | 98.3 | 92.6 |
| 3 | Aged @700 | No $H_2O$ and $CO_2$ | 20.2 | 87.9 | 100 | 100 | 100 | 100 |
| 3 | Aged @800 | No $H_2O$ and $CO_2$ | 19.6 | 79.0 | 98.4 | 100 | 98.1 | 94.0 |
| 4 | Fresh | No $H_2O$ and $CO_2$ | 20.6 | 59.7 | 92.8 | 96.6 | 92.9 | 80.3 |
| 4 | Fresh | With 5% $H_2O$ and 5% $CO_2$ | 23.5 | 75.8 | 100 | 100 | 100 | 92.6 |
| 3 | Aged @650 | With 5% $H_2O$ and 5% $CO_2$ | 21.0 | 68.5 | 94.8 | 100 | 94.6 | 78.8 |

Figure 7:
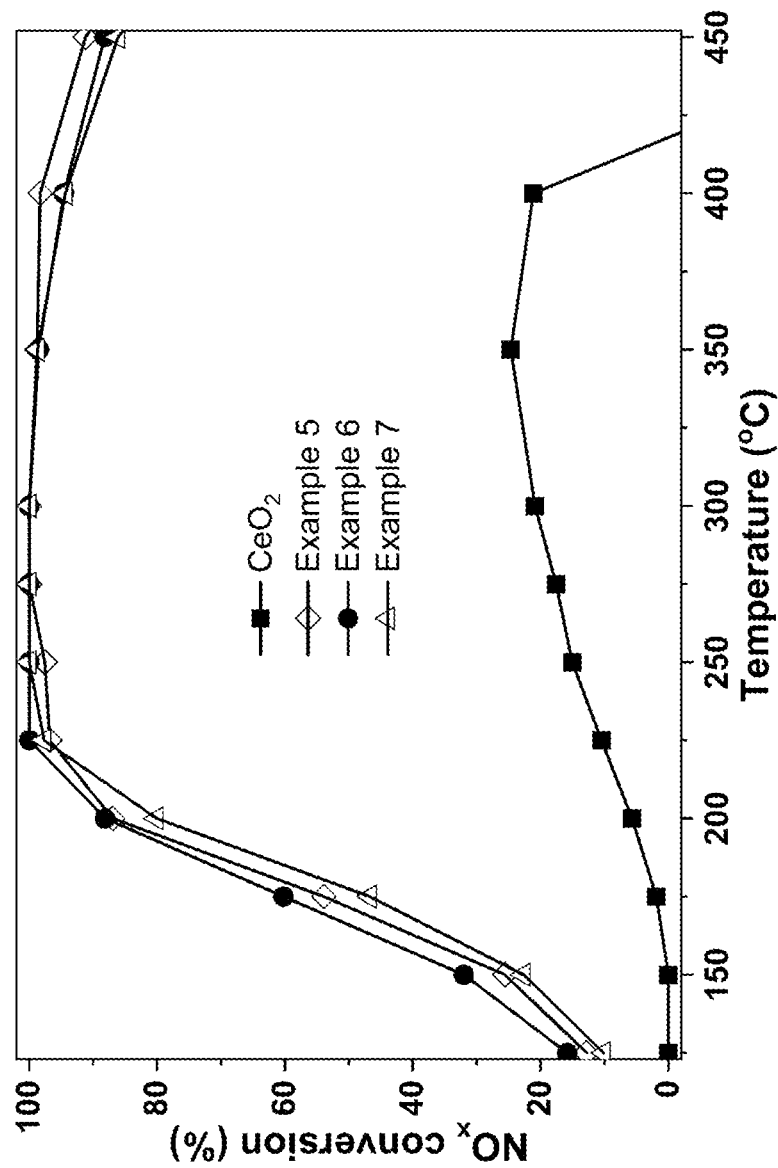
FIG. 7 depicts a plot of $NO_x$ conversion versus temperature according to some embodiments of the present disclosure.

Samples of ceria alone, along with samples of ceria impregnated with 10%, 15%, and 20% tungsten (as tungsten oxide; $WO_3$; Examples 5, 6, and 7, respectively), were evaluated for $NO_x$ conversion (in the absence of $H_2O$ and $CO_2$). The results again demonstrated that ceria alone had little activity, but each of the tungsten-impregnated examples had high levels of $NO_x$ conversion activity (Table 4; FIG. 7). The optimal loading of $WO_3$ was 15 wt % for $WO_3/CeO_2$ (Example 5). The Example 5 catalyst showed high low-temperature SCR activity, but it deteriorated significantly after aging at 800° C. for 16 hours.

Samples of ceria-zirconia (Ce40ZrO$_x$, 40 wt % $CeO_2$ for Ce40ZrO$_x$) impregnated with 5%, 10%), 15%, and 20% tungsten (as tungsten oxide; $WO_3$; Examples 8, 9, 10, and 11, respectively), were evaluated for $NO_x$ conversion. The results demonstrated that the optimal loading of $WO_3$ was 10 wt % for $WO_3$/Ce40ZrO$_x$ (Example 9), which showed lower activity than Example 5 (Table 4). The Example 9 catalyst showed less active after aging at 800° C. for 16 hours.

TABLE 4

$NO_x$ conversion in $NH_3$-SCR reaction on $WO_3/CeO_2$ and $WO_3$/Ce40ZrO$_x$ catalysts with different $WO_3$ loadings

| Ex. # | Fresh/ Aged | Testing condition | $NO_x$ conversion at different temperature (%) | | | | | |
|---|---|---|---|---|---|---|---|---|
| | | | 150° C. | 200° C. | 250° C. | 300° C. | 350° C. | 400° C. |
| 5 | Fresh | No $H_2O$ and $CO_2$ | 25.6 | 87.0 | 97.6 | 100 | 98.8 | 98.3 |
| 6 | Fresh | No $H_2O$ and $CO_2$ | 32.0 | 88.1 | 100 | 100 | 98.5 | 94.6 |

TABLE 4-continued

NO$_x$ conversion in NH$_3$-SCR reaction on WO$_3$/CeO$_2$
and WO$_3$/Ce40ZrO$_x$ catalysts with different WO$_3$ loadings

| Ex. # | Fresh/ Aged | Testing condition | NO$_x$ conversion at different temperature (%) | | | | | |
|---|---|---|---|---|---|---|---|---|
| | | | 150° C. | 200° C. | 250° C. | 300° C. | 350° C. | 400° C. |
| 6 | Aged @800 | No H$_2$O and CO$_2$ | 18.3 | 44.9 | 85.1 | 97.6 | 98.2 | 95.6 |
| 7 | Fresh | No H$_2$O and CO$_2$ | 22.7 | 80.1 | 100 | 100 | 98.7 | 94.3 |
| 8 | Fresh | No H$_2$O and CO$_2$ | 4.5 | 31.0 | 75.5 | 92.2 | 87.6 | 73.1 |
| 9 | Fresh | No H$_2$O and CO$_2$ | 7.6 | 45.4 | 83.4 | 91.1 | 89.9 | 80.7 |
| 9 | Aged @800 | No H$_2$O and CO$_2$ | 4.6 | 13.5 | 33.0 | 62.7 | 74.2 | 75.8 |
| 10 | Fresh | No H$_2$O and CO$_2$ | 7.3 | 16.3 | 49.2 | 85.5 | 91 | 94.8 |
| 11 | Fresh | No H$_2$O and CO$_2$ | 8.1 | 16.9 | 52.8 | 84.2 | 91.6 | 91.6 |

Figure 8:
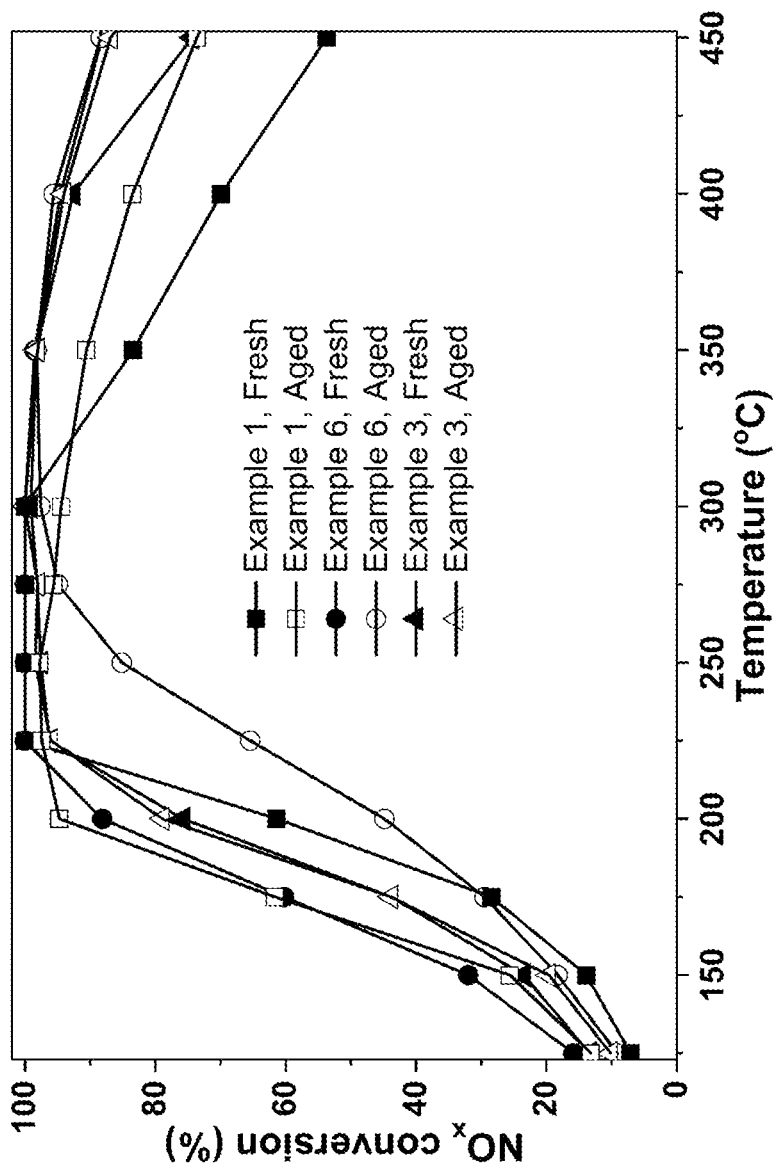
FIG. 8 depicts a plot of $NO_x$ conversion versus temperature according to some embodiments of the present disclosure.

Comparison of fresh and aged catalyst of Examples 3 and 6 both showed NO$_x$ conversion performance comparable to or better than Cu-CHA reference Example 1 (FIG. 8). However, samples of the tungsten and niobium impregnated ceria (Examples 3 and 6, respectively) showed large decreases in surface are after aging (Table 5).

TABLE 5

Surface area with aging

| Example # | BET Surface Area (m$^2$/g) |
|---|---|
| 3 (fresh) | 103 |
| 3 (aged) | 19 |
| 5 (fresh) | 114 |
| 5 (aged) | 41 |

Figure 9:
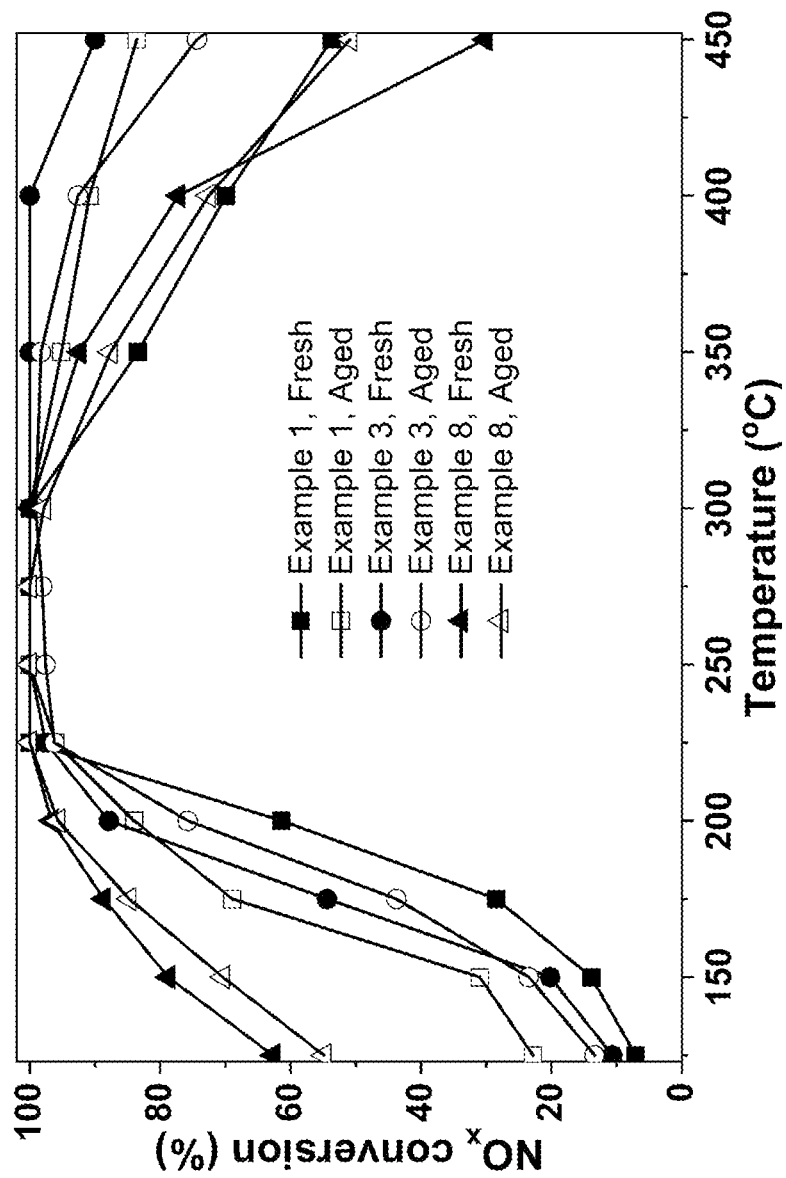
FIG. 9 depicts a plot of $NO_x$ conversion versus temperature according to some embodiments of the present disclosure.
Figure 10:
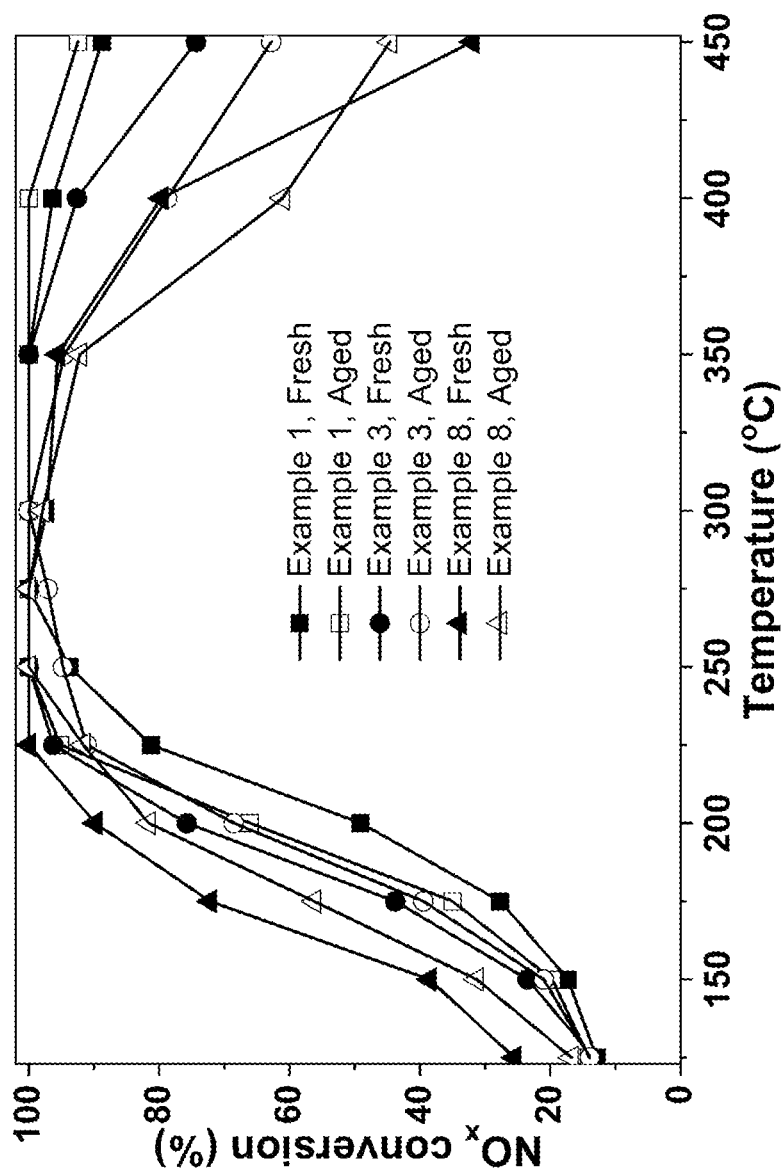
FIG. 10 depicts a plot of $NO_x$ conversion versus temperature according to some embodiments of the present disclosure.
Figure 11:
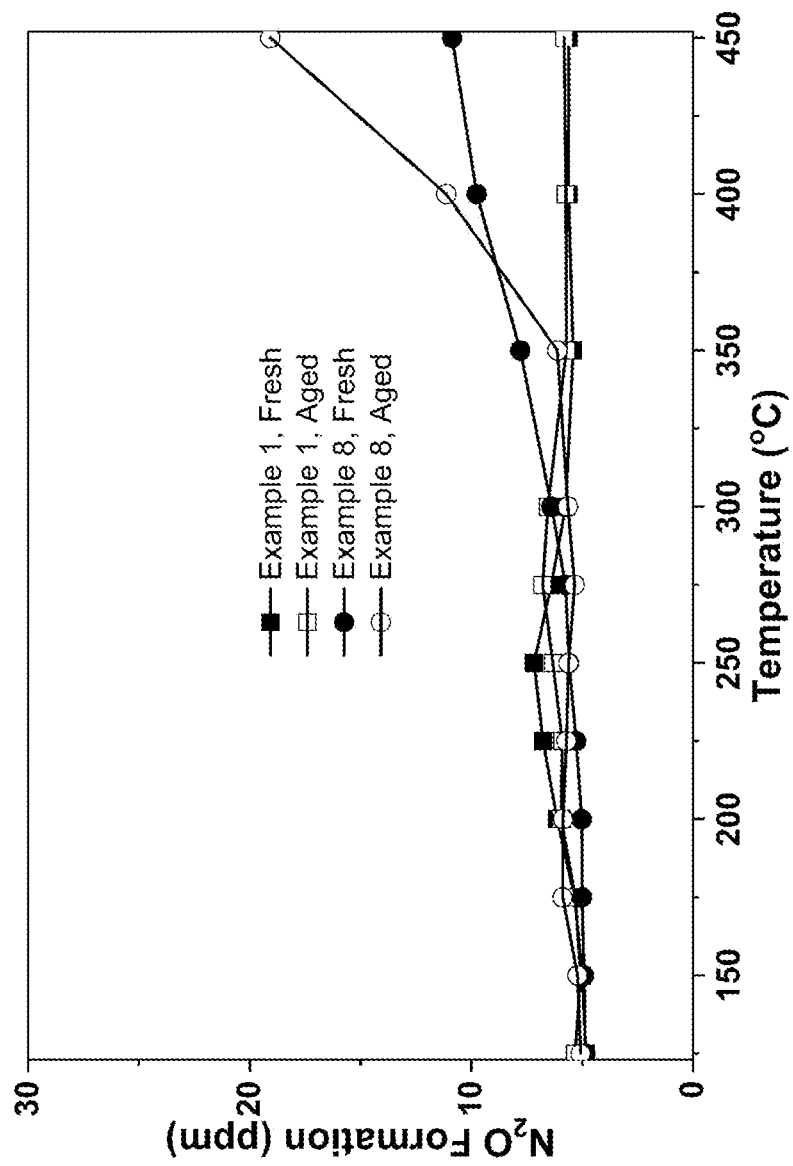
FIG. 11 depicts a plot of NO formation (concentration in ppm formed) versus temperature according to some embodiments of the present disclosure.

NO$_x$ conversion performance of reference Example 1 (Cu-CHA) and Example 3 (Nb$_2$O$_5$/CeO$_2$) was compared to the catalyst of Example 8 (Nb$_2$O$_5$/CuO/CeO$_2$). Without water vapor present in the test stream. Example 8 exhibited much higher activity than either reference, both before and after aging, demonstrating that inclusion of copper oxide enhanced the low-temperature SCR activity and the thermal stability relative to Nb$_2$O$_5$/CeO$_2$ alone (FIG. 9). With water vapor and CO$_2$ present in the test stream, Example 8 still exhibited higher activity than either reference, both before and after aging, again demonstrating that inclusion of copper oxide enhanced the low-temperature SCR activity and the thermal stability relative to Nb$_2$O$_5$/CeO$_2$ alone (FIG. 10). The inventive Nb$_2$O$_5$/CuO/CeO$_2$ catalyst (Example 8; both fresh and aged) was also found to have lower N$_2$O formation at low temperatures compared to reference Example 1 (FIG. 11).

Figure 12:
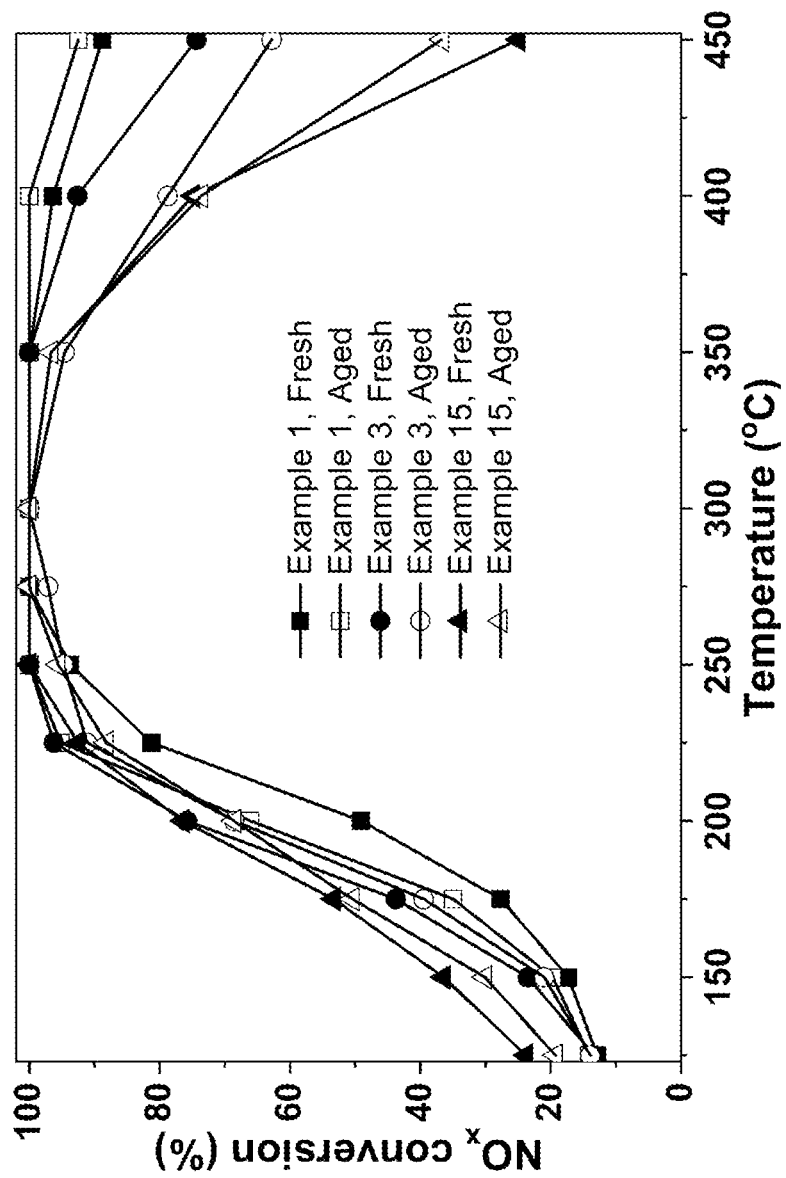
FIG. 12 depicts a plot of $NO_x$ conversion versus temperature according to some embodiments of the present disclosure.
Figure 13:
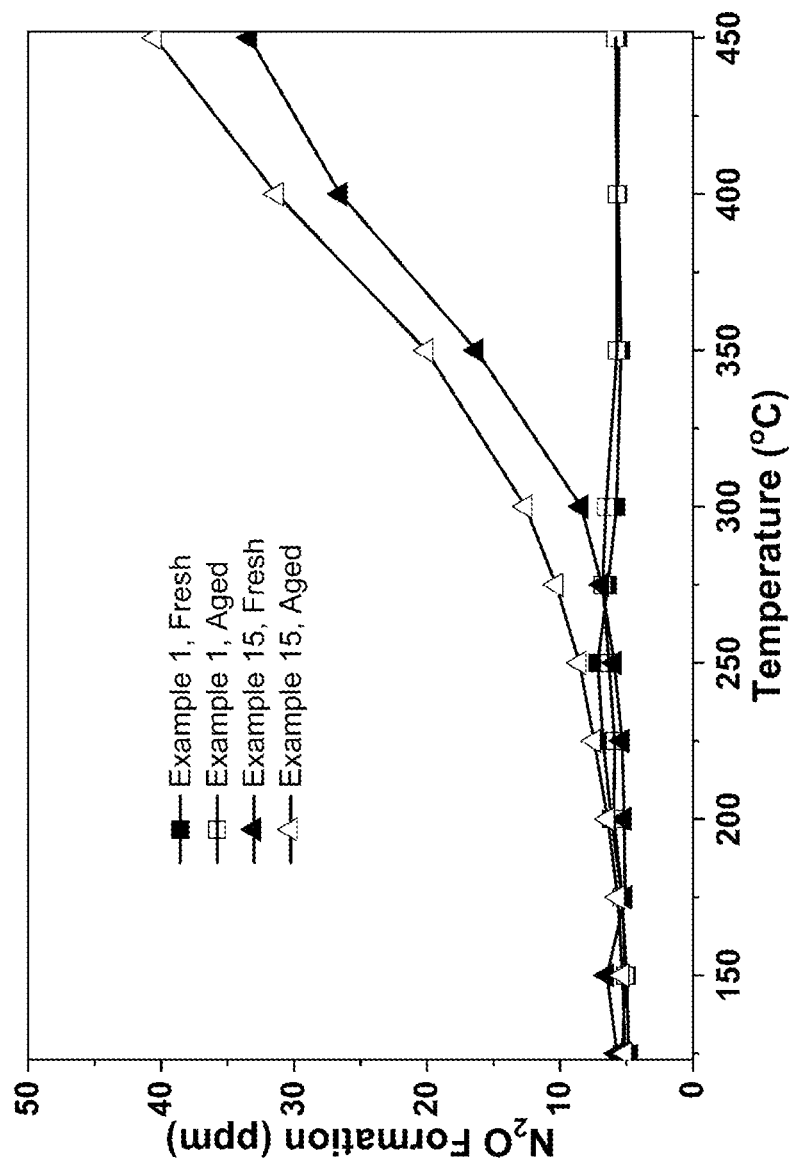
FIG. 13 depicts a plot of $N_2O$ formation (concentration in ppm formed) versus temperature according to some embodiments of the present disclosure.
Figure 14:
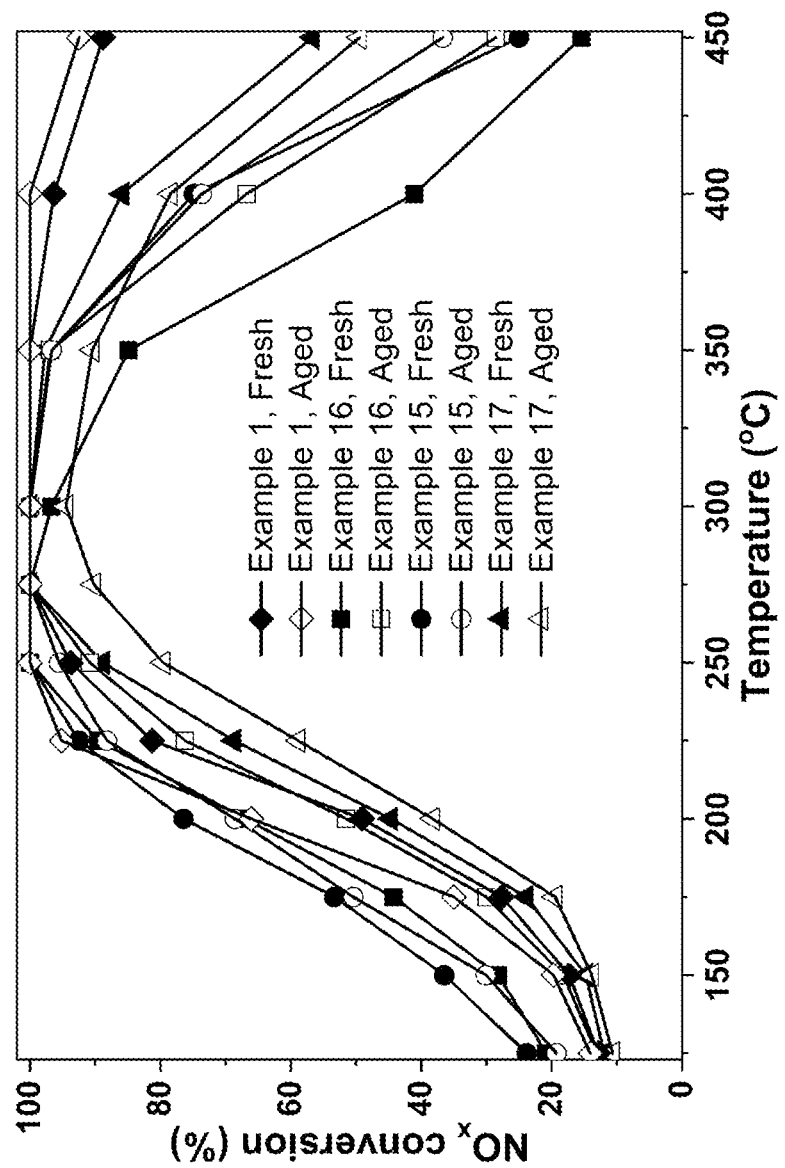
FIG. 14 depicts a plot of $NO_x$ conversion versus temperature according to some embodiments of the present disclosure.

With water vapor and CO$_2$ present in the test stream, Nb$_2$O$_5$—MnO$_2$/CeO$_2$ (Example 15; both fresh and aged) exhibited higher activity than reference Nb$_2$O$_5$/CeO$_2$ (Example 3) and Cu-CIA (Example 1) both before and after aging, demonstrating that inclusion of manganese oxide enhanced the low-temperature SCR activity and the thermal stability relative to Nb$_2$O$_5$/CeO$_2$ alone (FIG. 12). The inventive Example 15, both fresh and aged, was more active than reference Example 1 catalyst at low temperatures, but tended to produce a higher amount of N$_2$O (FIG. 13) at high temperatures. For the Mn—Nb—Ce based catalysts, Mn—Nb co-impregnation (Example 15) was found to provide a catalyst more active than those produced by sequential impregnation in either order (Examples 16 and 17; FIG. 14).

Figure 15:
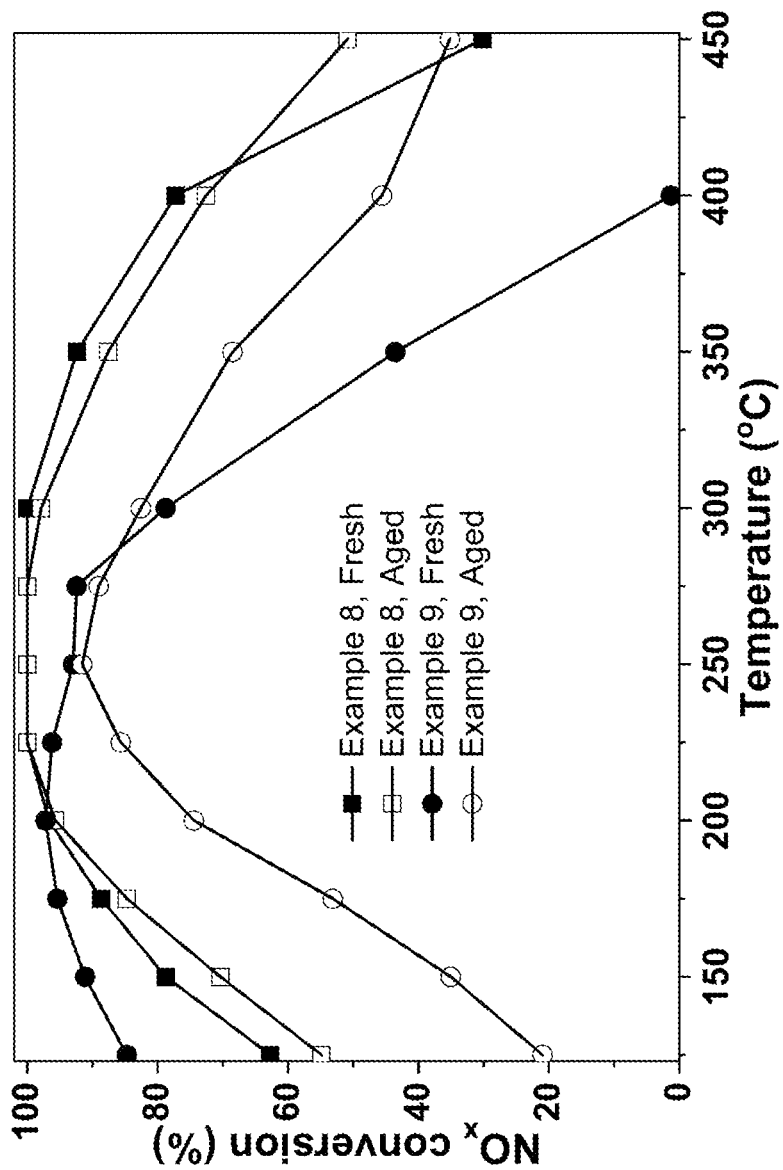
FIG. 15 depicts a plot of $NO_x$ conversion versus temperature according to some embodiments of the present disclosure.
Figure 16:
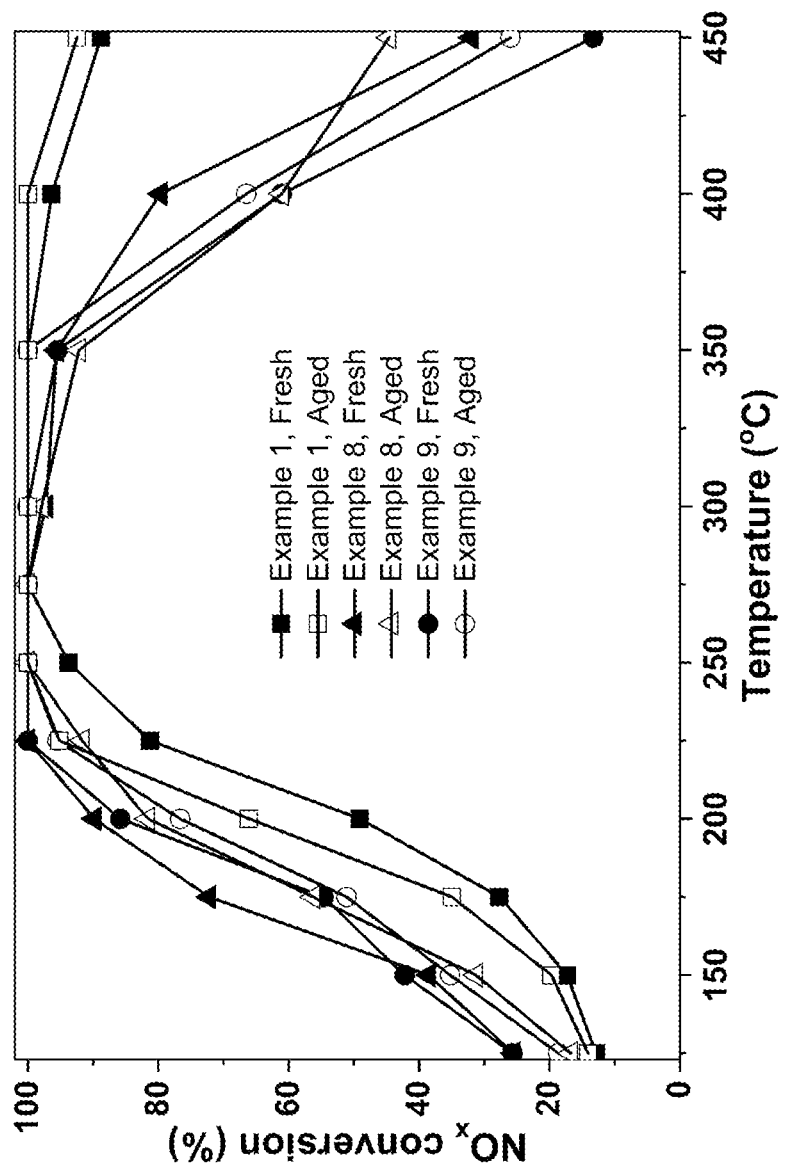
FIG. 16 depicts a plot of $NO_x$ conversion versus temperature according to some embodiments of the present disclosure.

The effect of copper source on catalyst NO$_x$ conversion activity was evaluated in fresh and aged samples, with and without water vapor present in the test stream. When tested without water vapor, fresh Example 8 (basic copper source ([Cu(NH$_4$)]$^{2+}$) showed lower low-temperature activity than fresh Example 9 (prepared with an acidic copper oxide precursor). However, aged Example 8 was much more stable toward thermal aging with respect to NO$_x$ conversion in the absence of water vapor when compared to aged Example 9, (FIG. 15). However, in the presence of H$_2$O vapor in the test gas stream, the performance difference between the examples decreased (FIG. 16), with activity only suppressed in the lower temperature range (<200° C. Example 8 still exhibited higher activity than reference Examples 1 and 3, before and after aging, indicating that the inventive catalyst possessed excellent low-temperature SCR activity and thermal-stability.

Figure 17:
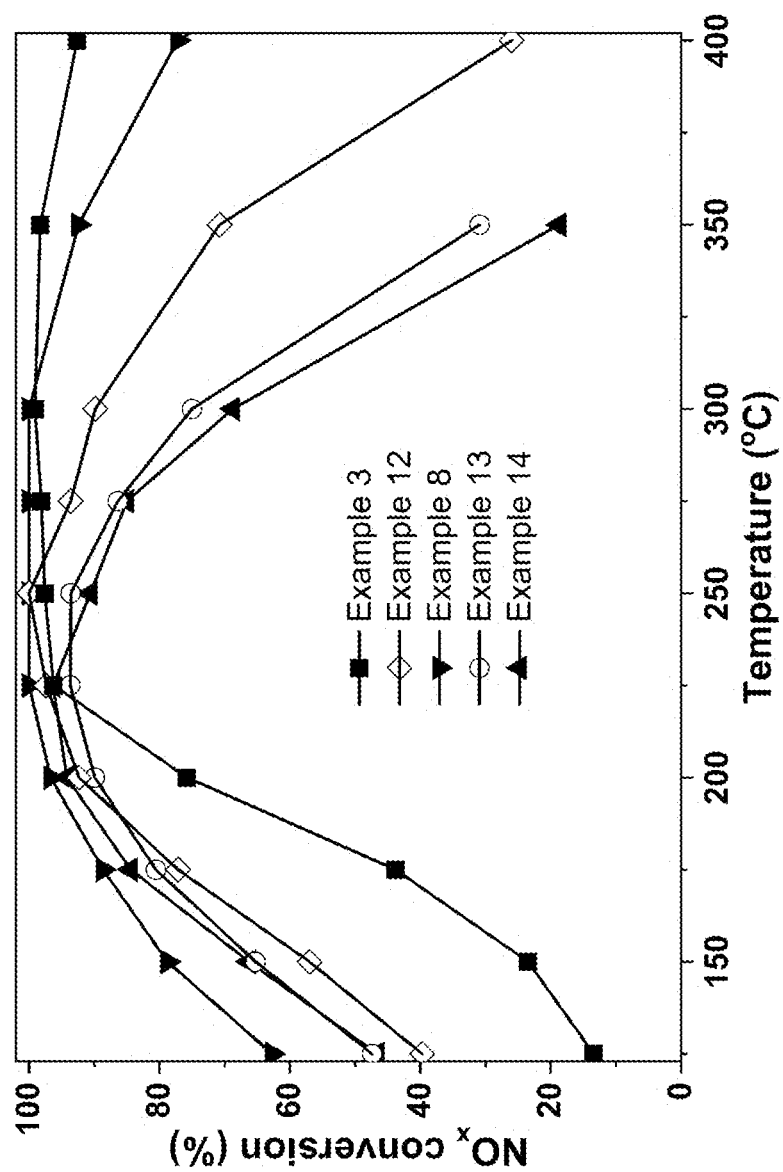
FIG. 17 depicts a plot of $NO_x$ conversion versus temperature according to some embodiments of the present disclosure.

The effect of copper loading on the niobium/copper/ceria catalysts was evaluated at 0.5%, 1%, 1.5%, and 3% copper (as CuO; Examples 12, 8, 13, 14, respectively). Results in FIG. 17 showed that the CuO loading greatly affected NO$_x$ conversion, with Example 8 (1% CuO) demonstrating optimal performance under the test conditions.

Figure 18:
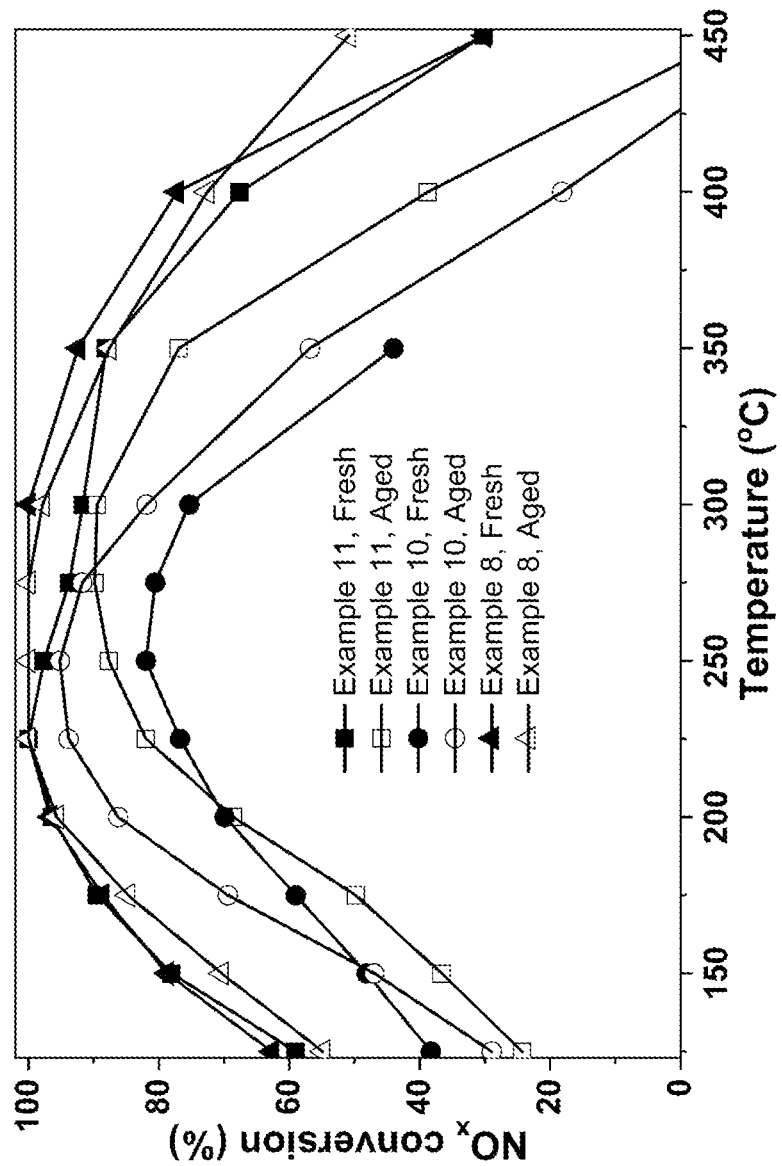
FIG. 18 depicts a plot of $NO_x$ conversion versus temperature according to some embodiments of the present disclosure.

The order of copper and niobium impregnation in ceria was also found to be important for activity (FIG. 18). Impregnating with copper first, followed by niobium (Example 8) gave the catalyst with the highest activity and stability relative to those prepared by niobium first, followed by copper (Example 11) or co-impregnation (Example 10).

TABLE 6

NO$_x$ conversion in NH$_3$-SCR reaction on
Nb$_2$O$_5$—CuO—CeO$_2$ catalysts (acidic copper source)

| Ex. # | Fresh/Aged | Testing condition | \multicolumn{6}{c}{NO$_x$ conversion at different temperature (%)} |
|---|---|---|---|---|---|---|---|---|
| | | | 150° C. | 200° C. | 250° C. | 300° C. | 350° C. | 400° C. |
| 9 | Fresh | With 5% H$_2$O and 5% CO$_2$ | 42.2 | 85.8 | 100 | 100 | 95.5 | 61.1 |
| 9 | Fresh | No H$_2$O and CO$_2$ | 78.1 | 96.4 | 97.6 | 91.7 | 88.1 | 67.6 |
| 9 | Aged@650 | With 5% H$_2$O and 5% CO$_2$ | 35.2 | 76.7 | 100 | 100 | 100 | 66.5 |
| 9 | Aged@700 | With 5% H$_2$O and 5% CO$_2$ | 25.9 | 79.5 | 97.5 | 100 | 100 | 91.7 |
| 9 | Aged@800 | With 5% H$_2$O and 5% CO$_2$ | 27.8 | 80.5 | 97.8 | 96.6 | 86.1 | 59 |
| 10 | Fresh | With 5% H$_2$O and 5% CO$_2$ | 21.2 | 46.8 | 84.3 | 95.5 | 89.6 | 55 |
| 10 | Fresh | No H$_2$O and CO$_2$ | 72.8 | 93.6 | 90.2 | 84.5 | 57.3 | 18.4 |
| 10 | Aged@800 | No H$_2$O and CO$_2$ | 24.7 | 74 | 93.2 | 93.2 | 83.3 | 57.9 |
| 11 | Fresh | With 5% H$_2$O and 5% CO$_2$ | 33.7 | 68.8 | 92.4 | 100 | 97.9 | 96.1 |
| 11 | Aged@650 | With 5% H$_2$O and 5% CO$_2$ | 31.5 | 72.6 | 100 | 100 | 100 | 94.7 |
| 11 | Fresh | No H$_2$O and CO$_2$ | 79.1 | 96.2 | 96.2 | 86.6 | 56 | 18 |
| 11 | Aged@700 | No H$_2$O and CO$_2$ | 24.7 | 75.2 | 100 | 100 | 100 | 94.9 |
| 11 | Aged@800 | No H$_2$O and CO$_2$ | 19.5 | 62.8 | 90.4 | 93.1 | 84.8 | 59.3 |

Figure 19:
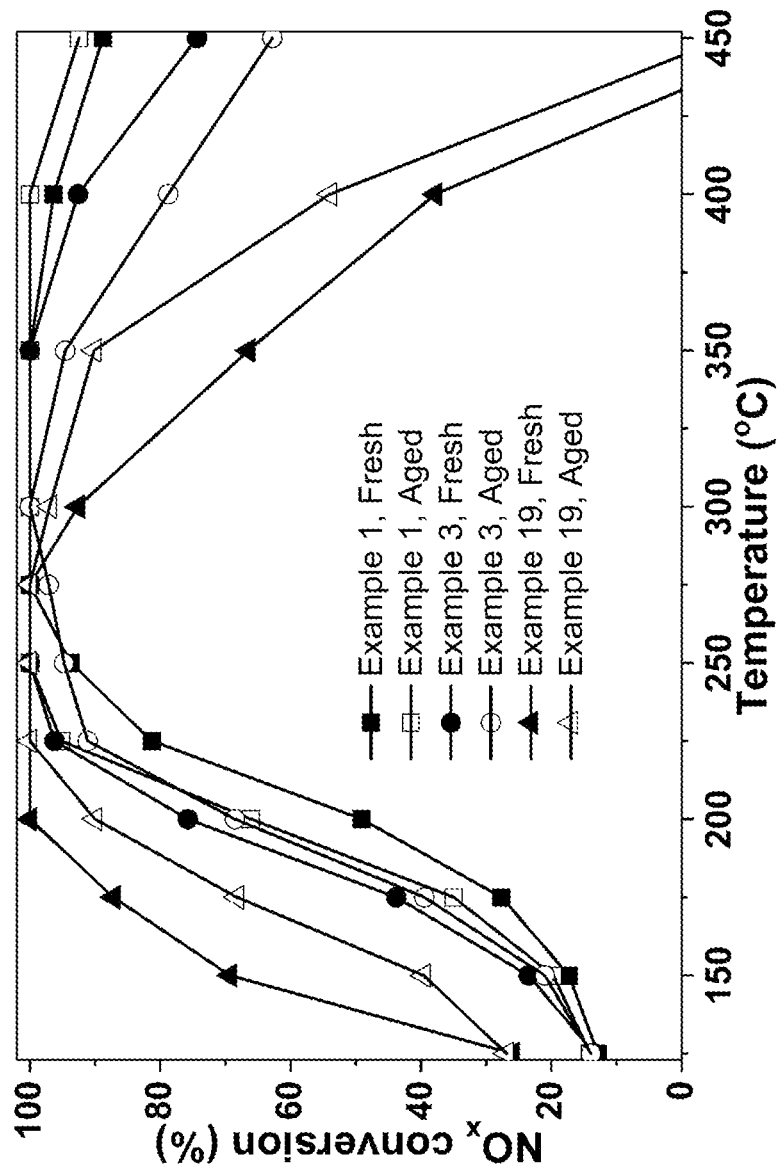
FIG. 19 depicts a plot of $NO_x$ conversion versus temperature according to some embodiments of the present disclosure.

The effect on NO$_x$ conversion of iron oxide addition to the CuO/Nb$_2$O/CeO$_2$ catalyst was explored (FIG. 19). With water vapor present in the test stream, Example 19, containing 5% iron oxide, exhibited higher activity than Nb$_2$O$_5$/CeO$_2$ (Example 3) and Cu-CHA (Example 1), both before and after aging, indicating that the iron oxide-doped catalyst also had excellent low-temperature SCR activity and thermal-stability.

Figure 20:
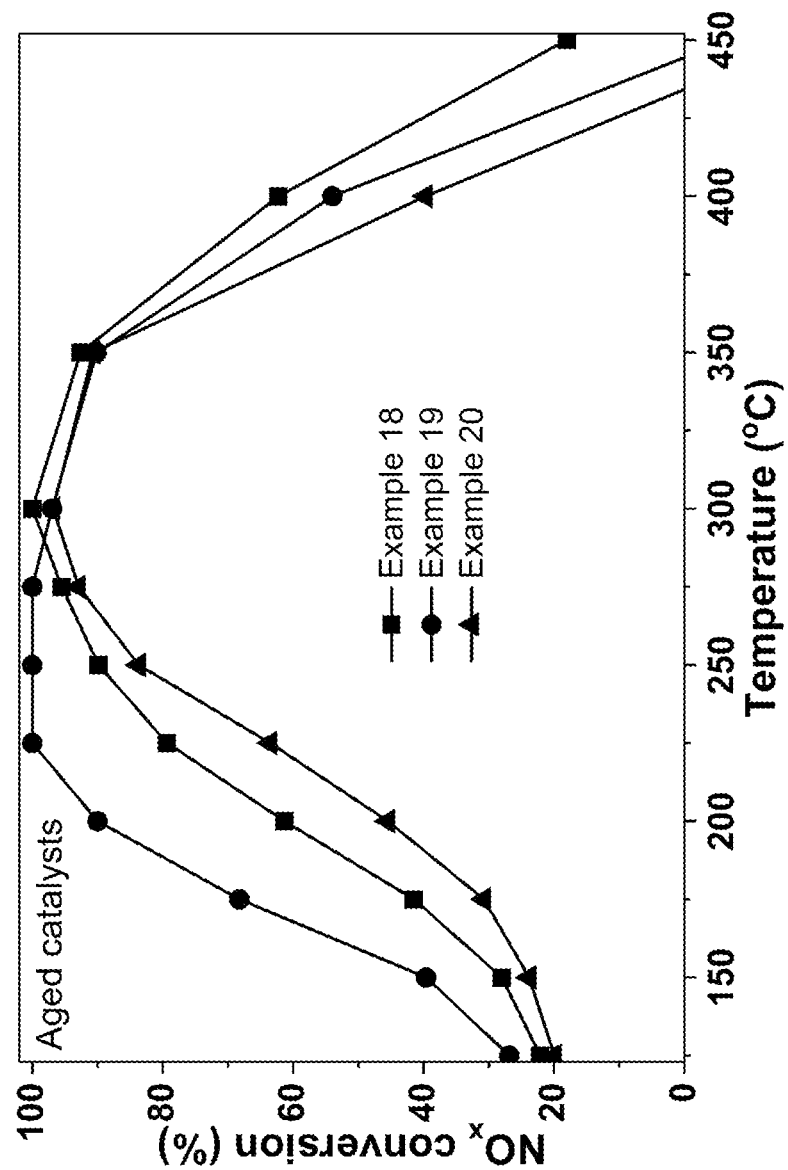
FIG. 20 depicts a plot of $NO_x$ conversion versus temperature according to some embodiments of the present disclosure.
Figure 21:
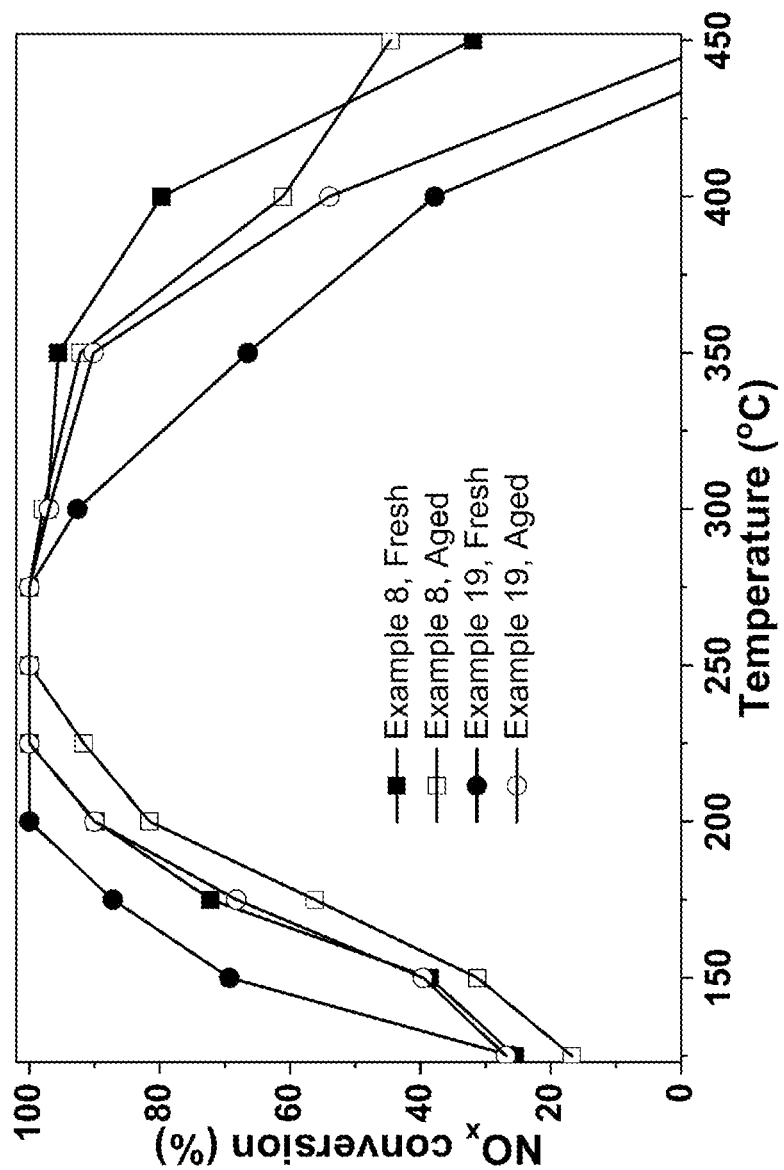
FIG. 21 depicts a plot of $NO_x$ conversion versus temperature according to some embodiments of the present disclosure.

The effect of iron loading on the niobium/copper/ceria catalyst was evaluated at 3, 5, and 7% iron as Fe$_2$O$_3$ (Examples 18, 19, and 20, respectively; FIG. 20). With water vapor present in the test stream, Example 19 exhibited highest activity, indicating the optimal dopant loading of Fe$_2$O$_3$ was 5 wt %. Performance of iron containing copper-niobium-cerium catalyst (Example 19) was directly compared to that of the copper-niobium-cerium catalyst (Example 8; FIG. 21). Catalyst Example 19 performed better with respect to low-temperature NO$_x$ conversion activity before and after aging relative to Example 8.

Figure 22:
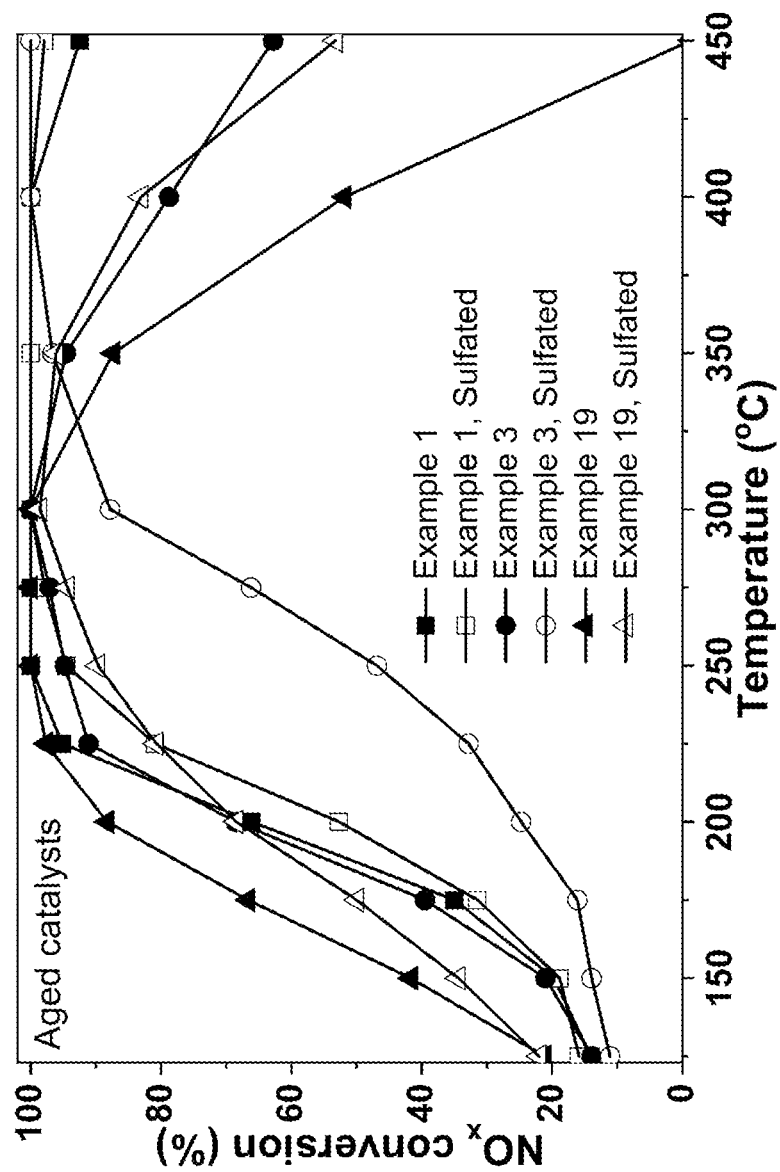
FIG. 22 depicts a plot of $NO_x$ conversion versus temperature according to some embodiments of the present disclosure.
Figure 23:
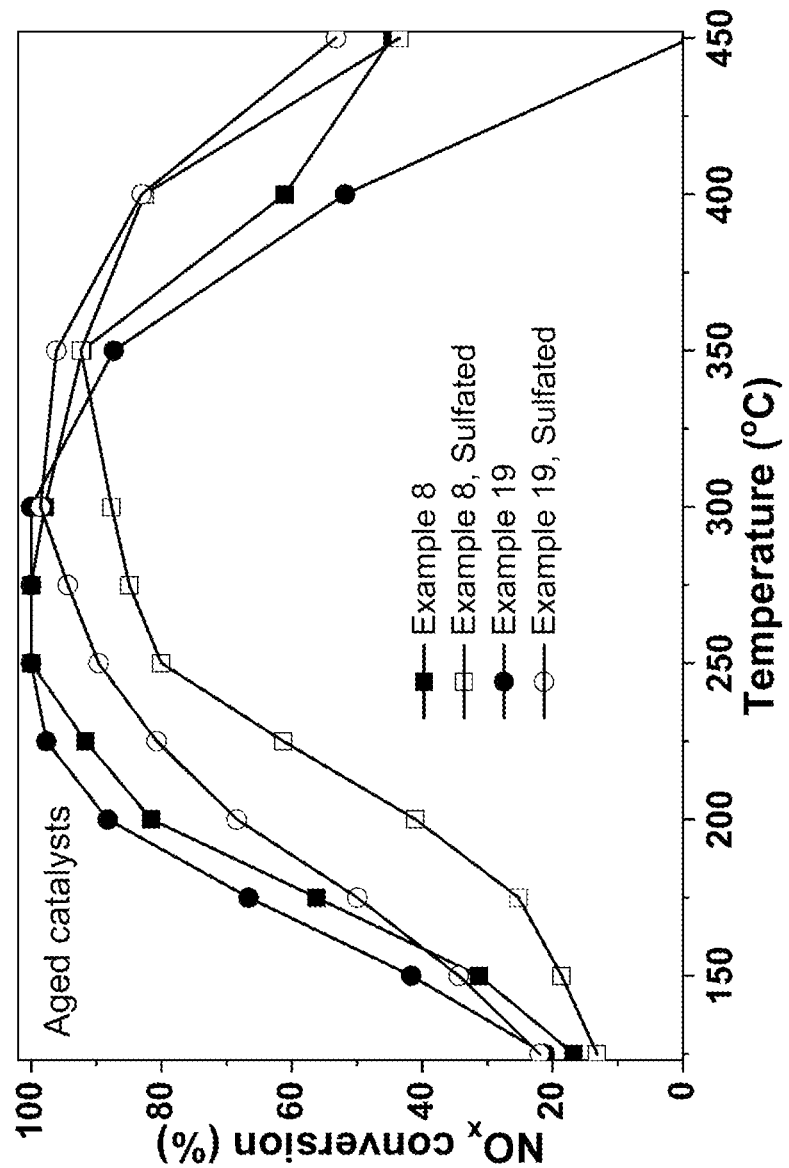
FIG. 23 depicts a plot of $NO_x$ conversion versus temperature according to some embodiments of the present disclosure.
Figure 24:
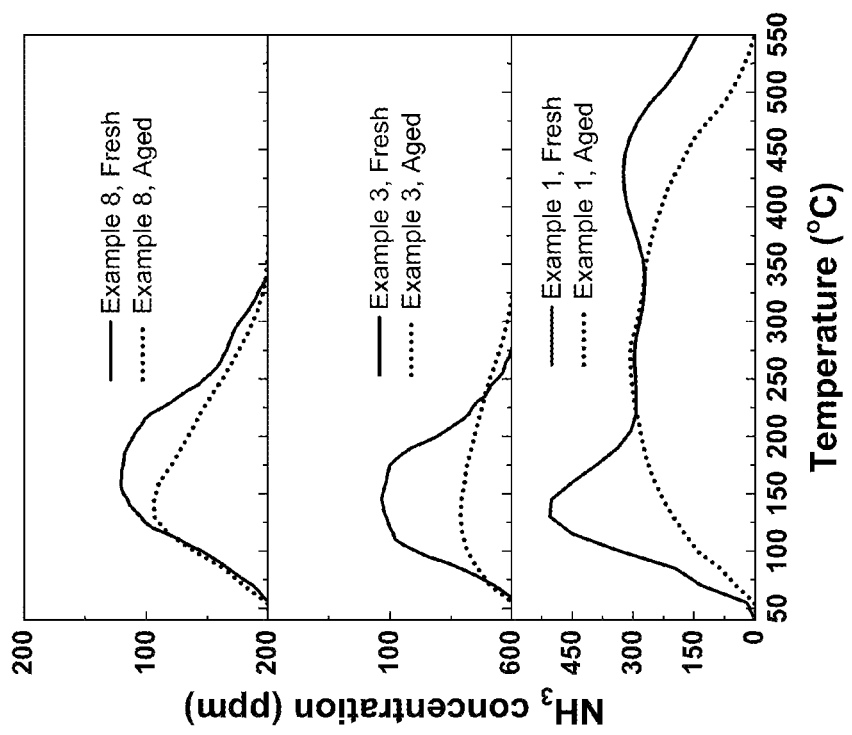
FIG. 24 depicts a plot of ammonia desorption versus temperature according to some embodiments of the present disclosure. There are depicted comparative ammonia desorption rates between certain fresh and aged embodiments of the disclosure.

Example 19 was further evaluated in sulfated form versus non-sulfated forms, relative to Examples 1 and 3 in both sulfated and non-sulfated form (FIG. 22). To provide the catalyst materials in sulfated form, the materials was treated with a gaseous stream of 20 ppm SO$_2$, 10% O$_2$, 5% H$_2$O and balance N$_2$, with total flow of 500 SCCM, GHSV of 100,000 h$^{-1}$ at 300° C. for 45 min. The amount of SO$_2$ deposition was 0.5 g/L. A slight decrease in activity was observed for Example 19 after sulfation. In contrast, there was an obvious decrease in performance of the sulfated reference catalyst (Example 1) and Example 3. Example 19 showed much higher low-temperature SCR activity than Example 1, Example 3 and Example 8 before and after sulfation, demonstrating the good low-temperature SCR activity and SO$_2$ resistance of the catalyst material of Example 19. A direct comparison between performance of sulfated and non-sulfated Examples 8 and 19 is provided in FIG. 23, which demonstrated a significant decrease in activity for Example 8 after sulfation, while only a slight loss in activity was observed for aged, sulfated catalyst of Example 19.

Example 22. Temperature Programmed Desorption (TPD) of Ammonia (NH$_3$)

The ammonia desorption profile of samples of Examples 1, 3, and 8 (both fresh and aged for each) was evaluated by temperature programmed desorption (TPD) using Mass Spectroscopy (MS) as detection. Samples (30 mg) of each catalyst were loaded into the instrument and pretreated in a flow of Air (200 SCCM) at 200° C. for 30 min. After pretreatment, each sample was cooled down to 40° C. and saturated with 500 ppm NH$_3$ with carrier gas of N$_2$ containing 1 vol % H$_2$O (200 SCCM in total) for 1 hour. Samples were then flushed with N$_2$ (200 SCCM) containing 1 vol % H$_2$O at the same temperature for 1 hour to remove gaseous and weakly adsorbed NH$_3$. Finally, samples were heated to 700° C. at a rate of 10° C./min in flow of N$_2$ (200 SCCM) containing 1 vol % H$_2$).

Reference Example 1 (Cu-CHA) showed a broader and stronger NH$_3$ desorption peak than Example 3 (Nb$_2$O$_5$/CeO$_2$) and Example 8 (Nb$_2$O/CuO/CeO$_2$) catalysts (FIG.

Figure 25:
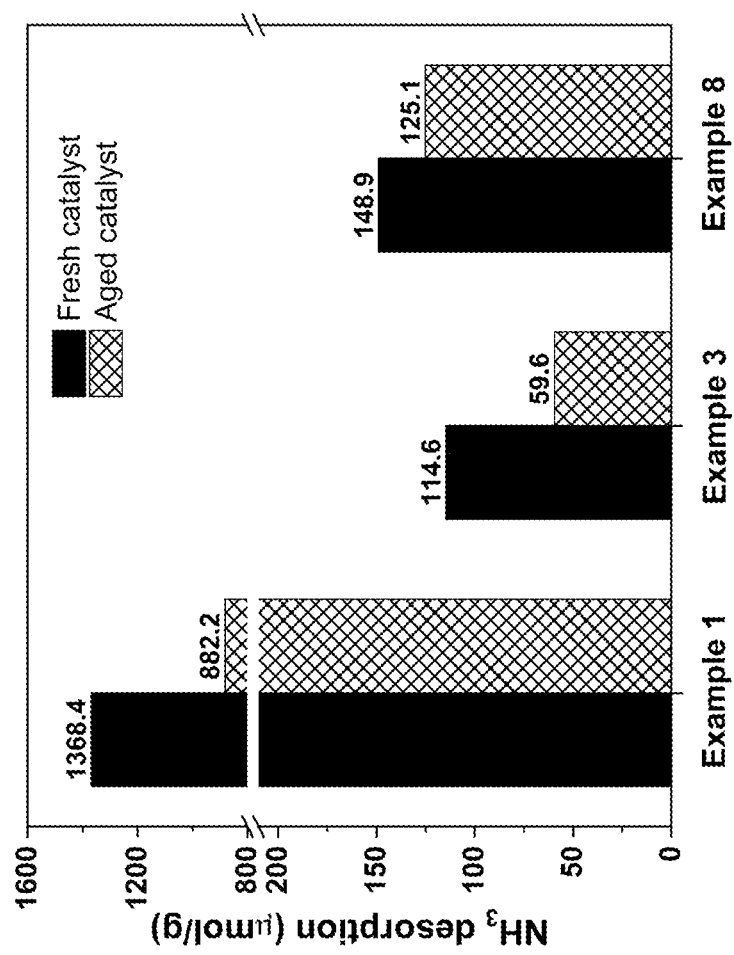
FIG. 25 depicts a graphic depiction of ammonia desorption according to some embodiments of the present disclosure. There are depicted comparative ammonia desorption quantities between certain fresh and aged embodiments of the disclosure.

24). Compared to fresh catalysts, NH₃ adsorption ability decreased over the aged catalysts, suggesting the decline of acid sites. The NH₃ desorption amount for reference Example 1 was more than 5 times higher than that of Examples 3 and 8 (FIG. 25). Compared to Example 3, more acid sites were detected for Example 8, suggesting that the modification by Cu not only enhanced the low-temperature reducibility of the $Nb_2O_5/CeO_2$ material, but also increased the number of acid sites.

Example 23. Hydrogen Temperature Programmed Reduction (TPR) of Catalyst Compositions Temperature programmed reduction ($H_2$-TPR) is a facile technique for characterizing quantitatively the reducibility of a metal species-containing compound by hydrogen consumption. The species of metal undergoing reduction includes both metal ions and metal oxides (e.g., $Cu^{2+}$, $Cu^{1+}$, and CuO). Generally, a reducing gas mixture (such as 3% to 17% hydrogen diluted in argon or nitrogen or helium) flows over the sample. A thermal conductivity detector (TCD) is used to measure changes in the thermal conductivity of the gas stream to provide hydrogen consumption data as a function of time and temperature. The use of this technique for the evaluation of metal-containing zeolites has been demonstrated in the literature, e.g., in Yan et al., Journal of Catalysis, 161, 43-54 (1996), the disclosure of which is incorporated herein by reference. Catalysts with good low-temperature reducibility normally perform well for $NH_3$—SCR. A higher total hydrogen consumption and lower temperature for the start of hydrogen consumption are generally correlated width increased overall and low temperature catalytic activity.

$H_2$-TPR was performed on an automated catalyst characterization system Autosob iQ with a. TCD detector. A 30 mg catalyst sample was loaded into the instrument and pre-treated in a flow of 5% $O_2$/He (40 SCCM) at 300° C. for 1 hour. After cooling down to room temperature, the catalyst sample was exposed to 10% $H_2$/Ar (40 SCCM) and heated to 850° C. with a heating rate of 10° C./min.

Figure 26:
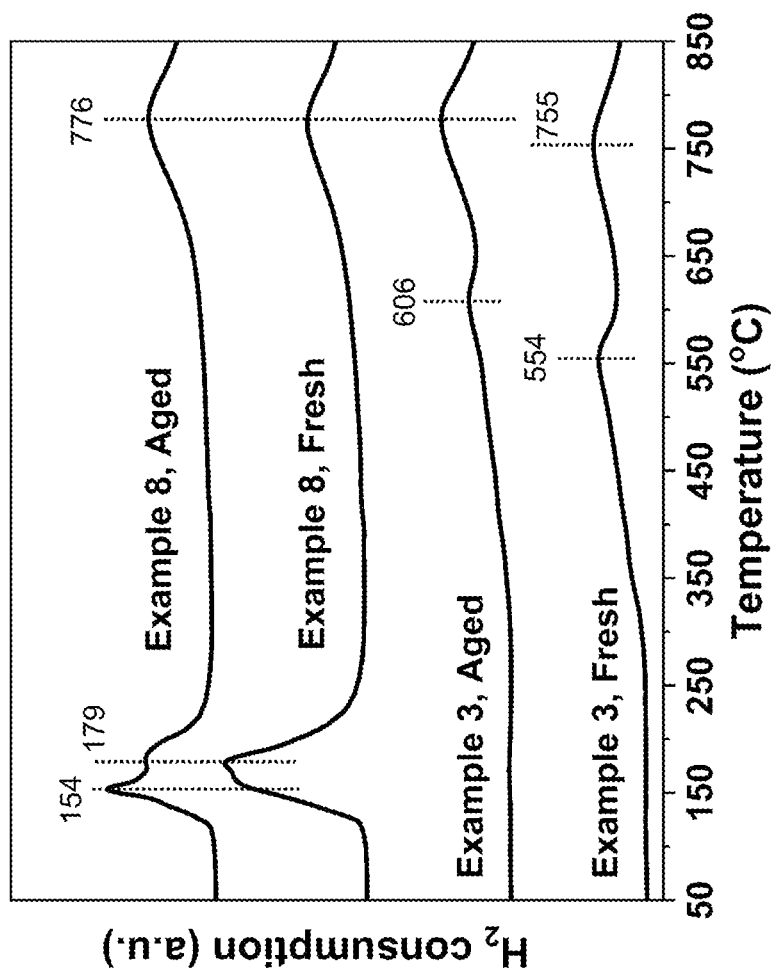
FIG. 26 depicts a plot of hydrogen consumption versus temperature according to some embodiments of the present disclosure.

Low-temperature reducibility of Example 3 was greatly enhanced by Cu modification (Example 8), which showed obvious reduction peaks below 250° C. (FIG. 26). No significant change on the reducibility of the catalyst of Example 8 was observed after aging, suggesting the material was stable under the present aging conditions.

Figure 27:
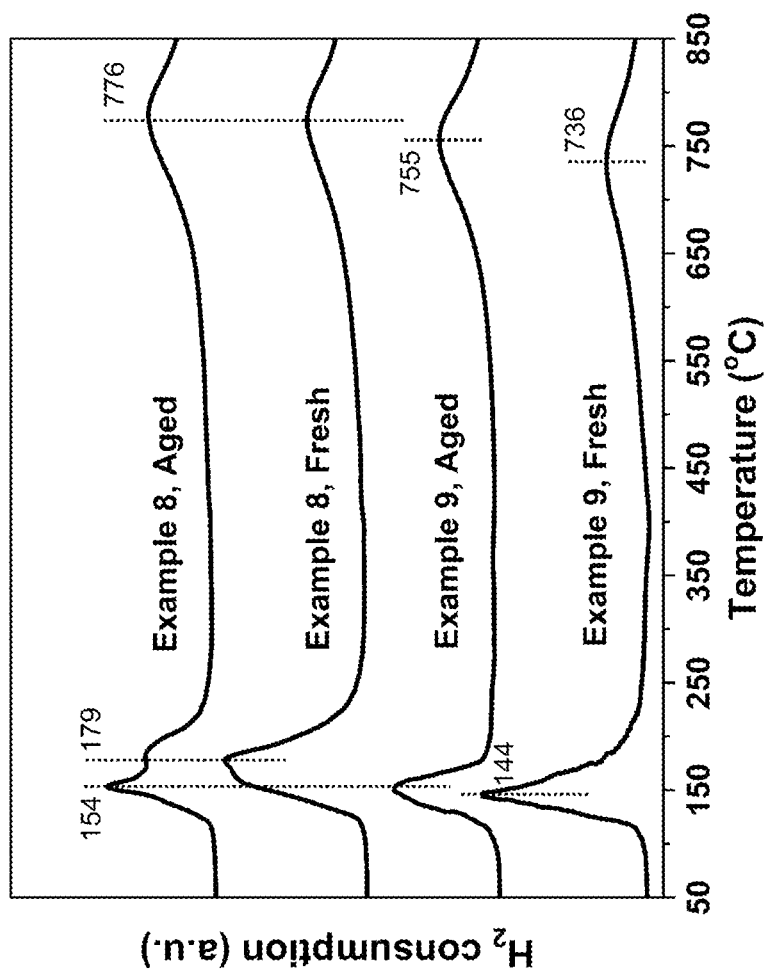
FIG. 27 depicts a plot of hydrogen consumption versus temperature according to some embodiments of the present disclosure.

For fresh and aged catalyst of Example 8, two reduction peaks were observed at temperature below 250° C., while only one reduction peak was observed for fresh and aged catalyst of Example 9 (FIG. 27). According to the literature, the second reduction peak at 179° C. can be assigned to Cu—O—Ce species, suggesting a strong interaction between Cu species and the $CeO_2$ support for Example 8. Between catalysts of Example 8 and 9. Example 9 showed the lowest reduction peak at 144° C., which corresponds to the highest low-temperature SCR activity below a temperature of 200° C. After aging, the first reduction peak shifted to higher temperature for Example 9, while no obvious shifts were observed for Example 8, suggesting better thermal-stability for the catalyst material prepared with basic copper precursor, with rich Cu—O—Ce species. Without wishing to be bound by theory, it is believed that the good low-temperature reducibility and strong interaction between Cu species and $CeO_2$ allowed the Example 8 catalyst to exhibit higher SCR activity and superior thermal stability.

Figure 28:
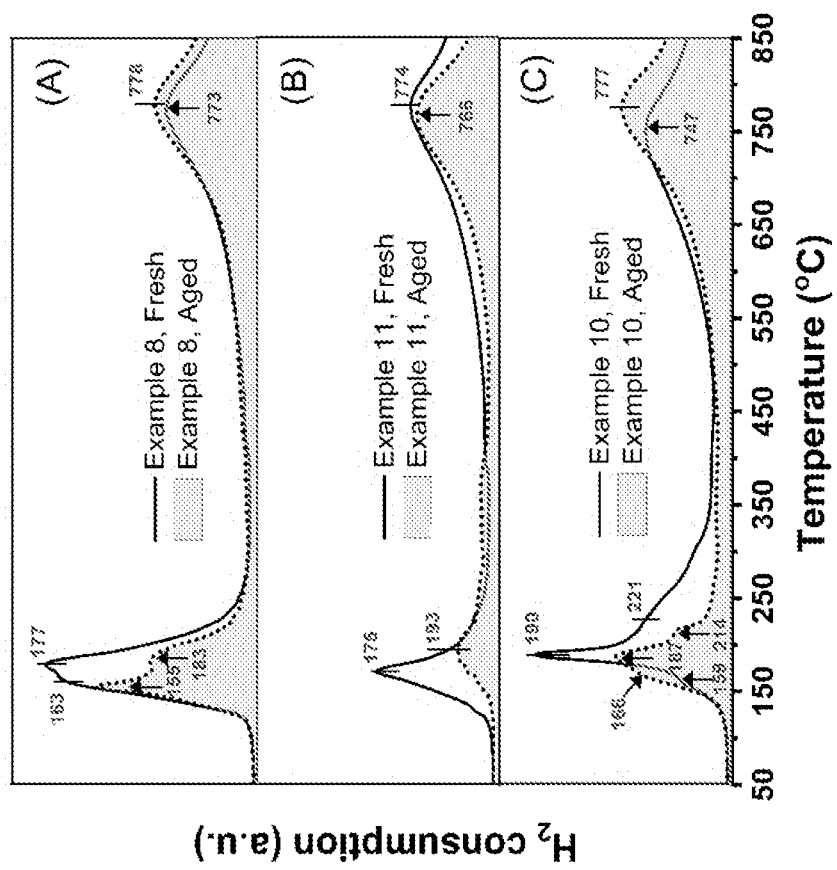
FIGS. 28A, 28B, and 28C depict plots of hydrogen consumption versus temperature according to some embodiments of the present disclosure.

Results provided in FIGS. 28A, 28B, and 28C, along with Table 7, demonstrated that the addition of CuO (Examples 8, 10, and 11) to niobium-impregnated ceria (Example 3) enhanced low-temperature reducibility. The effect of aging on reducibility depended on the order of impregnation. Example 8 (copper followed by Nb deposition) showed the highest reducibility after aging relative to Examples 10 and 13 (Nb and copper co-impregnation, and Nb followed by copper, respectively).

TABLE 7

| | TPR results | |
|---|---|---|
| Ex. # | Peak Reduction Temp, ° C. (Fresh) | Peak Reduction Temp, ° C. (Aged) |
| 3 | NA | NA |
| 8 | 163 | 155 |
| | 177 | 183 |
| 10 | 159 | 166 |
| | 190 | 187 |
| | 221 | 214 |
| 11 | 172 | 193 |

Example 24. $MnO_2$—$WO_3/CeO_2$ Catalysts with Different $MnO_2$ Loadings

Catalyst material containing 10% tungsten oxide and 2%, 5%, and 8% manganese oxide (as $MnO_2$) on ceria were prepared by incipient wetness impregnation. A solution of ammonium tungstate ($H_{28}N_6O_{41}W_{12}$) and manganese nitrate ($Mn(NO_3)_2$) was prepared. A pre-determined volume of the solution was incipient wetness impregnated onto $CeO_2$, followed by calcination at 550° C. for 2 hours with a ramp rate of 5° C./min. The $NO_x$ conversion of the catalyst materials was performed as in Example 21. Results are provided in Table 8, which demonstrated that the low-temperature activity of $WO_3/CeO_2$ was enhanced by the addition of $MnO_2$, but the activity at high temperature region decreased.

TABLE 8

| $NO_x$ conversion in $NH_3$-SCR reaction for $xMnO_2$—$WO_3/CeO_2$ catalysts | | | | | | | |
|---|---|---|---|---|---|---|---|
| Catalyst | Testing condition | $NO_x$ conversion at different temperature (%) | | | | | |
| | | 150° C. | 200° C. | 250° C. | 300° C. | 350° C. | 400° C. |
| $2MnO_2$—$10WO_3/CeO_2$ | No $H_2O$ and $CO_2$ | 16.1 | 37.9 | 71.9 | 83.2 | 79.0 | 65.6 |
| $5MnO_2$—$10WO_3/CeO_2$ | No $H_2O$ and $CO_2$ | 28.2 | 58.7 | 85.4 | 88.0 | 74.8 | 53.0 |
| $8MnO_2$—$10WO_3/CeO_2$ | No $H_2O$ and $CO_2$ | 30.6 | 69.6 | 92.7 | 87.2 | 74.5 | 56.1 |

Example 25. $Nb_2O_4$ on Ceria/Zirconia Catalysts with Different Nb Loadings Catalyst materials containing 4%, 8%, and 12% niobium oxide on a mixed oxide of 40% ceria and 60% zirconia by weight were prepared by incipient wetness impregnation of the pre-determined volume of ammonium niobate oxalate ($C_4H_4NNbO_9$) solution (1.0 M) onto the mixed oxide, followed by calcination at 550° C. for 2 hours with a ramp rate of 5° C./min. Results are provided in Table 9, which demonstrated that optimal loading of $Nb_2O_5$ was 8 wt % for $xNb_2O_5/Ce40Zr60O_x$.

TABLE 9

$NO_x$ conversion in $NH_3$-SCR reaction on catalysts with $Nb_2O_5$ loaded on ceria and ceria/zirconia

| $Nb_2O_5$ content (wt %) | Fresh/ Aged | Testing condition | $NO_x$ conversion at different temperature (%) | | | | | |
|---|---|---|---|---|---|---|---|---|
| | | | 150° C. | 200° C. | 250° C. | 300° C. | 350° C. | 400° C. |
| 4 | Fresh | No $H_2O$ and $CO_2$ | 17.3 | 38.1 | 70.9 | 86.7 | 82.7 | 64.9 |
| 8 | Fresh | No $H_2O$ and $CO_2$ | 18.4 | 49.7 | 83.6 | 93.2 | 88.1 | 72.6 |
| 8 | Aged @800 | With 5% $H_2O$ and 5% $CO_2$ | 8.5 | 13.0 | 31.6 | 65.9 | 79.9 | 81.2 |
| 12 | Fresh | No $H_2O$ and $CO_2$ | 3.7 | 32.0 | 81.6 | 91.6 | 90.9 | 85.5 |

Example 26. $Nb_2O_4$ on Doped Ceria Catalysts

Catalyst materials containing 8% niobium oxide on doped ceria-based oxides (Zr, Gd, La, Pr and Y-modified $CeO_2$) were prepared by incipient wetness impregnation of the pre-determined volume of ammonium niobate oxalate ($C_4H_4NNbO_9$) solution (1.0 M) onto the doped oxide, followed by calcination at 550° C. for 2 hours with a ramp rate of 5° C./min. Certain samples were aged at 800° C. ("Aged"). Results are provided in Table 10, which demonstrated that 8% $Nb_2O_5$ supported on Gd and Pr doped $CeO_2$ showed good thermal stability even after aging at 800° C. for 16 hours.

TABLE 10

NO conversion in $NH_3$-SCR reaction on catalysts with $Nb_2O_5$ loaded on Ce-based oxides

| Support (% by wt of metal oxides) | Testing condition | $NO_x$ conversion at different temperature (%) | | | | | |
|---|---|---|---|---|---|---|---|
| | | 150° C. | 200° C. | 250° C. | 300° C. | 350° C. | 400° C. |
| Ce90—Zr10 | No $H_2O$ and $CO_2$ | 16.2 | 50.6 | 94.8 | 100 | 95.1 | 80. |
| Ce90—Zr10 (Aged) | No $H_2O$ and $CO_2$ | 4.7 | 32.7 | 83.7 | 95.0 | 96.3 | 88.6 |
| Ce40—Zr60 | No $H_2O$ and $CO_2$ | 18.4 | 49.7 | 83.6 | 93.2 | 88.1 | 72.6 |
| Ce40—Zr60 (Aged) | No $H_2O$ and $CO_2$ | 8.5 | 13.0 | 31.6 | 65.9 | 79.9 | 81.2 |
| Ce95—Gd5 | No $H_2O$ and $CO_2$ | 12.3 | 52.9 | 93.6 | 100 | 94.6 | 85.4 |
| Ce95—Gd5 (Aged) | No $H_2O$ and $CO_2$ | 11.7 | 61.4 | 96.3 | 100 | 100 | 90.7 |
| Ce90—Gd10 | No $H_2O$ and $CO_2$ | 6.0 | 36.3 | 84.9 | 95.1 | 93.0 | 82.2 |
| Ce90—Gd10 (Aged) | No $H_2O$ and $CO_2$ | 3.7 | 36.4 | 91.0 | 100 | 96.8 | 87.8 |
| Ce90—La10 | No $H_2O$ and $CO_2$ | 7.5 | 21.4 | 67.4 | 89.5 | 90.7 | 80.9 |
| Ce90—La10 (Aged) | No $H_2O$ and $CO_2$ | 3.8 | 8.4 | 21.8 | 55.5 | 72.0 | 71.7 |
| Ce95—Pr5 | No $H_2O$ and $CO_2$ | 25.4 | 61.4 | 92.0 | 93.2 | 88.6 | 69.4 |

TABLE 10-continued

NO conversion in NH$_3$-SCR reaction on catalysts
with Nb$_2$O$_5$ loaded on Ce-based oxides

| Support (% by wt of metal oxides) | Testing condition | NO$_x$ conversion at different temperature (%) | | | | | |
|---|---|---|---|---|---|---|---|
| | | 150° C. | 200° C. | 250° C. | 300° C. | 350° C. | 400° C. |
| Ce95—Pr5 (Aged) | No H$_2$O and CO$_2$ | 5.0 | 50.8 | 93.8 | 95.3 | 88.0 | 78.6 |
| Ce90—Pr10 | No H$_2$O and CO$_2$ | 11.5 | 21.0 | 61.5 | 88.7 | 91.8 | 90.8 |
| Ce90—Pr10 (Aged) | No H$_2$O and CO$_2$ | 1.2 | 8.2 | 29.0 | 62.0 | 74.4 | 63.4 |
| Ce90—Y10 | No H$_2$O and CO$_2$ | 7.7 | 35.7 | 92.2 | 100 | 95.3 | 86.9 |
| Ce90—Y10 (Aged) | No H$_2$O and CO$_2$ | 2.5 | 11.7 | 50.2 | 85.4 | 92.0 | 83.8 |

Example 27. Nb$_2$O$_5$ on Sn-Doped Ceria with Different Sn Loadings

Catalyst materials containing 8% niobium oxide on tin (Sn) doped ceria-based oxides (molar ratio of Ce to Sn of 1, 3, 8, 20 and 40) were prepared by incipient wetness impregnation. A mixture of Ce(NO$_3$)$_3$ and SnCl$_4$ was adjusted by NH$_3$·H$_2$O to pH of 10. The precipitates were filtered and washed by DI water, followed by drying at 110° C. for 8 hours. The obtained solids were calcined at 550° C. for 2 hours. The pre-determined volume of ammonium niobate oxalate (C$_4$H$_4$NNbO$_9$) solution (1.0 M) was impregnated onto the doped oxide, followed by calcination at 550° C. for 2 hours with a ramp rate of 5° C./min. Certain samples were aged at 800° C. ("Aged"). Results are provided in Table 11, which demonstrated that the Nb$_2$O$_5$ on tin-doped ceria catalysts showed good low-temperature SCR activity. The optimal Ce/Sn molar ratio was 8, which gave the highest low-temperature activity after aging.

TABLE 10

NO conversion in NH$_3$-SCR reaction on Nb$_2$O$_5$/CeSnO$_x$ catalysts

| Ce/Sn molar ratio | Testing condition | NO$_x$ conversion at different temperature (%) | | | | | |
|---|---|---|---|---|---|---|---|
| | | 150° C. | 200° C. | 250° C. | 300° C. | 350° C. | 400° C. |
| Ce$_1$Sn | No H$_2$O and CO$_2$ | 5.9 | 41.2 | 91.8 | 100 | 100 | 100 |
| Ce$_3$Sn | No H$_2$O and CO$_2$ | 8.9 | 58.6 | 96.0 | 100 | 100 | 100 |
| Ce$_8$Sn | No H$_2$O and CO$_2$ | 20.0 | 71.6 | 96.9 | 100 | 100 | 92.0 |
| Ce$_8$Sn (Aged) | No H$_2$O and CO$_2$ | 18.7 | 78.8 | 100 | 100 | 100 | 92.5 |
| Ce$_{20}$Sn | No H$_2$O and CO$_2$ | 29.7 | 85.5 | 97.2 | 100 | 100 | 92.6 |
| Ce$_{20}$Sn (Aged) | No H$_2$O and CO$_2$ | 9.4 | 40.7 | 94.1 | 100 | 100 | 93.3 |
| Ce$_{40}$Sn | No H$_2$O and CO$_2$ | 24.6 | 84.3 | 100 | 100 | 100 | 90.4 |

Example 28. 8% Niobium Oxide/x % Copper Oxide on Ceria (Acidic Copper Source Catalysts with 8% Nb$_2$O$_5$ on ceria were prepared from an acidic copper source with different CuO loadings (0.25 wt %-5.0 wt %) and different orders of impregnation.

Some Examples were prepared by co-impregnation (CO) using different amounts of a 1M solution of Cu(NO$_3$)$_2$ and C$_4$H$_4$NNbO$_9$ followed by calcination at 550° C. for 2 hours with ramp rate of 5° C./min to give catalyst having CuO contents of 0.5 wt. %, 2.5 wt. %, 3.75 wt. %, and 5.0 wt. %. These were designated CuO—Nb$_2$O/CeO$_2$.

Some Examples were prepared by impregnation of C$_4$H$_4$NNbO$_9$ solution onto CeO$_2$ followed by calcination, then impregnation with copper using different amounts of a 1M solution of Cu(NO$_3$)$_2$ solution followed by calcination at 550° C. for 2 hours with ramp rate of 5° C./min to give catalyst having CuO contents of 0.25 wt %, 0.5 wt %, 1.0 wt %, and 2.0 wt %. These were designated CuO/Nb$_2$O$_5$/CeO$_2$.

Some Examples were prepared by impregnation with copper using different amounts of 1M Cu(NO$_3$)$_2$ solution followed by calcination at 550° C. for 2 hours with ramp rate of 5° C./min, followed by impregnation of a 1M C$_4$H$_4$NNbO$_9$ solution onto the Cu-modified CeO$_2$ followed by calcination, to give catalyst having CuO contents of 1.0 wt %. This was designated Nb$_2$O$_5$/CuO/CeO$_2$.

The catalysts were aged under different conditions (650° C., 700° C., and 800° C.) and evaluated for NO$_x$ conversion. Results are provided in Table 12, which demonstrated that the optimal CuO loading was 1.0 wt. % for Nb$_2$O$_5$/CuO/CeO$_2$, prepared with an acidic copper source. This Example gave the highest SCR activity among the catalyst Examples evaluated in Table 12.

TABLE 12

NO conversion in NH$_3$-SCR reaction on Nb$_2$O$_5$—CuO—CeO$_2$ catalysts

| Catalyst Composition (wt % and Nb/Cu IWI); aged/temp | Testing condition | NO$_x$ conversion at different temperature (%) | | | | | |
|---|---|---|---|---|---|---|---|
| | | 150° C. | 200° C. | 250° C. | 300° C. | 350° C. | 400° C. |
| 0.5CuO—Nb$_2$O$_5$ | No H$_2$O and CO$_2$ | 57.0 | 92.3 | 100 | 89.8 | 70.8 | — |
| 2.5CuO—Nb$_2$O$_5$ | No H$_2$O and CO$_2$ | 46.0 | 86.4 | 91.2 | 76.4 | 59.9 | — |
| 3.75CuO—Nb$_2$O$_5$ | No H$_2$O and CO$_2$ | 65.3 | 95.2 | 88.1 | 64.2 | 32.4 | — |
| 3.75CuO—Nb$_2$O$_5$, Aged@800 | No H$_2$O and CO$_2$ | 8.0 | 68.5 | 79.9 | 40.9 | 6.5 | 0 |
| 5.0CuO—Nb$_2$O$_5$ | No H$_2$O and CO$_2$ | 67.4 | 92.0 | 85.0 | 52.4 | 14.4 | — |
| 0.25CuO/Nb$_2$O$_5$ | No H$_2$O and CO$_2$ | 43.3 | 84.1 | 94.6 | 100 | 92.9 | 78.1 |
| 0.5CuO/Nb$_2$O$_5$ | No H$_2$O and CO$_2$ | 72.8 | 93.8 | 94.9 | 92.1 | 82.9 | 66.7 |
| 0.5CuO/Nb$_2$O$_5$, Aged@700 | No H$_2$O and CO$_2$ | 57.0 | 100 | 100 | 93.8 | 87.0 | 78.6 |
| 1.0CuO/Nb$_2$O$_5$ | No H$_2$O and CO$_2$ | 79.1 | 96.2 | 96.2 | 86.6 | 56.0 | 18.0 |
| 1.0CuO/Nb$_2$O$_5$, Aged@800 | No H$_2$O and CO$_2$ | 19.5 | 62.8 | 90.4 | 93.1 | 84.8 | 59.3 |
| 2.0CuO/Nb$_2$O$_5$ | No H$_2$O and CO$_2$ | 57.1 | 89.4 | 88.3 | 67.2 | 34.9 | — |
| Nb$_2$O$_5$/1.0CuO | No H$_2$O and CO$_2$ | 78.1 | 96.4 | 97.6 | 91.7 | 88.1 | 67.6 |
| Nb$_2$O$_5$/1.0CuO, Aged@650 | No H$_2$O and CO$_2$ | 35.0 | 74.4 | 91.6 | 82.6 | 68.5 | 45.6 |
| Nb$_2$O$_5$/1.0CuO, Aged@800 | No H$_2$O and CO$_2$ | 21.5 | 67.4 | 97.4 | 97.6 | 84.1 | 61.2 |
| Nb$_2$O$_5$/1.0CuO, Aged@650 | With 5% H$_2$O and 5% CO$_2$ | 35.2 | 76.7 | 100 | 100 | 100 | 66.5 |

Example 29. 8% Niobium Oxide/X % Iron Oxide on Ceria

Catalysts with 8% Nb$_2$O$_5$ on ceria were prepared with different iron loadings. Pre-determined volumes of Fe(NO$_3$)$_3$ solution and C$_4$H$_4$NNbO$_q$ solution were co-impregnated into CeO$_2$, followed by calcination at 550° C. for 2 hours with ramp rate of 5° C./min to give catalysts having iron loadings as Fe$_2$O$_3$ of 1.25 wt %, 2.5 wt %, and 3.75 wt %. Results are provided in Table 13, which demonstrated that the optimal loading of Fe$_2$O$_3$ was 2.5 wt % for xFe$_2$O$_3$—Nb$_2$O/CeO$_2$.

Example 30. 8% Niobium Oxide/x % Copper Oxide on Doped Ceria Supports

Catalyst materials containing 8% niobium oxide and 1% copper oxide (as CuO) on 5% niobium or 5% gadolinium-doped ceria were prepared by incipient wetness impregnation.

A Cu(NH$_3$)$_4$(NO$_3$)$_2$ solution was prepared by adding 25% NH$_3$·H$_2$O to a Cu(NO)$_2$ solution with a molar ratio n$_{(NH3)}$/n$_{(Cu)}$ of 16. Incipient wetness impregnation of a pre-determined volume of Cu(NH$_3$)$_4$(NO$_3$)$_2$ solution onto a mixed ceria-niobium oxide containing 95% ceria and 5% niobia was followed by calcination at 550° C. for 2 hours with ramp

TABLE 13

NO$_x$ conversion in NH$_3$-SCR reaction on Nb$_2$O$_5$—Fe$_2$O$_3$/CeO$_2$ catalysts

| Catalyst Composition | Testing condition | NO$_x$ conversion at different temperature (%) | | | | | |
|---|---|---|---|---|---|---|---|
| | | 150° C. | 200° C. | 250° C. | 300° C. | 350° C. | 400° C. |
| 1.25Fe$_2$O$_3$—8Nb$_2$O$_5$/CeO$_2$ | No H$_2$O and CO$_2$ | 15.2 | 70.0 | 96.0 | 97.8 | 95.1 | 85.6 |
| 2.5Fe$_2$O$_3$—8Nb$_2$O$_5$/CeO$_2$ | No H$_2$O and CO$_2$ | 25.7 | 79.9 | 98.6 | 97.3 | 89.8 | 72.7 |
| 2.5Fe$_2$O$_3$—8Nb$_2$O$_5$/CeO$_2$, Aged@650 | No H$_2$O and CO$_2$ | 13.9 | 57.9 | 95.3 | 95.1 | 84.8 | 57.8 |
| 3.75Fe$_2$O$_3$—8Nb$_2$O$_5$/CeO$_2$ | No H$_2$O and CO$_2$ | 23.7 | 70.6 | 95.3 | 94.6 | 83.6 | 52.2 | rate of 5° C./min. This material was incipient wetness impregnated with the pre-determined volume of $C_4H_4NNbO_9$ solution, followed by calcination at 550° C. for 2 hours with ramp rate of 5° C./min. Catalyst is designated $Nb_2O_5/CuO/Ce95Nb5O_x$.

A $Cu(NH_3)_4(NO_3)_2$ solution was prepared by adding 25% $NH_3 \cdot H_2O$ to a $Cu(NO)_2$ solution with a molar ratio $NH_3/Cu$ of 16. Incipient wetness impregnation of a pre-determined volume of $Cu(NH_3)_4(NO_3)_2$ solution onto a mixed ceria-gadolinia oxide containing 95% ceria and 5% gadolinia was followed by calcination at 550° C. for 2 hours with ramp rate of 5° C./min. This material was incipient wetness impregnated with the pre-determined volume of $C_4H_4NNbO_9$ solution followed by calcination at 550° C. for 2 hours with ramp rate of 5° C./min to give a catalyst designated $Nb_2O_5/CuO/Ce95Gd5O_x$.

Results are provided in Table 14, which demonstrated that all the doped ceria catalysts showed good thermal-stability width moderate low-temperature activity.

Example 32. Copper Oxide or Iron Oxide on Ceria-Doped Alumina Catalysts

Catalyst materials containing mixed oxides of copper and ceria or iron and ceria, each supported on alumina, were prepared by incipient wetness impregnation.

Solutions of $Ce(NO_3)_3$ and different concentrations of $Cu(NO_3)_2$ were co-impregnated onto $Al_2O_3$ followed by calcination at 550° C. for 2 hours with ramp rate of 5° C./min. to give catalysts containing 20 wt % of ceria and 0.5%, 1.25%, 2.5%, or 3.75 wt % CuO on alumina.

Solutions of $Ce(NO_3)_3$ and different concentrations of $Fe(NO_3)_3$ were co-impregnated onto $Al_2O_3$ followed by calcination at 550° C. for 2 hours with ramp rate of 5° C./min. to give catalysts containing 20 wt % of ceria and 1.25%, 2.5%, 3.75%, or 5 wt % $Fe_1O_3$ on alumina.

Results are provided in Table 16, which demonstrated that the optimal loading of CuO for $xCuO-CeO_2/Al_2O_3$ was 1.25 wt %. With the increase of $Fe_2O_3$ loading, the low-temperature activity of $Fe_2O_3-CeO_2/Al_2O_3$ increased, but remained lower than that of the 1.25% $CuO-CeO_2/Al_2O_3$ catalyst.

TABLE 14

$NO_x$ conversion in $NH_3$-SCR reaction on $Nb_2O_5/CuO/Ce95M5O_x$ catalysts

| Catalyst Composition (aged) | Testing condition | $NO_x$ conversion at different temperature (%) | | | | | |
|---|---|---|---|---|---|---|---|
| | | 150° C. | 200° C. | 250° C. | 300° C. | 350° C. | 400° C. |
| $Nb_2O_5/CuO/Ce95Gd5O_x$ | With 5% $H_2O$ and 5% $CO_2$ | 24.7 | 53.4 | 80.2 | 89.1 | 82.1 | 45.0 |
| $Nb_2O_5/CuO/Ce95Gd5O_x$, Aged@650 | With 5% $H_2O$ and 5% $CO_2$ | 28.6 | 60.7 | 83.0 | 92.6 | 86.1 | 56.9 |
| $Nb_2O_5/CuO/Ce95Nb5O_x$ | With 5% $H_2O$ and 5% $CO_2$ | 16.8 | 32.6 | 71.57 | 100 | 100 | 91.8 |
| $Nb_2O_5/CuO/Ce95Nb5O_x$, Aged@650 | Wi th 5% $H_2O$ and 5% $CO_2$ | 22.0 | 38.1 | 69.8 | 96.1 | 96.3 | 84.5 |

Example 31. Ceria-Doped Alumina Supports

Support materials containing ceria-doped alumina were prepared by incipient wetness impregnation. A $Ce(NO_3)_3$ solution was prepared and incipient wetness impregnated onto alumina using various pre-determined volumes to give doped aluminas containing 10%, 15%, 20%, or 25% ceria by weight. Results are provided in Table 15, which demonstrated that the optimal loading of $CeO_2$ for $xCeO_2/Al_2O_3$ was determined to be 20 wt %.

TABLE 15

NO conversion in $NH_3$-SCR reaction on $CeO_2/Al_2O_3$ supports

| $CeO_2$ content (wt %) | Testing condition | $NO_x$ conversion at different temperature (%) | | | | | |
|---|---|---|---|---|---|---|---|
| | | 150° C. | 200° C. | 250° C. | 300° C. | 350° C. | 400° C. |
| 10 | No $H_2O$ and $CO_2$ | 0.0 | 9.3 | 25.9 | 66.3 | 94.2 | 93.7 |
| 15 | No $H_2O$ and $CO_2$ | 0.6 | 3.7 | 31.4 | 74.0 | 96.4 | 96.7 |
| 20 | No $H_2O$ and $CO_2$ | 4.5 | 15.9 | 48.8 | 90.8 | 97.4 | 95.6 |
| 25 | No $H_2O$ and $CO_2$ | 6.1 | 13.9 | 38.1 | 83.7 | 98.2 | 94.8 |

TABLE 16

NO conversion in NH$_3$-SCR reaction for CuO-CeO$_2$ on Al$_2$O$_3$ and Fe$_2$O$_5$—CeO$_2$ on Al$_2$O$_3$ catalysts (CeO$_2$ loading on the alumina support was 20%).

| Catalyst (wt % metal oxide) | Testing condition | NO$_x$ conversion at different temperature (%) | | | | | |
|---|---|---|---|---|---|---|---|
| | | 150° C. | 200° C. | 250° C. | 300° C. | 350° C. | 400° C. |
| 0.5 CuO | No H$_2$O and CO$_2$ | 13.3 | 38.9 | 73.0 | 98.0 | 95.1 | 90.4 |
| 1.25 CuO | No H$_2$O and CO$_2$ | 20.9 | 59.9 | 91.8 | 96.3 | 93.7 | 82.1 |
| 2.5 CuO | No H$_2$O and CO$_2$ | 18.2 | 55.5 | 86.7 | 97.5 | 90.0 | 77.3 |
| 3.75 CuO | No H$_2$O and CO$_2$ | 13.9 | 40.8 | 73.5 | 91.9 | 84.9 | 71.4 |
| 1.25 Fe$_2$O$_3$ | No H$_2$O and CO$_2$ | 9.3 | 33.7 | 73.1 | 96.4 | 97.7 | 91.7 |
| 2.5 Fe$_2$O$_3$ | No H$_2$O and CO$_2$ | 9.5 | 37.7 | 76.6 | 96.7 | 98.0 | 90.7 |
| 3.75 Fe$_2$O$_3$ | No H$_2$O and CO$_2$ | 10.5 | 41.9 | 79.2 | 95.7 | 94.8 | 86.6 |
| 5 Fe$_2$O$_3$ | No H$_2$O and CO$_2$ | 13.5 | 49.3 | 89.2 | 100 | 94.9 | 82.0 |

Example 33. Tungsten Oxide on Ceria-Doped Alumina Supports

Tungsten oxide on ceria-doped alumina support materials were prepared by incipient wetness impregnation. Solutions of various amounts of Ce(NO$_3$)$_3$ and H$_{28}$N$_6$O$_{41}$W$_{12}$ were prepared and incipient wetness impregnated onto alumina using various pre-determined volumes to give catalysts containing 20%, 30%, or 40% ceria by weight, and 5%, 10%, 15%, or 20% WO$_3$ by weight (xWO$_3$-yCeO$_2$/Al$_2$O$_3$). Results are provided in Table 17, which demonstrated that among the catalysts evaluated, the 20% WO$_3$-40% CeO$_2$/Al$_2$O$_3$ catalyst had the highest low temperature activity, while significant loss was observed in activity after aging at 800° C.

Example 34. 8% Niobium Oxide and Various Amounts of Manganese Oxide on Ceria Catalyst were prepared by co-impregnation using pre-determined amounts of a 1M solution of Mn(NO$_3$)$_2$ and C$_4$H$_4$NNbO$_9$ followed by calcination at 550° C. for 2 hours with ramp rate of 5° C./min to give catalyst with 8% Nb$_2$O$_5$ and 1%, 2%, or 5% MnO$_2$ content on CeO$_2$, designated as xMnO$_2$—Nb$_2$O$_5$/CeO$_2$. The catalysts were aged under different conditions (650° C., 700° C., and 800° C.) and evaluated for NO$_x$ conversion. Results are provided in Table 19, which demonstrated that the optimal MnO$_2$ loading was 2 wt %, which catalyst showed good SCR activity even after aging at 800° C.

TABLE 17

NO$_x$ conversion in NH$_3$-SCR reaction on WO$_3$—CeO$_2$/Al$_2$O$_3$ catalysts

| Catalyst (Aged) | Testing condition | NO$_x$ conversion at different temperature (%) | | | | | |
|---|---|---|---|---|---|---|---|
| | | 150° C. | 200° C. | 250° C. | 300° C. | 350° C. | 400° C. |
| 5WO$_3$—20CeO$_2$/Al$_2$O$_3$ | No H$_2$O and CO$_2$ | 3.6 | 6.6 | 19.2 | 40.0. | 560 | 65 |
| 10WO$_3$—20CeO$_2$/Al$_2$O$_3$ | No H$_2$O and CO$_2$ | 6.0 | 10.7 | 45.9 | 80.1 | 87.8 | 88.2 |
| 10WO$_3$—20CeO$_2$/Al$_2$O$_3$, Aged@800 | No H$_2$O and CO$_2$ | 3.9 | 8.3 | 35.1 | 76.4 | 85.0 | 78.5 |
| 15WO$_3$—20CeO$_2$/Al$_2$O$_3$ | No H$_2$O and CO$_2$ | 3.9 | 11.9 | 46.6 | 75.5 | 82.9 | 75.3 |
| 15WO$_3$—30CeO$_2$/Al$_2$O$_3$ | No H$_2$O and CO$_2$ | 4.2 | 12.8 | 56.7 | 87.7 | 87.8 | 74.4 |
| 15WO$_3$—30CeO$_2$/Al$_2$O$_3$, Aged@800 | No H$_2$O and CO$_2$ | 3.0 | 9.5 | 37.3 | 75.3 | 84.8 | 78.6 |
| 20WO$_3$—40CeO$_2$/Al$_2$O$_3$ | No H$_2$O and CO$_2$ | 11.3 | 37.6 | 92.3 | 100 | 95.8 | 80.8 |
| 20WO$_3$—40CeO$_2$/Al$_2$O$_3$, Aged@800 | No H$_2$O and CO$_2$ | 0.0 | 0.0 | 0.1 | 60.3 | 75.1 | 74.1 |

TABLE 18

NO$_x$ conversion in NH$_3$-SCR reaction on MnO$_2$—Nb$_2$O$_5$/CeO$_2$ catalysts with different MnO$_2$ loadings prepared by IWI method

| Catalyst (Aged) | Testing condition | \multicolumn{6}{c}{NO$_x$ conversion at different temperature (%)} | | | | | |
|---|---|---|---|---|---|---|---|
| | | 150° C. | 200° C. | 250° C. | 300° C. | 350° C. | 400° C. |
| 1MnO$_2$—Nb$_2$O$_5$/CeO$_2$ | No H$_2$O and CO$_2$ | 23.5 | 75.8 | 97.6 | 99.1 | 98.3 | 92.6 |
| 1MnO$_2$—Nb$_2$O$_5$/CeO$_2$, Aged@700 | No H$_2$O and CO$_2$ | 19.1 | 74.6 | 96.3 | 96.7 | 96.8 | 92.0 |
| 2MnO$_2$—Nb$_2$O$_5$/CeO$_2$ | No H$_2$O and CO$_2$ | 54.6 | 92.8 | 97.7 | 96.4 | 88.6 | 72.1 |
| 2MnO$_2$—Nb$_2$O$_5$/CeO$_2$, Aged@650 | No H$_2$O and CO$_2$ | 51.6 | 91.2 | 100 | 100 | 93.1 | 92.3 |
| 2MnO$_2$—Nb$_2$O$_5$/CeO$_2$, Aged@700 | No H$_2$O and CO$_2$ | 46.2 | 90.6 | 100 | 100 | 96.8 | 81.6 |
| 2MnO$_2$—Nb$_2$O$_5$/CeO$_2$, Aged@800 | No H$_2$O and CO$_2$ | 18.9 | 70.6 | 96.3 | 100 | 98.2 | 94.4 |
| 5MnO$_2$—Nb$_2$O$_5$/CeO$_2$ | No H$_2$O and CO$_2$ | 53.6 | 80.0 | 88.6 | 83.2 | 69.4 | 51.4 |
| 5MnO$_2$—Nb$_2$O$_5$/CeO$_2$, Aged@700 | No H$_2$O and CO$_2$ | 41.8 | 78.9 | 97.7 | 100 | 96.8 | 90.7 |
| 5MnO$_2$—Nb$_2$O$_5$/CeO$_2$, Aged@800 | No H$_2$O and CO$_2$ | 24.9 | 82.5 | 100 | 98.4 | 94.1 | 84.7 |

Example 35. 8% Niobium Oxide and 2% Manganese Oxide on Ceria

Catalysts with 8% Nb$_2$O$_5$ on ceria were prepared with 2% manganese loading using different orders of impregnation.

A catalyst was prepared by impregnation with manganese using a pre-determined amount of a 1M solution of Mn(NO$_3$)$_2$ followed by calcination at 550° C. for 2 hours with ramp rate of 5° C./min, followed by impregnation of a 1M C$_4$H$_4$NNbO$_9$ solution onto the Mn-modified CeO$_2$ followed by calcination, to give a catalyst having MnO$_2$ content of 2.0 wt %. (designated Nb$_2$O$_5$/MnO$_2$/CeO$_2$).

A catalyst was prepared impregnation of C$_4$H$_4$NNbO$_9$ solution onto CeO$_2$ followed by calcination, then impregnation with a 1M solution of Mn(NO$_3$)$_2$, followed by calcination at 550° C. for 2 hours with ramp rate of 5° C./min to give a catalyst having MnO$_2$ content of 2.0 wt % and designated MnO$_2$/Nb$_2$O$_5$/CeO$_2$.

A catalyst was prepared by co-impregnation using a pre-determined amount of a 1M solution of Mn(NO$_3$)$_2$ and C$_4$H$_4$NNbO$_9$ followed by calcination at 550° C. for 2 hours with ramp rate of 5° C./min to give a catalyst having MnO$_2$ content of 2.0 wt % and designated MnO$_2$—Nb$_2$O$_5$/CeO$_2$.

The catalysts were aged under different conditions (650° C., 700° C., and 800° C.) and evaluated for NO$_x$ conversion. Results are provided in Table 18, which demonstrated that catalyst prepared W co-impregnation of MnO$_2$ and Nb$_2$O$_5$ on CeO$_2$ (MnO$_2$—Nb$_2$O$_5$/CeO$_2$) showed the highest SCR activity before and after aging. This catalyst survived under aging temperatures below 700° C.

TABLE 19

NO$_x$ conversion in NH$_3$-SCR reaction on MnO$_2$—Nb$_2$O$_5$—CeO$_2$ catalysts prepared by different IWI methods

| Catalyst (Aged) | Testing condition | \multicolumn{6}{c}{NO$_x$ conversion at different temperature (%)} | | | | | |
|---|---|---|---|---|---|---|---|
| | | 150° C. | 200° C. | 250° C. | 300° C. | 350° C. | 400° C. |
| MnO$_2$/Nb$_2$O$_5$/CeO$_2$ | With 5% H$_2$O and 5% CO$_2$ | 14.8 | 44.7 | 88.9 | 100 | 97.7 | 85.9 |
| MnO$_2$/Nb$_2$O$_5$/CeO$_2$, Aged@650 | With 5% H$_2$O and 5% CO$_2$ | 13.9 | 38.2 | 79.6 | 94.5 | 90.5 | 78.5 |
| Nb$_2$O$_5$/MnO$_2$/CeO$_2$ | With 5% H$_2$O and 5% CO$_2$ | 28.2 | 67.0 | 100 | 96.7 | 84.9 | 41.0 |
| Nb$_2$O$_5$/MnO$_2$/CeO$_2$, Aged@650 | With 5% H$_2$O and 5% CO$_2$ | 18.2 | 51.5 | 90.8 | 100 | 96.9 | 66.8 |
| MnO$_2$—Nb$_2$O$_5$/CeO$_2$ | With 5% H$_2$O and 5% CO$_2$ | 36.5 | 76.5 | 100 | 100 | 96.7 | 74.9 |
| MnO$_2$—Nb$_2$O$_5$/CeO$_2$, Aged@650 | With 5% H$_2$O and 5% CO$_2$ | 30.1 | 68.6 | 95.5 | 100 | 96.7 | 73.6 |
| MnO$_2$—Nb$_2$O$_5$/CeO$_2$ | No H$_2$O and CO$_2$ | 54.6 | 92.8 | 97.7 | 96.4 | 88.6 | 72.1 |
| MnO$_2$—Nb$_2$O$_5$/CeO$_2$, Aged@650 | No H$_2$O and CO$_2$ | 51.6 | 91.2 | 100 | 100 | 93.1 | 92.3 |
| MnO$_2$—Nb$_2$O$_5$/CeO$_2$, Aged@700 | No H$_2$O and CO$_2$ | 46.9 | 90.3 | 100 | 100 | 97.0 | 81.7 |
| MnO$_2$—Nb$_2$O$_5$/CeO$_2$, Aged@800 | No H$_2$O and CO$_2$ | 18.9 | 70.6 | 96.3 | 100 | 98.2 | 94.4 |

Example 36. Catalysts with 8% Niobium Oxide, 2% $MnO_2$, and 1% CuO on Ceria

A series of catalysts were prepared containing 8% $Nb_2O_5$, 2% $MnO_2$, 1% CuO on ceria were prepared using different orders of impregnation and different copper sources.

A catalyst was prepared by co-impregnation using a pre-determined amount of a 1M solution of $Mn(NO_3)_2$ and $Cu(NO_3)$ onto $CeO_2$ followed by calcination at 550° C. for 2 hours with ramp rate of 5° C./min. This material was impregnated with a 1M $C_4H_4NNbO_9$ solution followed by calcination at 550° C. for 2 hours with ramp rate of 5° C./min to give a catalyst designated $Nb_2O_5$/CuO—$MnO_2$/$CeO_2$-A A catalyst was prepared by impregnation of $CU(NH_3)_4(NO_3)_2$ solution onto $CeO_2$ followed by calcination, then co-impregnation of a pre-determined volume of $C_4H_4NNbO_9$ and $Mn(NO_3)_2$ solution followed by calcination at 550° C. for 2 hours with ramp rate of 5° C./min to give a catalyst designated $MnO_2$—$Nb_2O_5$/CuO/$CeO_2$.

A catalyst was prepared by impregnation of a solution of $Cu(NO_3)$ onto $CeO_2$ followed by calcination at 550° C. for 2 hours with ramp rate of 5° C./min. This was followed by co-impregnation with a pre-determined volume of $C_4H_4NNbO_9$ and $Mn(NO_3)_2$ solution followed by calcination at 550° C. for 2 hours with ramp rate of 5° C./min to give a catalyst designated $MnO_2$—$Nb_2O_5$/CuO/$CeO_2$-A.

A catalyst was prepared by co-impregnation using a pre-determined amount of a $C_4H_4NNbO_9$ solution $Cu(NO_3)_2$ solution and $Mn(NO_3)_2$ solution onto $CeO_2$ followed by calcination at 550° C. for 2 hours with ramp rate of 5° C./min to give a catalyst designated CuO—$MnO_2$—$Nb_2O_5$/$CeO_2$-A.

The catalysts were aged under different conditions (650° C., 700° C., and 800° C.) and evaluated for $NO_x$ conversion. Results are provided in Table 20, which demonstrated that among Cu/Mn/Nb on ceria catalysts prepared by different IWI methods and with different copper sources, the $MnO_2$—$Nb_2O_5$/CuO/$CeO_2$ catalyst performed the best with respect to SCR activity.

EXAMPLE EMBODIMENTS

Without limitation, some embodiments according to the present disclosure include:

Embodiment 1. A selective catalytic reduction (SCR) catalyst composition for the abatement of nitrogen oxides ($NO_x$), the catalyst composition comprising:
a reducible metal oxide support comprising ceria;
a redox promotor comprising one or more transition metal oxides; and
an acidic promotor comprising an oxide of niobium, tungsten, silicon, molybdenum, or a combination thereof, wherein the redox promotor and the acid promotor are supported on the reducible metal oxide support.

Embodiment 2. The composition of Embodiment 1, wherein the reducible metal oxide support comprises ceria in an amount ranging from about 20% to about 100% by weight of the reducible metal oxide support on an oxide basis.

Embodiment 3. The composition of Embodiment 1, wherein the reducible metal oxide support further comprises zirconia, alumina, silica, titania, baria, niobia, tin oxide, yttrium oxide, an oxide of a rare earth metal, or a combination thereof.

Embodiment 4. The composition of Embodiment 3, wherein the rare earth metal is selected from lanthanum, praseodymium, neodymium, samarium, europium, and gadolinium.

Embodiment 5. The composition of any one of Embodiments 1-4, wherein both the redox promotor and the acid promotor are impregnated onto the reducible metal oxide support.

Embodiment 6. The composition of any one of Embodiments 1-5, wherein at least a portion of the redox promotor and at least a portion of the acid promotor are supported on the reducible metal oxide support in the form of a mixed metal oxide.

Embodiment 7. The composition of any one of Embodiments 1-4, wherein the redox promotor is impregnated onto

TABLE 20

$NO_x$ conversion in $NH_3$-SCR reaction on $MnO_2$—$Nb_2O_5$—CuO—$CeO_2$ catalysts prepared by different IWI methods

| Catalyst (Aged) | Testing condition | $NO_x$ conversion at different temperature (%) | | | | | |
|---|---|---|---|---|---|---|---|
| | | 150° C. | 200° C. | 250° C. | 300° C. | 350° C. | 400° C. |
| $MnO_2$—$Nb_2O_5$/CuO/$CeO_2$-A | With 5% $H_2O$ and 5% $CO_2$ | 34.9 | 80.9 | 100 | 100 | 92.5 | 46.1 |
| $MnO_2$—$Nb_2O_5$/CuO/$CeO_2$-A, Aged@650 | With 5% $H_2O$ and 5% $CO_2$ | 29.4 | 76.8 | 95.6 | 93.5 | 87.8 | 65.7 |
| $MnO_2$—$Nb_2O_5$/CuO/$CeO_2$ | With 5% $H_2O$ and 5% $CO_2$ | 34.2 | 84.2 | 100 | 100 | 97.1 | 69.7 |
| $MnO_2$—$Nb_2O_5$/CuO/$CeO_2$, Aged@650 | With 5% $H_2O$ and 5% $CO_2$ | 22.8 | 58.9 | 92.0 | 97.9 | 66.9 | −1.4 |
| $Nb_2O_5$/$MnO_2$—CuO/$CeO_2$-A | With 5% $H_2O$ and 5% $CO_2$ | 43.8 | 82.6 | 100 | 100 | 100 | 75.7 |
| $Nb_2O_5$/$MnO_2$—CuO/$CeO_2$-A, Aged@650 | With 5% $H_2O$ and 5% $CO_2$ | 28.3 | 65.5 | 95.6 | 100 | 73.9 | 11.7 |
| $MnO_2$—$Nb_2O_5$—CuO/$CeO_2$-A | With 5% $H_2O$ and 5% $CO_2$ | 22.3 | 65.8 | 100 | 100 | 67.9 | 13.5 | the reducible metal oxide, and at least a portion of the acid promotor is disposed on the redox promotor.

Embodiment 8. The composition any one of Embodiments 1-7, wherein the redox promotor is present in an amount ranging from about 0.1% to about 10% by weight, based on the total weight of the catalyst composition.

Embodiment 9. The composition any one of Embodiments 1-8, wherein the acidic promotor is present in an amount ranging from about 2% to about 20% by weight, based on the total weight of the catalyst composition.

Embodiment 10. The composition any one of Embodiments 1-9, wherein the acidic promotor is present in an amount ranging from about 6% to about 10% by weight, based on the total weight of the catalyst composition.

Embodiment 11: The composition any one of Embodiments 1-10, wherein the acidic promotor comprises an oxide of niobium, tungsten, silicon, molybdenum, or a combination thereof.

Embodiment 12: The composition any one of Embodiments 1-11, wherein the acidic promotor is $WO_3$.

Embodiment 13. The composition any one of Embodiments 1-12, wherein the acidic promotor is niobium (V) oxide ($Nb_2O_5$).

Embodiment 14. The composition any one of Embodiments 1-13, wherein the redox promotor is present in an amount ranging from about 0.2% to about 10% by weight, based on the total weight of the catalyst composition.

Embodiment 15. The composition any one of Embodiments 1-14, wherein the redox promotor is present in an amount ranging from about 0.5% to about 3% by weight, based on the total weight of the catalyst composition.

Embodiment 16. The composition any one of Embodiments 1-15, wherein the redox promotor comprises an oxide of scandium, titanium, vanadium, chromium, manganese, iron, cobalt, nickel, copper, zinc, yttrium, zirconium, niobium, molybdenum, technetium, cadmium, lanthanum, hafnium, tantalum, tungsten, mercury, or a combination thereof.

Embodiment 17. The composition any one of Embodiments 1-16, wherein the redox promotor comprises an oxide of copper, manganese, iron, cobalt, nickel, or a combination thereof.

Embodiment 18. The composition of any one of Embodiments 1-17, wherein the redox promotor comprises an oxide of copper, manganese, or a combination thereof.

Embodiment 19. The composition of Embodiment 18, wherein the redox promotor further comprises an oxide of iron.

Embodiment 20. The composition any one of Embodiments 1-19, wherein the composition further comprises a non-reducible refractory metal oxide support.

Embodiment 21. The composition of Embodiment 1, wherein:
the reducible metal oxide support comprises at least about 20% ceria by weight by weight of the reducible metal oxide support;
the redox promotor comprises an oxide of copper, an oxide of manganese, or both, wherein each oxide present is in an amount ranging from about 0.5% to about 10% by weight on an oxide basis, based on the total weight of the catalyst composition, and optionally, an oxide of iron in an amount ranging from about 0.1% to about 10% by weight on an oxide basis, based on the total weight of the catalyst composition; and
the acidic promotor is niobium (V) oxide ($Nb_2O_5$), present in an amount ranging from about 6% to about 10% by weight on an oxide basis, based on the total weight of the catalyst composition.

Embodiment 22. The composition of Embodiment 21, wherein the oxide of iron is $Fe_2O_3$, present in an amount ranging from about 2% to about 8% by weight on an oxide basis, based on the total weight of the catalyst composition.

Embodiment 23. The composition of any one of Embodiments 1-22, further comprising a non-reducible refractory metal oxide support selected from alumina, zirconia, titania, silica, and combinations thereof.

Embodiment 24. The composition of any one of Embodiments 1-23, wherein an ammonia storage capacity of the catalyst composition, as measured by temperature programmed desorption (TPD) with $NH_3$ adsorption temperature at 40° C., is less than about 200 μmoles per gram of catalyst composition.

Embodiment 24. The catalyst composition of any one of Embodiments 1-23, wherein after aging at 650° C. for 50 hours in air in the presence of 10% water vapor, the conversion of nitrogen oxides ($NO_x$) in a gas stream at 200° C. is greater than about 70% when the catalyst composition is tested under the following conditions: at an exhaust gas hourly volume-based space velocity of 250,000 $h^{-1}$, the exhaust gas comprising a gas mixture of 500 ppm $NO_x$, 500 ppm $NH_3$, 10% $O_2$, 5% $CO_2$, 5% $H_2O$ and the balance $N_2$.

Embodiment 25. An SCR catalyst article to abate nitrogen oxides ($NO_x$), the SCR catalyst article comprising a substrate having the selective catalytic reduction (SCR) catalyst composition according to any one of claims 1-24 disposed on at least a portion thereof.

Embodiment 26. The article of Embodiment 25, wherein a washcoat comprises the SCR catalyst composition.

Embodiment 27. The article of any one of Embodiments 25 and 26, wherein the substrate is a honeycomb substrate.

Embodiment 28. The article of Embodiment 27, wherein the honey comb substrate is a flow-through substrate or a wall-flow filter.

Embodiment 29, An exhaust gas treatment system comprising the article according to any one of Embodiments 25 to 28, positioned downstream from and in fluid communication with an internal combustion engine that produces an exhaust gas stream.

Embodiment 30. The exhaust gas treatment system of Embodiment 29, wherein the SCR catalyst article is in a close coupled position, the exhaust gas treatment system further comprising a conventional SCR catalyst article positioned downstream from and in fluid communication with the SCR catalyst article, the conventional SCR catalyst article comprising a copper- or iron-promoted zeolite.

Embodiment 31. The exhaust gas treatment system of Embodiment 30, comprising a one or more additional components selected from a diesel oxidation catalyst (DOC), a soot filter (which can be catalyzed or uncatalyzed), a urea injection component, an ammonia oxidation catalyst ($AMO_x$), a low-temperature $NO_x$ absorber (LT-NA), a lean $NO_x$ trap (LNT), and combinations thereof.

Embodiment 32. The exhaust gas treatment system of Embodiment 30, comprising a first urea injector disposed upstream from and in fluid communication with the SCR catalyst article, and a second urea injector disposed downstream from the SCR catalyst article, and upstream from and in fluid communication with the conventional SCR catalyst article.

Embodiment 33. A method of treating an exhaust gas stream, the method comprising contacting the exhaust gas stream from an internal combustion engine with the catalyst article of any of Embodiments 25-28, or the exhaust gas treatment system of any of Embodiments 29-32, for a time and at a temperature sufficient to reduce the level of nitrogen oxides ($NO_x$) in the exhaust gas stream.

Embodiment 34. A method for preparing a selective catalytic reduction (SCR) catalyst composition comprising a reducible metal oxide support comprising ceria, a redox promotor comprising one or more transition metal oxides, and an acidic promotor comprising an oxide of niobium, tungsten, silicon, or a combination thereof, wherein the redox promotor and the acid promotor are supported on the reducible metal oxide support, the method comprising:

contacting the reducible metal oxide support with a redox promotor precursor and an acidic promotor precursor; and optionally calcining the reducible metal oxide support.

Embodiment 35. The method of Embodiment 34, wherein contacting comprises sequentially impregnating the reducible metal oxide support first with the redox promotor precursor, followed by a second impregnation with the acidic promotor precursor.

Embodiment 36. The method of Embodiment 34, wherein contacting comprises sequentially impregnating the reducible metal oxide support first with the acidic promotor precursor, followed by a second impregnation with the redox promotor precursor.

Embodiment 37. The method of Embodiment 34, wherein contacting comprises co-impregnating the reducible metal oxide support with the redox promotor precursor and the acidic promotor precursor.

Embodiment 38. The method of Embodiments 35 or 36, wherein calcining comprises calcining the reducible metal oxide support after the first impregnation and calcining the reducible metal oxide support after the second impregnation.

Embodiment 39. The method of any one of Embodiments 34-38, wherein the acidic promotor precursor is a niobium (V) salt or a tungsten (VI) salt.

Embodiment 40. The method of any one of Embodiment 34-39, wherein the acidic promotor precursor is ammonium niobium oxalate.

Embodiment 41. The method of any one of Embodiments 35-40, wherein the redox promotor precursor comprises a salt of copper, manganese, iron, or any combination thereof.

Embodiment 42. The method of any one of Embodiments 35-41, wherein the redox promotor precursor comprises an acidic copper salt.

Embodiment 43. The method of any one of Embodiments 35-41, wherein the redox promotor precursor comprises a basic copper salt.

Embodiment 44. The method of Embodiment 43, wherein the redox promotor precursor comprises $[Cu(NH_4)]^{2+}$.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the present disclosure. In particular, although many of the examples presented herein involve specific combinations of method acts or system elements, it should be understood that those acts and those elements may be combined in other ways to accomplish the same objectives.

Furthermore, those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto; the invention may be practiced other than as specifically described.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:

1. A selective catalytic reduction (SCR) catalyst composition for the abatement of nitrogen oxides ($NO_x$), the catalyst composition comprising:
   a reducible metal oxide support comprising ceria;
   a redox promotor comprising one or more transition metal oxides; and
   an acidic acid promotor comprising an oxide of niobium, tungsten, silicon, molybdenum, or a combination thereof, wherein the redox promotor and the acid promotor are supported on the reducible metal oxide support, and the acid promotor is niobium (V) oxide ($Nb_2O_5$), present in an amount of about 6% to about 10% by weight on an oxide basis, based on the total weight of the catalyst composition.

2. The catalyst composition of claim 1, wherein the reducible metal oxide support comprises ceria in an amount ranging from about 20% to about 100% by weight of the reducible metal oxide support on an oxide basis.

3. The catalyst composition of claim 1, wherein the reducible metal oxide support further comprises zirconia, alumina, silica, titania, baria, niobia, tin oxide, yttrium oxide, an oxide of a rare earth metal, or a combination thereof.

4. The catalyst composition of claim 1, wherein both the redox promotor and the acid promotor are impregnated onto the reducible metal oxide support.

5. The catalyst composition of claim 1, wherein at least a portion of the redox promotor and at least a portion of the acid promotor are supported on the reducible metal oxide support in the form of a mixed metal oxide.

6. The catalyst composition of claim 1, wherein the redox promotor is impregnated onto the reducible metal oxide, and at least a portion of the acid promotor is disposed on the redox promotor.

7. The catalyst composition of claim 1, wherein the acidic acid promotor is present in an amount ranging from about 2% to about 20% by weight, based on the total weight of the catalyst composition.

8. The catalyst composition of claim 1, wherein the redox promotor is present in an amount ranging from about 0.2% to about 10% by weight, based on the total weight of the catalyst composition.

9. The catalyst composition of claim 1, wherein:
the reducible metal oxide support comprises at least about 20% ceria by weight of the reducible metal oxide support;
the redox promotor comprises an oxide of copper, an oxide of manganese, or both, wherein each oxide present is in an amount ranging from about 0.5% to about 10% by weight on an oxide basis, based on the total weight of the catalyst composition, and optionally, an oxide of iron in an amount ranging from about 0.1% to about 10% by weight on an oxide basis, based on the total weight of the catalyst composition.

10. The catalyst composition of claim 9, wherein the oxide of iron is $Fe_2O_3$ is present in an amount ranging from about 2% to about 8% by weight on an oxide basis, based on the total weight of the catalyst composition.

11. The catalyst composition of claim 1, further comprising a non-reducible refractory metal oxide support selected from alumina, zirconia, titania, silica, and combinations thereof.

12. The catalyst composition of claim 1, wherein an ammonia storage capacity of the catalyst composition, as measured by temperature programmed desorption (TPD) with $NH_3$ adsorption temperature at 40° C., is less than about 200 μmoles per gram of catalyst composition.

13. The catalyst composition of claim 1, wherein after aging at 650° C. for 50 hours in air in the presence of 10% water vapor, the conversion of nitrogen oxides ($NO_x$) in a gas stream at 200° C. is greater than about 70% when the catalyst composition is tested under the following conditions: at an exhaust gas hourly volume-based space velocity of 250,000 $h^{-1}$, the exhaust gas comprising a gas mixture of 500 ppm NO, 500 ppm $NH_3$, 10% $O_2$, 5% $CO_2$, 5% $H_2O$ and the balance $N_2$.

14. A selective catalytic reduction (SCR) catalyst article to abate nitrogen oxides ($NO_x$), the SCR catalyst article comprising a substrate having a SCR catalyst composition disposed on at least a portion thereof,
wherein the SCR catalyst composition comprises:
a reducible metal oxide support comprising ceria;
a redox promotor comprising one or more transition metal oxides; and
an acidic acid promotor comprising an oxide of niobium, tungsten, silicon, molybdenum, or a combination thereof, wherein the redox promotor and acid promotor are supported on the reducible metal oxide support, and the acid promotor is niobium (V) oxide ($Nb_2O_5$), present in an amount of about 6% to about 10% by weight on an oxide basis, based on the total weight of the catalyst composition.

15. The SCR catalyst article of claim 14, wherein the substrate is a honeycomb substrate.

16. An exhaust gas treatment system comprising the SCR catalyst article according to claim 14, positioned downstream from and in fluid communication with an internal combustion engine that produces an exhaust gas stream.

17. The exhaust gas treatment system of claim 16, wherein the SCR catalyst article is in a close coupled position, the exhaust gas treatment system further comprising a conventional SCR catalyst article positioned downstream from and in fluid communication with the SCR catalyst article, the conventional SCR catalyst article comprising a copper- or iron-promoted zeolite.

18. The exhaust gas treatment system of claim 17, comprising a first urea injector disposed upstream from and in fluid communication with the SCR catalyst article, and a second urea injector disposed downstream from the SCR catalyst article, and upstream from and in fluid communication with the conventional SCR catalyst article.

19. A method of treating an exhaust gas stream, the method comprising contacting the exhaust gas stream from an internal combustion engine with the catalyst article of claim 14, for a time and at a temperature sufficient to reduce the level of nitrogen oxides ($NO_x$) in the exhaust gas stream.

20. A method for preparing a selective catalytic reduction (SCR) catalyst composition comprising a reducible metal oxide support comprising ceria, a redox promotor comprising one or more transition metal oxides, and an acidic acid promotor comprising an oxide of niobium, tungsten, silicon, or a combination thereof, wherein the redox promotor and the acid promotor are supported on the reducible metal oxide support, and the acid promotor is niobium (V) oxide ($Nb_2O_5$), present in an amount of about 6% to about 10% by weight on an oxide basis, based on the total weight of the catalyst composition, the method comprising:
contacting the reducible metal oxide support with a redox promotor precursor and an acidic acid promotor precursor; and
calcining the reducible metal oxide support.

21. The method of claim 20, wherein contacting comprises sequentially impregnating the reducible metal oxide support first with the redox promotor precursor, followed by a second impregnation with the acidic acid promotor precursor.

22. The method of claim 20, wherein contacting comprises sequentially impregnating the reducible metal oxide support first with the acidic acid promotor precursor, followed by a second impregnation with the redox promotor precursor.

23. The method of claim 20, wherein contacting comprises co-impregnating the reducible metal oxide support with the redox promotor precursor and the acidic acid promotor precursor.

24. The method of claim 21, wherein calcining comprises calcining the reducible metal oxide support after the first impregnation and calcining the reducible metal oxide support after the second impregnation.

25. The method of claim 22, wherein calcining comprises calcining the reducible metal oxide support after the first impregnation and calcining the reducible metal oxide support after the second impregnation.

* * * * *